US008058762B2

(12) United States Patent
Asano

(10) Patent No.: US 8,058,762 B2
(45) Date of Patent: Nov. 15, 2011

(54) ROTOR, AXIAL GAP TYPE MOTOR, METHOD OF DRIVING MOTOR, AND COMPRESSOR

(75) Inventor: Yoshinari Asano, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 908 days.

(21) Appl. No.: 11/795,409

(22) PCT Filed: Jan. 17, 2006

(86) PCT No.: PCT/JP2006/000493
§ 371 (c)(1),
(2), (4) Date: Mar. 21, 2008

(87) PCT Pub. No.: WO2006/077812
PCT Pub. Date: Jul. 27, 2006

(65) Prior Publication Data
US 2011/0133596 A1    Jun. 9, 2011

(30) Foreign Application Priority Data
Jan. 19, 2005    (JP) .................................. 2005-011520

(51) Int. Cl.
 *H02K 37/00* (2006.01)
(52) U.S. Cl. ............................... 310/156.33; 310/156.75
(58) Field of Classification Search ............. 310/156.74–156.77, 268, 156.32, 310/156.33, 156.47, 156.57, 156.61, 156.62
See application file for complete search history.

(56) References Cited

U.S. PATENT DOCUMENTS

| | | | | | |
|---|---|---|---|---|---|
| 2,719,931 | A | * | 10/1955 | Kober | 310/156.49 |
| 2,774,896 | A | * | 12/1956 | Reynst Maximilien et al. | 310/103 |
| 2,861,205 | A | * | 11/1958 | Kober | 310/156.33 |
| 2,873,395 | A | * | 2/1959 | Kober | 310/112 |
| 3,219,861 | A | * | 11/1965 | Burr | 310/268 |
| 3,292,023 | A | * | 12/1966 | Kober | 310/156.75 |
| 3,304,449 | A | * | 2/1967 | Pohlman et al. | 310/103 |
| 3,320,454 | A | * | 5/1967 | Kober | 310/268 |
| 3,324,321 | A | * | 6/1967 | Kober | 310/156.75 |
| 3,334,254 | A | * | 8/1967 | Kober | 310/156.07 |
| 3,822,390 | A | * | 7/1974 | Janson | 310/104 |
| 4,152,617 | A | * | 5/1979 | Janson | 310/103 |
| 4,363,988 | A | * | 12/1982 | Kliman | 310/268 |

(Continued)

FOREIGN PATENT DOCUMENTS

CN    1516914 A    7/2004

(Continued)

OTHER PUBLICATIONS

Chinese Office Action of corresponding Chinese Application No. 200680002703.1 dated May 28, 2010.

(Continued)

*Primary Examiner* — Dang D Le
(74) *Attorney, Agent, or Firm* — Global IP Counselors

(57) ABSTRACT

A technique of employing a rotor having anti-saliency and being rotatable about a predetermined axis in an axial gap type motor is provided. A plurality of magnets are disposed annularly on a substrate with polarities being symmetric around a shaft hole. For instance, the magnets exhibit N pole and S pole, respectively, on the side of a stator (on this side of sheet of drawing). A plurality of magnetic members are disposed to extend perpendicularly to the direction of a rotation axis, and more specifically, between the magnets.

39 Claims, 49 Drawing Sheets

U.S. PATENT DOCUMENTS

| | | | |
|---|---|---|---|
| 4,520,300 A * | 5/1985 | Fradella | 318/603 |
| 4,634,906 A * | 1/1987 | Grosjean | 310/49.05 |
| 5,646,464 A * | 7/1997 | Sickafus | 310/40 MM |
| 6,424,069 B1 * | 7/2002 | Pullen et al. | 310/156.38 |
| 7,911,102 B2 * | 3/2011 | Lacour | 310/103 |
| 2004/0135453 A1 * | 7/2004 | Naito et al. | 310/156.32 |
| 2005/0127769 A1 * | 6/2005 | Minagawa | 310/156.32 |

FOREIGN PATENT DOCUMENTS

| | | |
|---|---|---|
| EP | 1 418 657 A1 | 5/2004 |
| JP | 61-185040 A | 8/1986 |
| JP | 05-268754 A | 10/1993 |
| JP | 08-126277 A | 5/1996 |
| JP | 10-164779 A | 6/1998 |
| JP | 10-234148 A | 9/1998 |
| JP | 3062085 U | 6/1999 |
| JP | 2001-054270 A | 2/2001 |
| JP | 2001-136721 A | 5/2001 |
| JP | 2003-61284 A | 2/2003 |
| JP | 2004-052657 A | 2/2004 |
| JP | 2004-166354 A | 6/2004 |
| WO | WO-03/012956 A1 | 2/2003 |

OTHER PUBLICATIONS

Japanese Office Action of corresponding Japanese Application No. 2006-553886 dated Sep. 28, 2010.

Japanese Office Action of corresponding Japanese Application No. 2007-185723 dated Oct. 5, 2010.

Japanese Office Action of corresponding Japanese Application No. 2007-185724 dated Oct. 5, 2010.

* cited by examiner

F I G. 3 0
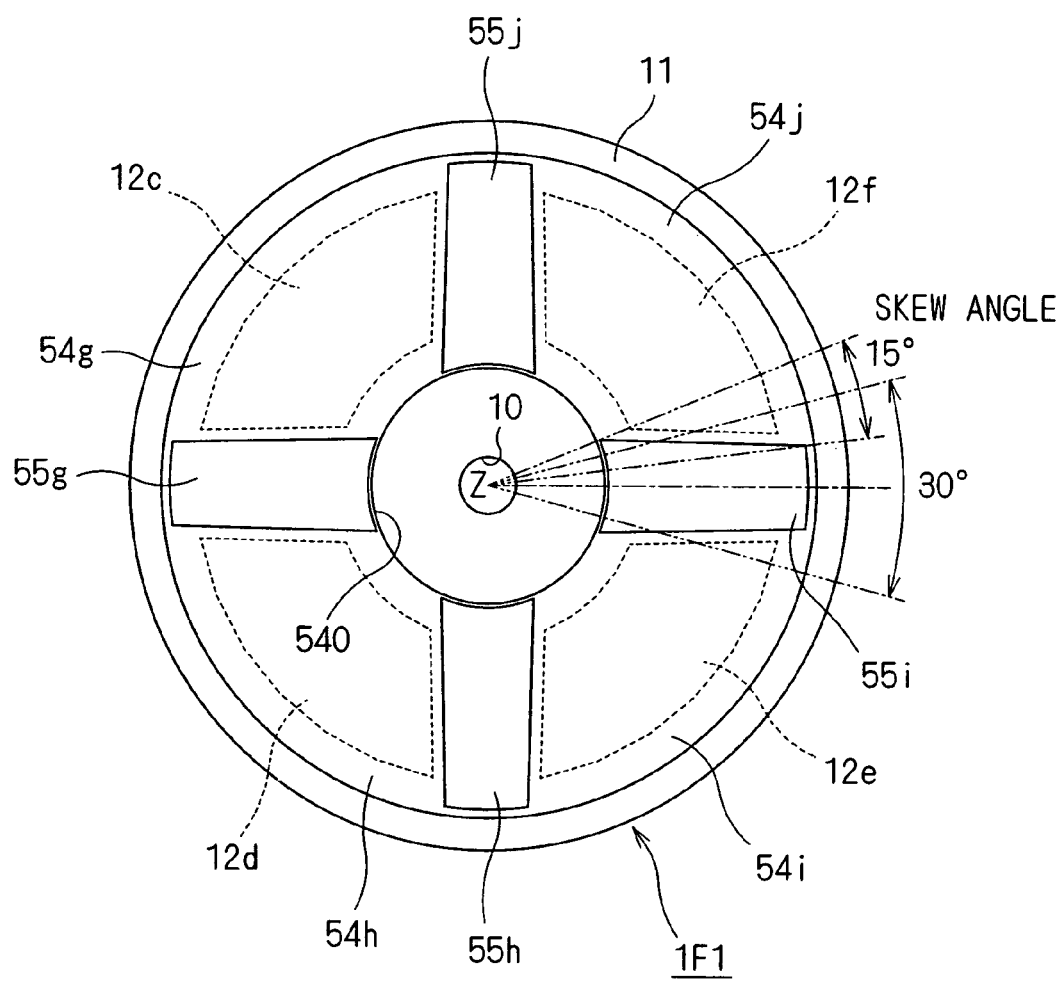

F I G. 3 8
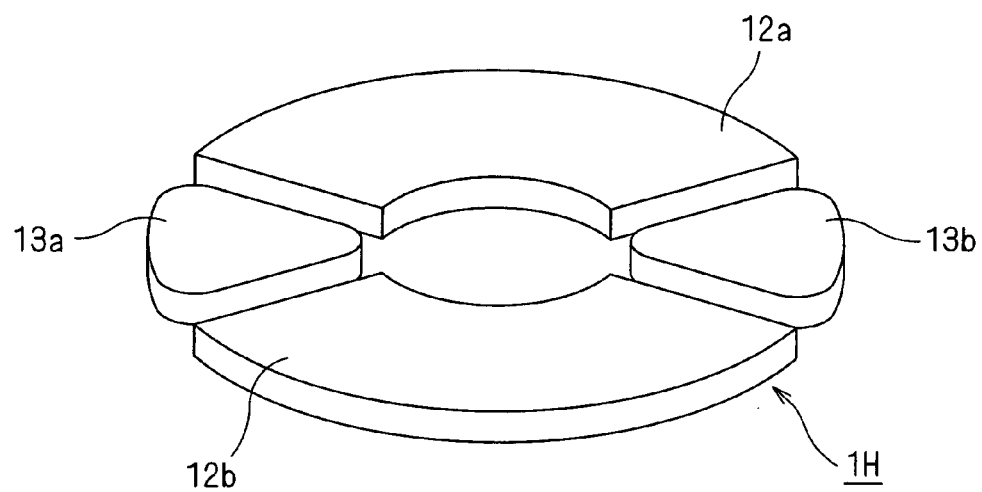
F I G. 3 9
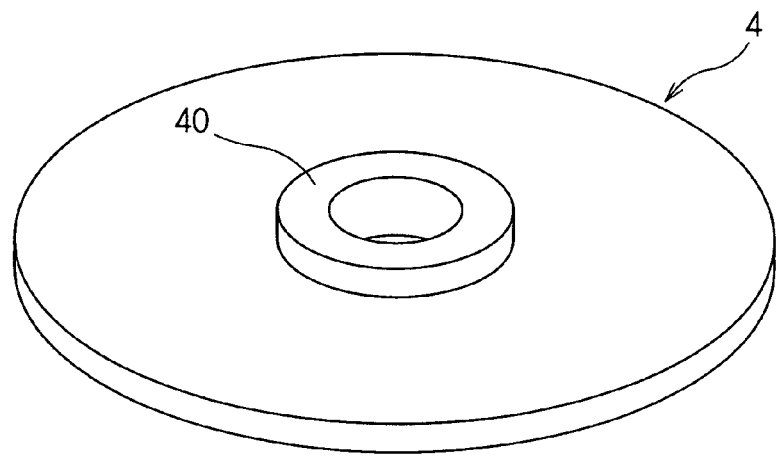

F I G. 6 5
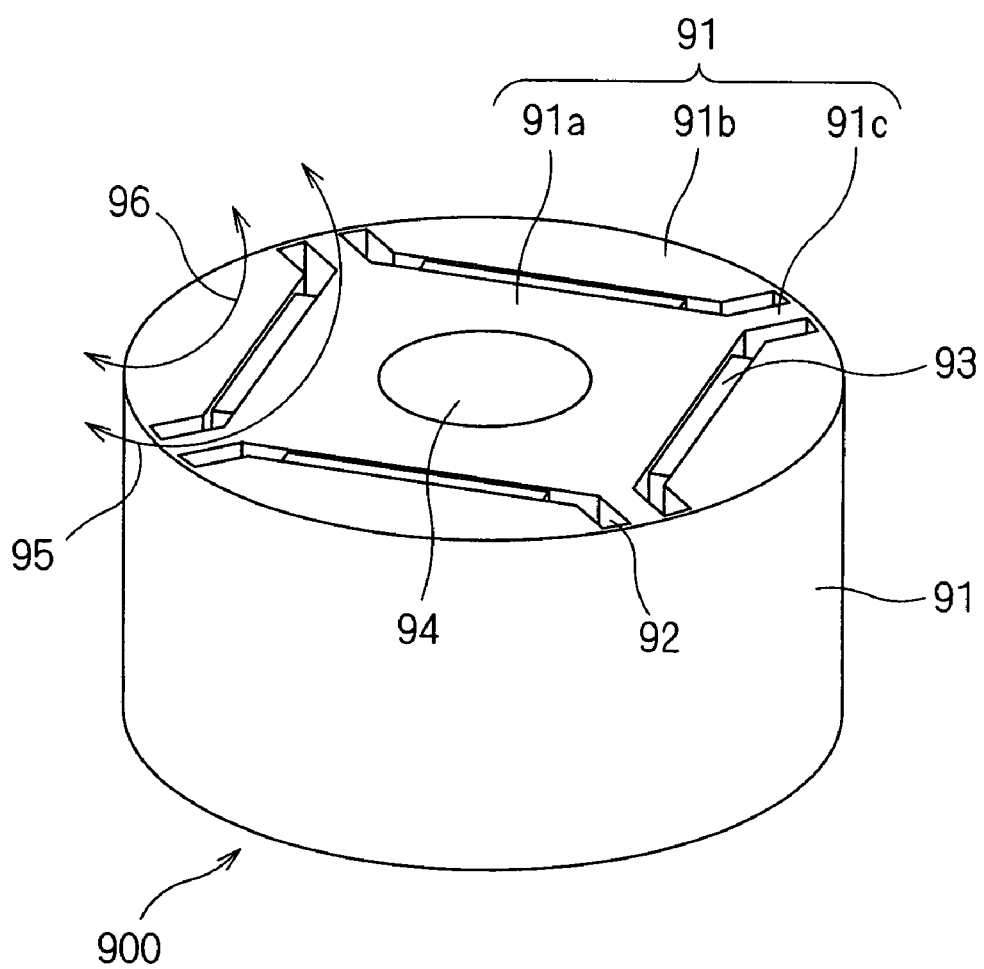

ROTOR, AXIAL GAP TYPE MOTOR, METHOD OF DRIVING MOTOR, AND COMPRESSOR

CROSS-REFERENCE TO RELATED APPLICATIONS

This U.S. National stage application claims priority under 35 U.S.C. §119(a) to Japanese Patent Application No. 2005-011520, filed in Japan on Jan. 19, 2005, the entire contents of which are hereby incorporated herein by reference.

TECHNICAL FIELD

This invention relates to a motor, and particularly to an axial gap type motor in which the gap between a stator and a rotor is provided along a plane perpendicular to the rotation axis.

BACKGROUND ART

Conventionally, many radial gap type motors have been used in which the gap between the stator and rotor is provided along a cylindrical surface parallel to the rotation axis for applications requiring high outputs such as a compressor, machine tool, etc. However, because of the recent higher performance of magnetic materials or the like, the study of employing an axial gap type motor in a compressor or the like has been started.

This is to respond to a request to solve the problem that a stainless pipe or the like for preventing permanent magnets from being scattered by centrifugal force increases gaps or eddy-current loss and a request to apply a plate-like magnet to a cylindrical rotor.

Patent document 6 describes that an axial gap type motor reduces axis and bearing load for compressor application. A rotor employed here has permanent magnets exposed at its surface.

Patent document 1 discloses an axial gap type motor, and employs so-called distributed winding for a stator. In a rotor employed here, permanent magnets magnetized in the axial direction are embedded in a disc part made of a non-magnetic material.

Patent document 2 discloses an axial gap type motor, and employs so-called concentrated winding for a stator. In a rotor employed here, a plurality of permanent magnets are fixed by a non-magnetic ring from their outer sides and by a magnet holder from their inner sides.

Patent document 3 discloses an axial gap type motor having magnetic poles on both sides of a rotor and stators on its both sides. In the rotor employed here, permanent magnets having a plurality of poles are disposed on both sides of a ring-shaped yoke member.

Patent document 4 discloses an axial gap type motor. In a rotor employed here, permanent magnets magnetized in the axial direction are embedded in a disc part made of a non-magnetic material.

Patent document 5 discloses an axial gap type switched reluctance motor.

Patent document 1: Japanese Patent Application Laid-Open No. 5-268754
Patent document 2: Japanese Patent Application Laid-Open No. 8-126277
Patent document 3: Japanese Patent Application Laid-Open No. 10-164779
Patent document 4: Japanese Utility Model No. 3062085
Patent document 5: Japanese Patent Application Laid-Open No. 2004-166354
Patent document 6: Japanese Patent Application Laid-Open No. 2004-52657

SUMMARY OF THE INVENTION

Problems to be Solved by Invention

However, the rotor shown in Patent document 6, having permanent magnets exposed at its surface, cannot make use of reluctance torque, and in addition, a wide range of operation by flux-weakening control is difficult.

Further, in the rotor shown in Patent document 1 or 4, the disc part of the rotor is made of a non-magnetic material. Thus, a portion of the rotor other than the permanent magnets is merely a structural member having no magnetic function.

In the rotor shown in Patent document 2, the non-magnetic ring is also a mere structural member. There is no mention of the magnet holder being either magnetic or non-magnetic, and even when employing a magnetic material for the magnet holder, it will not exhibit saliency.

In the rotor shown in Patent document 3, the permanent magnets have yokes on the opposite side of gaps, but do not exhibit saliency.

In the switched reluctance motor shown in Patent document 5, the poles of a rotor are cores formed into U shape, and the poles of a stator have cores formed into U shape around which excitation windings are wound. And, they are provided in main parts of separate non-magnetic materials, respectively. One pole of the stator has a pair of magnetic poles when the excitation winding is energized, and one pole of the stator and one pole of the rotor are opposed to each other to form one magnetic path, and there is no exchange of magnetic flux with an adjacent pole.

Therefore, when providing a permanent magnet for the rotor in Patent document 5, the interaction between the energized pole of the stator and the permanent magnet interferes with the interaction with the poles of the rotor composed of the cores formed into U shape. Further, the interaction between a pole of the stator yet to be energized and permanent magnet will cause an increase in cogging torque.

Means for Solving the Problems

A first aspect of a rotor according to this invention (1A; 1B; 1C; 1D; 1E; 1F; 1G; 1H; 1I; 1J; 1K; 1L; 1M) comprises: a plurality of magnets (12a, 12b; 120a, 120b; 12a, 12b; 1a, 12b; 12a, 12b; 12c to 12f; 12a, 12b, 12g, 12h, 12a, 12b; 12a, 12b, 12g, 12h; 12, 12b; 12a, 12b, 12g, 12h; 12a, 12b; 12a, 12b), each having a pole face, disposed annularly with polarities being symmetric around a predetermined axis; and a plurality of magnetic members (13a, 13b; 130a, 130b; 13a, 13b, 14a, 14b; 54a, 5b; 13a, 13b, 54c to 54f; 54g to 54j; 13a, 13b, 13g, 13h; 13a, 13b; 13a, 13b, 13g, 13h, 14a, 14b, 14g, 14h; 13a, 13b, 14a, 14b, 14g, 14h; 13a, 13b, 13g, 13h, 542, 544; 13a, 13b, 542, 544; 541, 545). An inductance (Ld) corresponding to a magnetic flux flowing from outside passing through between a first type of said magnets (12a; 120a; 12a; 12a; 12a; 12c, 12e; 12a, 12g; 12a; 12a, 12g; 12a; 12a, 12g; 12a; 12a) having said pole face exhibiting a first polarity with respect to one side of said axis and a second type of said magnets (12b; 120b; 12b; 12b; 12b; 12d, 12f; 12b, 12h; 12b; 12b, 12h; 12b; 12b, 12h; 12b; 12b) having said pole face exhibiting a second polarity with respect to said one side is smaller than an inductance (Lq) corresponding to a magnetic flux flowing from said outside to said magnetic members bypassing said magnets.

A second aspect of the rotor according to this invention (1A; 1B; 1C; 1E; 1G; 1H; 1I; 1J; 1K; 1L) is the rotor according to the first aspect, in which said magnetic members (13*a*, 13*b*; 130*a*, 130*b*; 13*a*, 13*b*; 13*a*, 13*b*; 13*a*, 13*b*, 13*g*, 13*h*; 13*a*, 13*b*; 13*a*, 13*b*, 13*g*, 13*h*; 13*a*, 13*b*; 13*a*, 13*b*, 13*g*, 13*h*; 13*a*, 13*b*) are provided at least between said first type of said magnets (12*a*; 120*a*; 12*a*; 12*a*; 12*a*, 12*g*; 12*a*; 12*a*, 12*g*; 12*a*; 12*a*, 12*g*; 12*a*) and said second type of said magnets (12*b*; 120*b*; 12*b*; 12*b*, 12*h*; 12*b*; 12*b*, 12*h*; 12*b*; 12*b*, 12*h*; 12*b*).

A third aspect of the rotor according to this invention is the rotor according to the second aspect, in which surfaces of said magnetic members on said one side lie on almost the same plane as said pole face.

A fourth aspect of the rotor according to this invention (1A; 1B; 1C; 1E; 1F; 1G; 1I; 1K) is the rotor according to the second aspect, and further comprises a yoke (11; 110; 11; 11; 11; 11; 11; 11) for backing said magnets (12*a*, 12*b*; 120*a*, 120*b*; 12*a*, 12*b*; 12*a*, 12*b*; 12*c* to 12*f*; 12*a*, 12*b*; 12*a*, 12*b*; 12*a*, 12*b*) from the other side of said axis.

A fifth aspect of the rotor according to this invention (1G; 1I; 1K) is the rotor according to the fourth aspect, and further comprises other plurality of magnets (12*g*, 12*h*; 12*g*, 12*h*; 12*g*, 12*h*) each having a pole face, disposed annularly from the other side of said axis with respect to said yoke (11; 11; 11) with polarities being symmetric around said axis. Said magnetic members (13*g*, 13*h*; 13*g*, 13*h*; 13*g*, 13*h*) are also provided between said other magnets.

A sixth aspect of the rotor according to this invention (1G; 1I; 1K) is the rotor according to the fifth aspect, in which said magnets (12*a*, 12*b*; 12*a*, 12*b*; 12*a*, 12*b*) and said other magnets (12*g*, 12*h*; 12*g*, 12*h*; 12*g*, 12*h*) are disposed to be nearly directly opposed with said yoke interposed therebetween, and exhibit magnetic poles of opposite polarity to said yoke.

A seventh aspect of the rotor according to this invention (1B) is the rotor according to the fourth aspect, in which a bonded magnet (120) covering said one side of said magnetic members (130*a*, 130*b*) and said yoke (110) is provided, and said magnets (120*a*, 120*b*) are said bonded magnet as magnetized.

An eighth aspect of the rotor according to this invention (1B) is the rotor according to the seventh aspect, in which said bonded magnet (120) is obtained by mixing dust of a rare-earth magnet with a binder such as resin.

A ninth aspect of the rotor according to this invention (1B) is the rotor according to the seventh aspect, in which said bonded magnet (121*a*, 121*b*) covering said one side of said magnetic members (130*a*, 130*b*) is substantially unmagnetized.

A tenth aspect of the rotor according to this invention (1B) is the rotor according to the ninth aspect, in which said magnetic members (130*a*, 130*b*) have their surfaces vary sinusoidally around said axis.

An eleventh aspect of the rotor according to this invention (1A; 1C; 1E; 1G; 1H; 1I; 1J; 1K; 1L) is the rotor according to any one of the second to fourth aspects, in which a magnetic barrier (G1) is provided in a direction perpendicular to said axis between said magnetic members (13*a*, 13*b*; 13*a*, 13*b*; 13*a*, 13*b*; 13*a*, 13*b*, 13*g*, 13*h*; 13*a*, 13*b*; 13*a*, 13*b*, 13*g*, 13*h*; 13*a*, 13*b*; 13*a*, 13*b*, 13*g*, 13*h*; 13*a*, 13*b*) and said magnets (12*a*, 12*b*; 12*a*, 12*b*; 12*a*, 12*b*; 12*a*, 12*b*, 12*g*, 12*h*; 12*a*, 12*b*; 12*a*, 12*b*, 12*g*, 12*h*; 12*a*, 12*b*; 12*a*, 12*b*, 12*g*, 12*h*; 12*a*, 12*b*) adjacent to each other.

A twelfth aspect of the rotor according to this invention (1A; 1C; 1E; 1G; 1H; 1I; 1J; 1K; 1L) is the rotor according to the eleventh aspect, in which the width of said magnetic barrier is chosen to be not less than twice a distance (δ) between a pole face of a stator opposed to said rotor to constitute a motor and a pole face of the rotor.

A thirteenth aspect of the rotor according to this invention (1C; 1E; 1I; 1J; 1K; 1L) is the rotor according to the second aspect, and further comprises other magnetic members (14*a*, 14*b*; 54*c*, 54*e*; 14*a*, 14*b*, 14*g*, 14*h*; 14*a*, 14*b*, 14*g*, 14*h*; 542, 544; 542, 544) provided to cover said pole face of said magnets (12*a*, 12*b*; 12*a*, 12*b*; 12*a*, 12*b*, 12*g*, 12*h*; 12*a*, 12*b*; 12*a*, 12*b*, 12*g*, 12*h*; 12*a*, 12*b*) magnetically independently and individually on said one side.

A fourteenth aspect of the rotor according to this invention (1C; 1E; 1K; 1L) is the rotor according to the thirteenth aspect, in which edges (14*a*E, 14*b*E) of said other magnetic members (14*a*, 14*b*; 54*c*, 54*e*; 542, 544; 542, 544) in a circumferential direction around said axis are thinner than a central portion.

A fifteenth aspect of the rotor according to this invention (1C; 1E; 1K; 1L) is the rotor according to the fourteenth aspect, in which edges (14*a*E, 14*b*E) of said other magnetic members (14*a*, 14*b*; 54*c*, 54*e*; 542, 544; 542, 544) in the circumferential direction around said axis have side surfaces inclined to said one side in said circumferential direction.

A sixteenth aspect of the rotor according to this invention (1C; 1E; 1K; 1L) is the rotor according to the thirteenth aspect, in which said other magnetic members (14*a*, 14*b*; 54*c*, 54*e*; 542, 544; 542, 544) are provided with grooves (141) in a radial direction around said predetermined axis on said one side.

A seventeenth aspect of the rotor according to this invention (1E; 1K; 1L) is the rotor according to the thirteenth aspect, in which a magnetic plate (542; 542, 544; 542, 544) covering said pole face and said magnetic members (13*a*, 13*b*; 13*a*, 13*g*, 13*h*; 13*a*, 13*b*) on said one side is provided, said magnetic plate has opening slits (55*c* to 55*f*; 55*c* to 55*f*; 55*c* to 55*f*) extending from positions close to said axis to farther positions between said magnetic members and said magnets as viewed along said axis, divisions of said magnetic plate divided by said slits in a circumferential direction around said axis that cover said pole face serve as said other magnetic members (54*c*, 54*e*; 54*c*, 54*e*; 54*c*, 54*e*). Said other magnetic members are connected to divisions (54*d*, 54*f*; 54*d*, 54*f*; 54*d*, 54*f*) of said magnetic plate divided by said slits in the circumferential direction around said axis that cover said magnetic members with thin portions (56*e* to 56*h*/56*i* to 56*l*) interposed therebetween at least on the side of one ends of said slits.

An eighteenth aspect of the rotor according to this invention (1E; 1K; 1L) is the rotor according to the seventeenth aspect, in which the width of said slits (55*c* to 55*f*; 55*c* to 55*f*; 55*c* to 55*f*) in said circumferential direction is chosen to be not less than twice the distance between a pole face of a stator opposed to the rotor (1E; 1K; 1L) to constitute a motor and surfaces of said other magnetic members on the side of the stator.

A nineteenth aspect of the rotor according to this invention (1C; 1D; 1E; 1F; 1I; 1J; 1K; 1L; 1M) is the rotor according to the first aspect, in which said magnetic members (14*a*, 14*b*; 54*a*, 54*b*; 54*c*, 54*e*; 54*g*, 54*h*, 54*i*, 54*j*; 14*a*, 14*b*, 14*g*, 14*h*; 14*a*, 14*b*, 14*g*, 14*h*; 542, 544; 542, 544; 541, 545) are provided to cover said pole face at least on said one side.

A twentieth aspect of the rotor according to this invention (1I; 1J; 1K; 1L; 1M) is the rotor according to the nineteenth aspect, in which said magnetic members (14*g*, 14*h*; 14*g*, 14*h*; 544; 544; 545) are mounted on said magnets also from the opposite side of said one side.

A twenty-first aspect of the rotor according to this invention (1C; 1E; 1K; 1L) is the rotor according to the nineteenth aspect, in which edges (14aE, 14bE) of said magnetic members (54a, 54b; 54g, 54h, 54i, 54j; 542, 544; 542, 544; 541, 545) in the circumferential direction around said axis are thinner than a central portion.

A twenty-second aspect of the rotor according to this invention (1C; 1E; 1K; 1L; 1M) is the rotor according to the nineteenth aspect, in which edges (14aE, 14bE) of said magnetic members (54a, 54b; 54g, 54h, 54i, 54j; 542, 544; 542, 544; 541, 545) in said circumferential direction around said axis have side surfaces inclined to said one side in said circumferential direction.

A twenty-third aspect of the rotor according to this invention (1C; 1E; 1K; 1L; 1M) is the rotor according to the nineteenth aspect, in which said magnetic members (54a, 54b; 54g, 54h, 54i, 54j; 542, 544; 542, 544; 541, 545) are provided with grooves (141) on said one side in a radial direction around said predetermined axis.

A twenty-fourth aspect of the rotor according to this invention (1D; 1E; 1F; 1K; 1L; 1M) is the rotor according to the nineteenth aspect, in which a magnetic plate (541; 542; 543; 542, 544; 542, 544; 541, 545) covering said pole face on said one side is provided, said magnetic plate has opening slits (55a, 55b; 55c to 55f; 55g to 55j; 55c to 55f; 55c to 55f; 55a, 55b) extending from positions close to said axis to farther positions between said magnetic members as viewed along said predetermined axis, said magnetic plate divided by said slits in the circumferential direction around said axis serves as said magnetic members (54a, 54b; 54c, 54e; 54g, 54h, 54i, 54j; 54c, 54e; 54c, 54e; 54a, 54b). Said magnetic members are connected to each other with thin portions (56a, 56b/56c, 56d; 56e to 56h/56i to 56l; 56e to 56h/56i to 56l; 56e to 56h/56i to 56l; 56a, 56b/56c, 56d) interposed therebetween at least on the side of one ends of said slits.

A twenty-fifth aspect of the rotor according to this invention (1D; 1F; 1M) is the rotor according to the twenty-fourth aspect, in which the width of said slits (55a, 55b; 55g to 55j; 55a, 55b) in said circumferential direction is chosen to be not less than twice the distance between a pole face of a stator opposed to the rotor to constitute a motor and a pole face of the rotor.

A twenty-sixth aspect of the rotor according to this invention (1D; 1F; 1M) is the rotor according to the twenty-fourth aspect, in which said first type of said magnets (12a; 12a, 12c; 12a) and said second type of said magnets (12b; 12b, 12d; 12b) are formed integrally by a ring-like magnet. The ring-like magnet is unmagnetized in positions where said slits (55a, 55b ; 55g to 55j; 55a, 55b) are provided in plan view as viewed along said axis.

A twenty-seventh aspect of the rotor according to this invention (1D; 1M) is the rotor according to any one of the nineteenth to twenty-sixth aspects, in which the area of one of said magnetic members (54a, 54b; 54a, 54b) covering one of said pole face (12a, 12b; 12a, 12b) is larger than the area of said pole face.

A twenty-eighth aspect of the rotor according to this invention (1D; 1F; 1M) is the rotor according to any one of the twenty-fourth to twenty-seventh aspects, in which said slits (55a, 55b; 55g to 55j; 55a, 55b) are provided in the vicinity of the border between said first type of said magnets (12a; 12c, 12e; 12a) and said second type of said magnets (12b; 12d, 12f; 12b).

A twenty-ninth aspect of the rotor according to this invention (1L; 1M) is the rotor according to the twenty-fourth aspect, and further comprises a magnetic plate (545) covering a pole face further provided for said first type of said magnets (12a) exhibiting said second polarity and a pole face further provided for said second type of said magnets (12b) exhibiting said first polarity, on the other side of said axis, and being of almost the same type as said magnetic plate (541) covering said pole face on said one side.

A thirtieth aspect of the rotor according to this invention (1E; 1L) is the rotor according to any one of the twenty-fourth to twenty-ninth aspects, and further comprises other magnetic members (13a, 13b) provided between said first type of said magnets (12a) and said second type of said magnets (12b). The slits (55c to 55f) are provided in the vicinity of the border between the other magnetic members and said magnets (12a, 12b).

A thirty-first aspect of the rotor according to this invention (1F) is the rotor according to any one of the twenty-fourth to thirtieth aspects, in which said slits (55g to 55j) are provided to be inclined relative to the axial direction around said axis.

A thirty-second aspect of the rotor according to this invention (1D) is the rotor according to any one of the nineteenth to twenty-eighth aspects, and further comprises a yoke (11) backing said magnets (12a, 12b) from the other side of said axis.

A thirty-third aspect of the rotor according to this invention is the rotor according to the fourth aspect, in which, in said yoke, a region having a predetermined length from said one side in a position where said magnetic members are extended along said axis is made of dust core, and steel sheets perpendicular to said axis are stacked out of said region.

A thirty-fourth aspect of the rotor according to this invention is the rotor according to the fourth aspect, in which said yoke (11) has recesses or through holes (11a, 11b) into which said magnetic members (13a, 13b) fit in the direction along said axis.

A thirty-fifth aspect of the rotor according to this invention is the rotor according to the fourth aspect, in which said yoke (11) has recesses (12aQ, 12bQ) into which said magnets (12a, 12b) fit in the direction along said axis.

A thirty-sixth aspect of the rotor according to this invention according to any one of the thirty-third to thirty-fifth aspects, and further comprises a magnetic plate (542) covering said pole face and said magnetic members (13a, 13b) on said one side. The magnetic plate has opening slits (55c to 550 extending from positions close to said axis to farther positions between said magnetic members and said magnets as viewed along said axis, and divisions (54d, 54f) of said magnetic plate divided by said slits in the circumferential direction around said axis that cover said magnetic members are formed integrally with said magnetic members.

A thirty-seventh aspect of the rotor according to this invention is the rotor according to the fourth aspect, and further comprises ridges (111a, 111b) provided on said yoke (11) and coming into contact with said magnets from their outer peripheral sides.

A thirty-eighth aspect of the rotor according to this invention is the rotor according to the fourth aspect, and further comprises ridges (112a. 113a, 112b. 113b) provided on said yoke (11) and coming into contact with said magnets from the side of the circumferential direction around said axis.

A thirty-ninth aspect of the rotor according to this invention is the rotor according to the seventeenth aspect, in which said magnetic plate has recesses or through holes (57a, 57b) into which said magnetic members (13a, 13b) fit in the direction along said axis.

A fortieth aspect of the rotor according to this invention is the rotor according to the seventeenth aspect, in which said magnetic plate (542) has recesses (57c, 57d) into which said magnets (12a, 12b) fit in the direction along said axis.

A forty-first aspect of the rotor according to this invention is the rotor according to either the thirty-ninth or fortieth aspect, and further comprises a yoke (11) backing said magnets (12a, 12b) from the other side of said axis. Said yoke and said magnetic members are formed integrally.

A forty-second aspect of the rotor according to this invention is the rotor according to the twenty-fourth aspect, in which said magnetic plate (542) has recesses (57c, 57d) into which said magnets (12a, 12b) fit in the direction along said axis.

A forty-third aspect of the rotor according to this invention is the rotor according to either the seventeenth or twenty-fourth aspect, and further comprises ridges (58a, 58b) provided on said magnetic plate (542) and coming into contact with said magnets from their outer peripheral sides.

A forty-fourth aspect of the rotor according to this invention is the rotor according to either the seventeenth or twenty-fourth aspect, and further comprises ridges (59a, 59b, 59c, 59d) provided on said magnetic plate (542) and coming into contact with said magnets from the side of the circumferential direction around said axis.

A forty-fifth aspect of the rotor according to this invention is the rotor according to either the seventeenth or twenty-fourth aspect, in which said magnetic plate (542) is composed of magnetic plate components (542a, 542b) divided in a position where said pole face is disposed as viewed along said axis.

A forty-sixth aspect of the rotor according to this invention is the rotor according to the forty-fifth aspect, in which said magnetic plate components (542a, 542b) are adjacent to each other leaving gaps.

A forty-seventh aspect of the rotor according to this invention is the rotor according to the forty-fifth aspect, in which edges of said magnetic plate components (542a, 542b) in the circumferential direction have steps in the direction along said axis. The steps of said magnetic plate components adjacent to each other engage with each other to constitute said magnetic plate (542).

A forty-eighth aspect of the rotor according to this invention is the rotor according to the forty-fifth aspect, in which edges of said magnetic plate components (542a, 542b) in the circumferential direction have steps in the direction along said axis.

The steps of said magnetic plate components adjacent to each other are adjacent to each other, and form recesses which open on said one side and are in contact with each other on the other side of said axis.

A forty-ninth aspect of the rotor according to this invention is the rotor according to the thirty-sixth aspect, in which a distance (t3) between the other side of said magnetic plate (542) relative to said axis and said one side of said yoke (11) is chosen to be not less than twice the distance between a pole face of a stator opposed to the rotor to constitute a motor and a surface of said magnetic plate on the side of the stator.

A fiftieth aspect of the rotor according to this invention is the rotor according to either the thirty-seventh or thirty-eighth aspect, in which a distance between the other side of said magnetic plate (542) relative to said axis and said one side of said ridges (111a, 111b, 112a, 113a, 112b, 113b) is chosen to be not less than twice the distance between a pole face of a stator opposed to the rotor to constitute a motor and a surface of said magnetic plate on the side of the stator.

A fifty-first aspect of the rotor according to this invention is the rotor according to the forty-first aspect, in which a distance (t3) between the other side of said magnetic plate (542) relative to said axis and said one side of said yoke (11) is chosen to be not less than twice the distance between a pole face of a stator opposed to the rotor to constitute a motor and a surface of said magnetic plate on the side of the stator.

A fifty-second aspect of the rotor according to this invention is the rotor according to the forty-third aspect, in which a distance between the said one side of said yoke (11) and the other side of said ridges (58a, 58b) relative to said axis is chosen to be not less than twice the distance between a pole face of a stator opposed to the rotor to constitute a motor and a surface of said magnetic plate on the side of the stator.

A fifty-third aspect of the rotor according to this invention is the rotor according to the forty-fourth aspect, in which a distance between the said one side of said yoke (11) and the other side of said ridges (59a, 59b, 59c, 59d) relative to said axis is chosen to be not less than twice the distance between a pole face of a stator opposed to the rotor to constitute a motor and a surface of said magnetic plate on the side of the stator.

A first aspect of an axial gap type motor according to this invention comprises the rotor according to any one of the first to fifty-third aspects and a stator (2). Said stator includes: a plurality of magnetic cores (221 to 226) standing along said axis; windings (231 to 236) wound around said magnetic cores; and a magnetic plate (24) mounted on said magnetic cores and having opening slits (251 to 256) extending from positions close to said axis to farther positions.

A second aspect of the axial gap type motor according to this invention comprises the rotor according to any one of the first to fifty-third aspects and a stator (3). Said stator includes: a substrate (31) having a surface (310) perpendicular to said axis; a pair of first-stage spacers (311, 313) separated from each other and each extending at an angle of about 180 degrees, on said surface in the circumferential direction of said axis; a pair of second-stage spacers (312, 314) extending at ends of said first-stage spacers at an angle of about 120 degrees in said circumferential direction on said first-stage spacers, respectively; a pair of magnetic cores (321, 324) provided on said first-stage spacers, respectively; two pairs of magnetic cores (322, 323/325, 326) provided on said second-stage spacers, respectively; a pair of first windings (33a, 33b) provided on said substrate and winding three of said magnetic cores; a pair of second windings (34a, 34b) provided on said first-stage spacers and said first windings and winding three of said magnetic cores; and a pair of third windings (35a, 35b) provided on said second-stage spacers and said second windings and winding three of said magnetic cores. Said first windings, said second windings and said third windings are arranged to be shifted 120 degrees from one another in said circumferential direction.

A third aspect of the axial gap type motor according to this invention comprises the rotor (1G; 1I; 1J; 1K; 1L) according to any one of the fifth to twentieth aspects and a pair of stators interposing said rotor.

A first aspect of a method of driving a motor according to this invention drives an axial gap type motor comprising the rotor according to any one of the first to fifty-third aspects and a stator opposed to said rotor, by flowing a sinusoidal current to said stator.

A second aspect of the method of driving a motor according to this invention drives an axial gap type motor comprising the rotor according to any one of the first to fifty-third aspects and a stator opposed to said rotor, by flowing a leading current to said stator.

A first aspect (200) of a compressor according to this invention is equipped with an axial gap type motor (100) comprising the rotor according to any one of the first to fifty-third aspects and a stator opposed to said rotor.

A second aspect (200) of the compressor according to this invention is the compressor of the first aspect, and further comprises a compression element (205) driven by said motor (100), and said compression element is provided below said motor.

Effects of Invention

The first aspect of the rotor according to this invention serves as a rotor having anti-saliency and being rotatable about a predetermined axis in an axial gap type motor. That is, the reluctance torque is utilized effectively, which increases torque and efficiency. Further, the effect of flux-weakening control is increased to enlarge the operating range.

According to the second aspect of the rotor according to this invention, the magnetic path passing through the magnetic members bypassing the magnets has an inductance larger than the magnetic path passing through the magnets and is perpendicular thereto when viewed as an electric angle. Thus, the q-axis inductance is increased, and anti-saliency is improved. Further, size reduction in the axial direction is easy.

According to the third aspect of the rotor according to this invention, the distance between the rotor and stator is not increased unnecessarily while earning the q-axis inductance.

According to the fourth aspect of the rotor according to this invention, a magnetic flux is prevented from short circuiting between the magnetic pole and pole face in the same magnet on the other side of the axis. Therefore, the magnetic flux generated from the pole face is supplied efficiently to the one side of the axis. Further, the magnetic resistance between the magnetic poles between the first type of the magnets and second type of the magnets on the other side of the axis is reduced. Accordingly, the permeance coefficient is increased, so that the operating point of the magnets is raised. The torque is thereby improved.

According to the fifth aspect of the rotor according to this invention, forming the motor along with the stators interposing the rotor improves the torque.

According to the sixth aspect of the rotor according to this invention, a region where the magnetic flux of the yoke saturates by the magnetic fluxes generated from the magnets is extended, and variations in magnetic fluxes flowing from the stators to the substrate is reduced, so that eddy-current loss based on the variations in magnetic fluxes is reduced.

According to the seventh aspect of the rotor according to this invention, it is easy to fix the magnets to the yoke. Moreover, they can be formed with improved adhesion, so that the permeance coefficient can be made still higher. Moreover, the use of the bonded magnet increases the flexibility in shape, which facilitates control of the distribution of magnetic flux supplied from the rotor. Further, the eddy-current loss is extremely reduced as compared to the case of employing a sintered rare-earth magnet. Furthermore, magnetic field orientation may or may not be performed at the time of molding, and magnetization is easily performed anytime after molding. In the case of performing magnetic field orientation at the time of molding, it is also easy to give an optimized magnetized distribution in order to reduce vibrations and noise.

According to the eighth aspect of the rotor according to this invention, the density of the magnetic flux generated by the rotor is increased.

According to the ninth aspect of the rotor according to this invention, through the use of the bonded magnet having high magnetic resistance and low conductivity, that the magnetic flux flows between the pole face exhibiting the first polarity with respect to the one side of the axis and the pole face exhibiting the second polarity with respect to the one side of the axis with the bonded magnet interposed therebetween, that is, magnetic flux leakage inside the rotor is small. That is, the substantially unmagnetized bonded magnet covering the one side of the magnetic members serves as a magnetic barrier between the pole faces.

According to the tenth aspect of the rotor according to this invention, it is easy to control the magnetic flux supplied from the rotor sinusoidally around the axis, thus the cogging torque is reduced.

According to the eleventh aspect of the rotor according to this invention, that the magnetic flux flows between the pole face exhibiting the first polarity and the pole face exhibiting the second polarity with the magnetic members interposed therebetween, that is, magnetic flux leakage inside the rotor is small. Therefore, the magnetic fluxes generated from the pole faces of the rotor is supplied efficiently to the stators opposed to these pole faces.

According to the twelfth aspect of the rotor according to this invention, magnetic flux leakage is reduced by making the magnetic resistance between the pole face exhibiting the first polarity and the pole face exhibiting the second polarity higher than the magnetic resistance between the stator and rotor.

According to the thirteenth aspect of the rotor according to this invention, the inductance corresponding to the magnetic flux flowing from outside bypassing the magnets is increased further. Further, other magnetic members are provided closer to the stator than the magnets, allowing the magnetic field from the stator to be likely to pass through the other magnetic members and to be less likely to reach the magnets of the rotor. This not only suppresses demagnetization of the magnets, but also allows eddy current, if any, to be likely to occur in the other magnetic members, and suppresses the occurrence of the eddy current inside the magnets. This is particularly advantageous in the case of employing a material of low electric resistance, e.g., a sintered rare-earth magnet for the magnets. In other words, the rotor of high magnetic flux density is obtained employing a sintered rare-earth magnet for the magnets without concern about the occurrence of eddy current.

According to the fourteenth aspect of the rotor according to this invention, the cogging torque is reduced.

According to the fifteenth aspect of the rotor according to this invention, skews is further obtained.

According to the sixteenth aspect of the rotor according to this invention, the grooves are opposed to the side of the stator, and the grooves serve as so-called supplemental grooves for shortening the cycle of cogging torque, thereby reducing the cogging torque.

According to the seventeenth aspect of the rotor according to this invention, the number of components is less and the magnetic plate is stronger than in the case of forming the magnetic members individually and separately. Since the thin portions are easy to become magnetically saturated, a short circuit of magnetic fluxes inside the rotor is extremely small even when the magnetic members are connected through the thin portions to eachother.

According to the eighteenth aspect of the rotor according to this invention, magnetic flux leakage is reduced by making the magnetic resistance between the pole face exhibiting the first polarity and the pole face exhibiting the second polarity higher than the magnetic resistance between the stator and rotor.

According to the nineteenth aspect of the rotor according to this invention, the inductance corresponding to the magnetic flux flowing from outside bypassing the magnets is increased further. Further, the magnetic members are provided closer to the stator than the magnets, allowing the magnetic field from the stator to be likely to pass through the other magnetic members and to be less likely to reach the magnets of the rotor. This not only suppresses demagnetization of the magnets, but also allows eddy current, if any, to be likely to occur in the magnetic members, and suppresses the occurrence of the eddy current inside the magnets. This is particularly advantageous in the case of employing a material of low electric resistance, e.g., a sintered rare-earth magnet for the magnets. In other words, the rotor of high magnetic flux density is obtained employing a sintered rare-earth magnet for the magnets without concern about the occurrence of eddy current.

According to the twentieth aspect of the rotor according to this invention, forming the motor along with the stators interposing the rotor improves the torque.

According to the twenty-first aspect of the rotor according to this invention, the cogging torque is reduced.

According to the twenty-second aspect of the rotor according to this invention, skews is further obtained.

According to the twenty-third aspect of the rotor according to this invention, the grooves are opposed to the side of the stator, and the grooves serve as so-called supplemental grooves for shortening the cycle of cogging torque, thereby reducing the cogging torque.

According to the twenty-fourth aspect of the rotor according to this invention, the number of components is less and the magnetic plate is stronger than in the case of forming the magnetic members individually and separately. Since the thin portions are easy to become magnetically saturated, a short circuit of magnetic fluxes inside the rotor is extremely small even when the magnetic members are connected through the thin portions to eachother.

According to the twenty-fifth aspect of the rotor according to this invention, magnetic flux leakage is reduced by making the magnetic resistance between the pole face exhibiting the first polarity and the pole face exhibiting the second polarity higher than the magnetic resistance between the stator and rotor.

The twenty-sixth aspect of the rotor according to this invention is easy to manufacture. Further, a substrate for connecting the first type of the magnets and second type of the magnets is not required.

According to the twenty-seventh aspect of the rotor according to this invention, a short circuit of magnetic fluxes inside the rotor is reduced.

According to the twenty-eighth aspect of the rotor according to this invention, short circuiting between the first type of the magnets and second type of the magnets through the magnetic members is prevented by the slits.

According to the twenty-ninth aspect of the rotor according to this invention, forming the motor along with the stators interposing the rotor improves the torque.

According to the thirtieth aspect of the rotor according to this invention, short circuiting between the first type of the magnets and second type of the magnets through the magnetic members and other magnetic members is prevented by the slits.

According to the thirty-first aspect of the rotor according to this invention, the substantial border of the pole faces is inclined relative to the radial direction to provide so-called skews, thereby reducing the cogging torque.

According to the thirty-second aspect of the rotor according to this invention, magnetic fluxes are prevented from short circuiting between the magnetic pole on the other side of the axis and pole face in the same magnet. Therefore, the magnetic flux generated from the pole face is supplied efficiently to the one side of the axis. Further, the magnetic resistance between the magnetic poles on the other side of the axis is reduced between the first type of the magnets and second type of the magnets. Accordingly, the permeance coefficient is increased, so that the operating point of the magnets is raised. The torque is thereby improved.

According to the thirty-third aspect of the rotor according to this invention, dust core is employed in that region since magnetic fluxes flow both in the direction parallel to the axis and in the direction inclined thereto, and stacked steel sheets are employed out of that region since most magnetic fluxes flow in the direction perpendicular to the axis. This optimizes the magnetic characteristics of the rotor.

According to the thirty-fourth aspect of the rotor according to this invention, the magnetic members and yoke are easily aligned, and both are easily coupled.

According to the thirty-fifth aspect of the rotor according to this invention, the magnets and yoke are easily aligned, and both are easily coupled.

According to the thirty-sixth aspect of the rotor according to this invention, the inductance corresponding to the magnetic flux flowing from outside bypassing the magnets be is increased further. Further, the magnetic plate is provided closer to the stator than the magnets, allowing the magnetic field from the stator to be likely to pass through them agnetic plate and to be less likely to reach the magnets of the rotor. This not only suppresses demagnetization of the magnets, but also allows eddy current, if any, to be likely to occur in the magnetic plate, and suppresses the occurrence of the eddy current inside the magnets. This is particularly advantageous in the case of employing a material of low electric resistance, e.g., a sintered rare-earth magnet for the magnets. In other words, the rotor of high magnetic flux density is obtained employing a sintered rare-earth magnet for the magnets without concern about the occurrence of eddy current. Further, making the magnetic plate and magnetic members integral facilitates assembly of the rotor using the magnetic plate, magnetic members, yoke and magnets.

According to the thirty-seventh aspect of the rotor according to this invention, the magnets can easily be aligned, and the magnets are stopped against the centrifugal force produced in the magnets by rotation of the rotor.

According to the thirty-eighth aspect of the rotor according to this invention, the magnets are easily aligned.

According to the thirty-ninth aspect of the rotor according to this invention, the magnetic members and magnetic plate are easily be-aligned, and both are easily becoupled.

According to the fortieth aspect of the rotor according to this invention, the magnets and magnetic members can easily be aligned, and both can easily be coupled.

According to the forty-first aspect of the rotor according to this invention, magnetic fluxes are prevented from short circuiting between the magnetic pole on the other side of the axis and pole face in the same magnet. Therefore, the magnetic flux generated from the pole face is supplied efficiently to the one side of the axis. Further, the magnetic resistance between the magnetic poles on the other side of the axis is reduced between the first type of the magnets and second type of the magnets. Accordingly, the permeance coefficient is increased, so that the operating point of the magnets is raised. The torque is thereby improved. Further, making the yoke and magnetic members integral facilitates assembly of the rotor using the magnetic plate, magnetic members, yoke and magnets.

According to the forty-second aspect of the rotor according to this invention, the magnets and magnetic members are easily aligned, and both are easily coupled.

According to the forty-third aspect of the rotor according to this invention, the magnets are easily aligned, and the magnets are stopped against the centrifugal force produced in the magnets by rotation of the rotor.

According to the forty-fourth aspect of the rotor according to this invention, the magnets are easily aligned.

According to the forty-fifth aspect of the rotor according to this invention, the magnetic plate are divided and formed in small size, facilitating manufacture with iron dust core.

According to the forty-sixth aspect of the rotor according to this invention, the gaps are opposed to the side of the stator, and the gaps serve as so-called supplemental grooves for shortening the cycle of cogging torque, thereby reducing the cogging torque.

According to the forty-seventh aspect of the rotor according to this invention, the structure of the magnetic plate composed of magnetic plate components are made strong.

According to the forty-eighth aspect of the rotor according to this invention, the recesses are opposed to the side of the stator, and the recesses serve as so-called supplemental grooves for shortening the cycle of cogging torque, thereby reducing the cogging torque. Further, the magnetic fluxes of the magnets are utilized effectively.

According to the forty-ninth aspect of the rotor according to this invention, the magnetic flux is likely to flow from the pole face to the stator even when the magnets are embedded to fit into the yoke.

According to the fiftieth aspect of the rotor according to this invention, the magnetic flux is likely to flow from the pole face to the stator even when the yoke is provided with ridges.

According to the fifty-first aspect of the rotor according to this invention, the magnetic flux is likely to flow from the pole face to the stator even when the magnets are embedded to fit into the magnetic plate.

According to the fifty-second aspect of the rotor according to this invention, the magnetic flux is likely to flow from the pole face to the stator even when the magnetic plate is provided with ridges.

According to the first aspect of the axial gap type motor according to this invention, the pole faces of the magnetic cores are extended substantially, making it easier to make the magnetic flux density between the rotor and stator uniform. Further, the windings are protected by the magnetic plate.

According to the second aspect of the axial gap type motor according to this invention, the three pairs of windings are easily disposed stably.

According to the third aspect of the axial gap type motor according to this invention, the presence of mechanisms for generating torque on both sides of the rotor improves the torque.

According to the first aspect of the method of driving the motor according to this invention, the cogging torque is suppressed.

According to the second aspect of the method of driving the motor according to this invention, the reluctance torque is utilized effectively, which increases torque and efficiency. Further, the effect of flux-weakening control is increased to enlarge the operating range.

According to the first aspect of the compressor according to this invention, high efficiency is obtained.

According to the second aspect of the compressor according to this invention, an axial gap type motor having a large diameter is prevented from stirring oil.

These and other objects, features, aspects and advantages of the present invention will become more apparent from the following detailed description of the present invention when taken in conjunction with the accompanying drawings.

BRIEF DESCRIPTION OF DRAWINGS

FIG. 30 is a plan view showing a rotor 1F1 according to a modification of the sixth embodiment of the present invention.

FIGS. 38 and 39 are perspective views each illustrating the structure of another rotor 1H according to the ninth embodiment of the present invention.

FIG. 65 is a perspective view of exciting the structure of an embedded magnet type rotor 900.

DETAILED DESCRIPTION OF THE INVENTION

Basic Idea of this Invention

Figure 1:
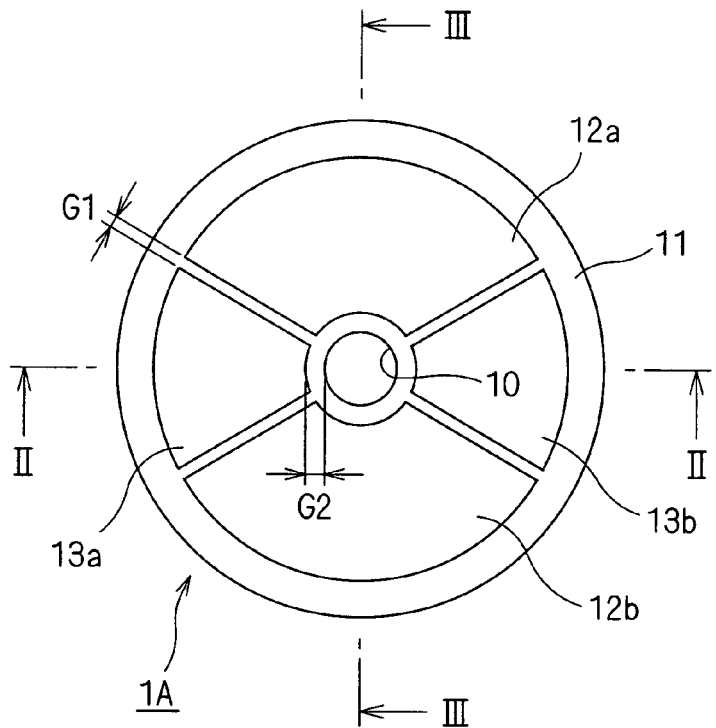
FIG. 1 is a diagram illustrating the structure of a rotor 1A according to a first embodiment of the present invention.

Before starting detailed description of embodiments, the basic idea of this invention will be described. Of course, this basic idea is included in the present invention.

Similarly to a radial gap type motor, in an axial gap type motor, improved so-called saliency does for making effective use of reluctance torque, thus increasing the torque and efficiency and to increase the effect of flux-weakening control, thereby enlarging the operating range. In other words, an inductance (d-axis inductance) Ld corresponding to a magnetic flux flowing from outside through between magnetic poles of a rotor having different polarities needs to be smaller than an inductance (q-axis inductance) Lq corresponding to a magnetic flux flowing from outside bypassing the magnet.

Incidentally, in a radial gap type motor, a so-called embedded magnet type rotor with magnets embedded in a rotor iron core has been presented. FIG. 65 is a perspective view illustrating the structure of such embedded magnet type rotor 900. A rotor iron core 91 is provided with embedding trenches 92, in each of which a permanent magnet 93 is embedded. A mode is illustrated here in which four magnets 93 are embedded around a shaft hole 94 through which a rotation shaft is inserted. Adjacent permanent magnets 93 have magnetic poles different in polarity from each other being directed toward the outer surface of the rotor 900.

One of the causes of increased q-axis inductance Lq in the rotor 900 is the presence of a magnetic path 95 passing through a portion of the rotor iron core 91 appearing as a projection 91c present between edges of adjacent magnets 93 and interposed between the trenches 92 and a portion appearing as an inner portion 91a around the shaft hole 94 surrounded by the magnets 93 from outside. The magnetic path 95 is to be a path along which a magnetic flux supplied from a stator (not shown) passing through the outer surface of the rotor 900 flows bypassing the magnets 93. The magnetic path which bypasses magnets between the magnets in this manner will hereinafter be called a first type magnetic path.

Further, another one of the causes of increased q-axis inductance Lq is the presence of a magnetic path 96 passing through a portion of the rotor iron core 91 appearing as an outer portion 91b outside a magnet 93. The magnetic path 96 is also to be a path along which a magnetic flux supplied from the stator flows bypassing the magnets 93. The magnetic path which bypasses magnets closer to the stator than the magnets as viewed from the stator in this manner will hereinafter be called a second type magnetic path.

Therefore, providing the first type magnetic path and second type magnetic path in the rotor of an axial gap type motor can make the q-axis inductance larger than the d-axis inductance and increase anti-saliency.

To provide the first type magnetic path in the rotor of the axial gap type motor, it is useful that a magnetic member is disposed on almost the same plane as the magnets. At this time, the magnetic member may cover the shaft hole, but in that case, it is desirable to use devices such that the rotation shaft to be inserted into the shaft hole does not serve as a magnetic path, similarly to the rotor of a typical radial gap type motor.

To provide the second type magnetic path in the rotor of the axial gap type motor, it is useful that the magnetic poles directed toward the rotor are each covered with a magnetically independent magnetic member. This case is inferior to the case of providing the first type magnetic path in terms of increased axial gaps, but facilitates reduction of demagnetized fields in the magnets and suppression of the occurrence of eddy current within the magnets, as will be described later, by thinking out its configuration.

Employment of such rotor having anti-saliency for the motor permits effective use of the reluctance torque, which increases torque and efficiency. Further, the effect of flux-weakening control is increased to enlarge the operating range.

To utilize the reluctance torque, it is desirable that the stator employed for the motor along with the rotor have salient poles made of magnetic member, e.g., teeth.

Providing the first type magnetic path and second type magnetic path in the rotor of the axial gap type motor offers an advantage in that the magnet torque and reluctance torque can both be designed larger than in the rotor of the radial gap type motor. The reason will be described below.

In the rotor of the radial gap type motor, the first type magnetic path 95 and second type magnetic path 96 are disposed alternately on its cylindrical surface. And the first type magnetic path 95 is present between embedded magnets 93 bypassing the magnets 93.

Therefore, as the position where the magnets 93 are embedded is made closer to the center of rotation in order to increase the cross-sectional area of the second type magnetic path 96, the cross-sectional area of the first type magnetic path 95 decreases. Conversely, to increase the cross-sectional area of the second type magnetic path 96 without losing the cross-sectional area of the first type magnetic path 95, the magnetic pole width (a dimension of the magnetic pole in cross section perpendicular to the rotation shaft, rather than the thickness of the magnet) of the magnets 93 must be narrowed while making the position where the magnets 93 are embedded closer to the center of rotation. This also applies similarly when the cylindrical surface of the rotor of the radial gap type motor increases in external shape. This is because the minimum value of the magnetic path width of the first type magnetic path 95 is almost determined in the positions where the magnets 93 are embedded. And, narrowing the magnetic pole width of the magnets 93 in this manner results in reduction of magnet torque.

In contrast, in the rotor of the axial gap type motor, the second type magnetic path is achieved by magnetic members covering the magnetic poles directed toward the stator, and its cross-sectional area is grasped in cross section along the circumferential direction. The thickness of this magnetic member can thus be increased irrespective of the size of magnets, and there is no need to vary the size and position of magnets in design for increasing the cross-sectional area of the second type magnetic path. Therefore, the cross-sectional area of the first type magnetic path (which is grasped in cross section perpendicular to the rotation shaft) achieved by magnetic members disposed on almost the same plane as the magnets is not decreased. It is therefore possible to increase the cross-sectional area of the second type magnetic path without reducing the magnet torque or losing the cross-sectional area of the first type magnetic path.

Further, even when reduced in thickness in the direction of the rotation shaft, the rotor of the axial gap type motor can be increased in outer shape to increase the area of magnetic poles, so that the magnet torque and reluctance torque can both be increased.

Furthermore, in the rotor of the axial gap type motor, the surface opposed to the gaps is a plane, which makes it easy to increase the processing accuracy and assembling accuracy. In addition, even when the second type magnetic path cannot be provided or the magnetic materials achieving this path have a small thickness, the magnets can easily be processed and have high dimensional accuracy since the pole face of a magnet is a plane.

First Embodiment

Figure 2:
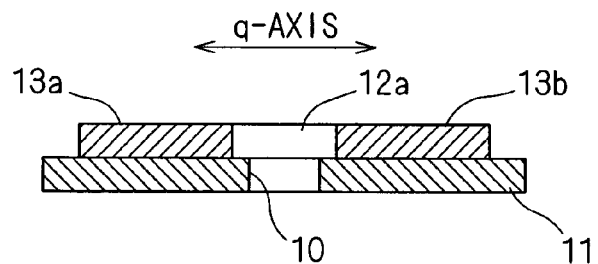
FIG. 2 is a sectional arrowed view in a position II-II in FIG. 1.
Figure 3:
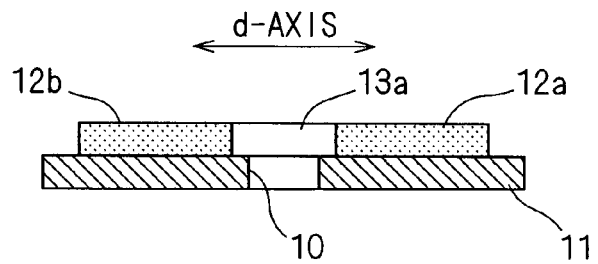
FIG. 3 is a sectional arrowed view in a position III-III in FIG. 1.

FIG. 1 is a diagram illustrating the structure of a rotor 1A according to a first embodiment of the present invention, which is a plan view as viewed from the side of a stator (not shown) in the case of constituting a motor along with the stator. FIGS. 2 and 3 are sectional arrowed views in positions II-II and respectively.

The rotor 1A includes magnets 12a and 12b, magnetic members 13a and 13b and a substrate 11 on which they are mounted. That is, the rotor 1A can be employed as a rotor with one pole pair (the number of poles: 2). The substrate 11 is also provided with a shaft hole 10 at its center.

The plurality of magnets 12a and 12b are disposed annularly around the shaft hole 10 with their polarities being symmetric, and their pole faces are perpendicular to the direction of the rotation shaft (this is the direction in which the rotation shaft to be inserted into the shaft hole 10 extends and parallel to the direction perpendicular to the sheet of drawing of FIG. 1). The magnet 12a has a pole face exhibiting a first polarity on one side of the rotation shaft (on this side of the sheet of drawing of FIG. 1), and the magnet 12b has a pole face exhibiting a second polarity on the one side of the rotation shaft. Herein, the magnets 12a and 12b are assumed, for example, to exhibit N and S poles, respectively, on the side of the stator (on this side of the sheet of drawing of FIG. 1). The magnets 12a and 12b are made of rare-earth sintered magnets, for example.

The plurality of magnetic members 13a and 13b are disposed perpendicularly to the direction of the rotation shaft, more specifically, extending between the magnets 12a and 12b. The magnetic members 13a and 13b are made of, for example, a high permeable magnetic material such as iron, dust core, or the like. However, it is desirable to employ iron dust core in terms of reducing iron loss.

In the rotor 1A, the d-axis direction is the direction connecting the magnets 12a and 12b, and almost in parallel to a phantom line showing the position (FIG. 3). On the other hand, the q-axis direction is the direction connecting the magnetic members 13a and 13b, and almost in parallel to a phantom line showing the position II-II (FIG. 2).

In such structure, the magnetic path bypassing the magnets 12a and 12b and passing through the magnetic members 13a and 13b is a magnetic path in the q-axis direction, and the magnetic path passing through the magnets 12a and 12b is a magnetic path in the d-axis direction. And, these magnetic paths are perpendicular to each other when viewed as electric angles. Accordingly, in the present embodiment, the first type magnetic path is achieved by the magnetic members 13a and 13b. Therefore, the q-axis inductance can be increased, and anti-saliency can be improved. Further, size reduction in the axial direction is easy.

It is desirable that surfaces of the magnets 12a and 12b and magnetic members 13a and 13b on the side of the stator be positioned on the same plane. This is because, when the magnetic members 13a and 13b have small thickness, the q-axis inductance cannot be increased, and on the other hand, when the surfaces of the magnetic members 13a and 13b on the side of the stator extend farther to the side of the stator than the pole faces of the magnets 12a and 12b, the distance between the pole face of the rotor and pole face of the stator (hereinafter this will be provisionally called "interposed distance to armature") increases.

In the present embodiment, it is desirable that gaps G1 serving as magnetic barriers for blocking the flow of magnetic fluxes be provided between the magnets 12a, 12b and the magnetic members 13a, 13b. It is to prevent magnetic fluxes from flowing between the pole faces of the magnets 12a and 12b through the magnetic members 13a and 13b. This reduces short circuit leakage of magnetic flux inside the rotor which is grasped as magnetic flux leakage with respect to the magnetic flux flowing between the stator and rotor. This allows the magnetic fluxes generated from the pole faces of the rotor to be supplied efficiently to the stator opposed to these pole faces.

A magnetic flux flows back and forth between the rotor and stator. And, a magnetic flux flows between the magnets 12a and 12b through two gaps G1 on the both edges of the magnetic member 13a or magnetic member 13b. Therefore, it is desirable that the width of gap G1 be chosen to be greater than the interposed distance to armature. This is to reduce a magnetic flux short circuit within the rotor by making the magnetic resistance between the magnets 12a and 12b through the magnetic member 13a (or magnetic member 13b) higher than the magnetic resistance between the stator and rotor.

Further, it is desirable that a gap G2 serving as a magnetic barrier for blocking the flow of magnetic flux be provided between the magnets 12a, 12b, magnetic members 13a, 13b and shaft hole 10. This is to prevent a short circuit from occurring in the magnetic flux between the magnets 12a and 12b even when the rotation shaft to be inserted into the shaft hole 10 is made of a magnetic material such as iron. Of course, there is no need to provide the gap G2 if the rotation shaft is non-magnetic steel.

It is desirable that the width of gap G2 be also chosen to be greater than the interposed distance to armature. This is because the magnetic flux passing through the rotation shaft between the magnets 12a and 12b crosses the gap G2 twice.

The substrate 11 may be a magnetic member. In this case, the substrate 11 serves as a yoke for backing the magnets 12a and 12b, a so-called back yoke. The provision of the back yoke avoids the magnetic flux from short circuiting between the pole face on the side of the stator and the magnetic pole on the opposite side in the magnet 12a (or magnet 12b) itself. The magnetic flux generated from the pole face on the side of the stator can thereby be supplied to the stator efficiently.

In the case where the substrate 11 is a magnetic member, the magnetic flux flows between the magnets 12a and 12b passing through the magnetic member 13a or magnetic member 13b, one gap G1 and substrate 11, so that it is desirable that the gap G1 be chosen to be not less than twice the interposed distance to armature. Similarly, it is desirable that the width of gap G2 be chosen to be not less than twice the interposed distance to armature.

Further, the magnetic resistance between the magnetic poles of the magnets 12a and 12b on the opposite side of the stator can be reduced. Accordingly, the permeance coefficient can be increased, which raises the operating point of the magnets 12a and 12b. This results in improved torque.

Figure 4:
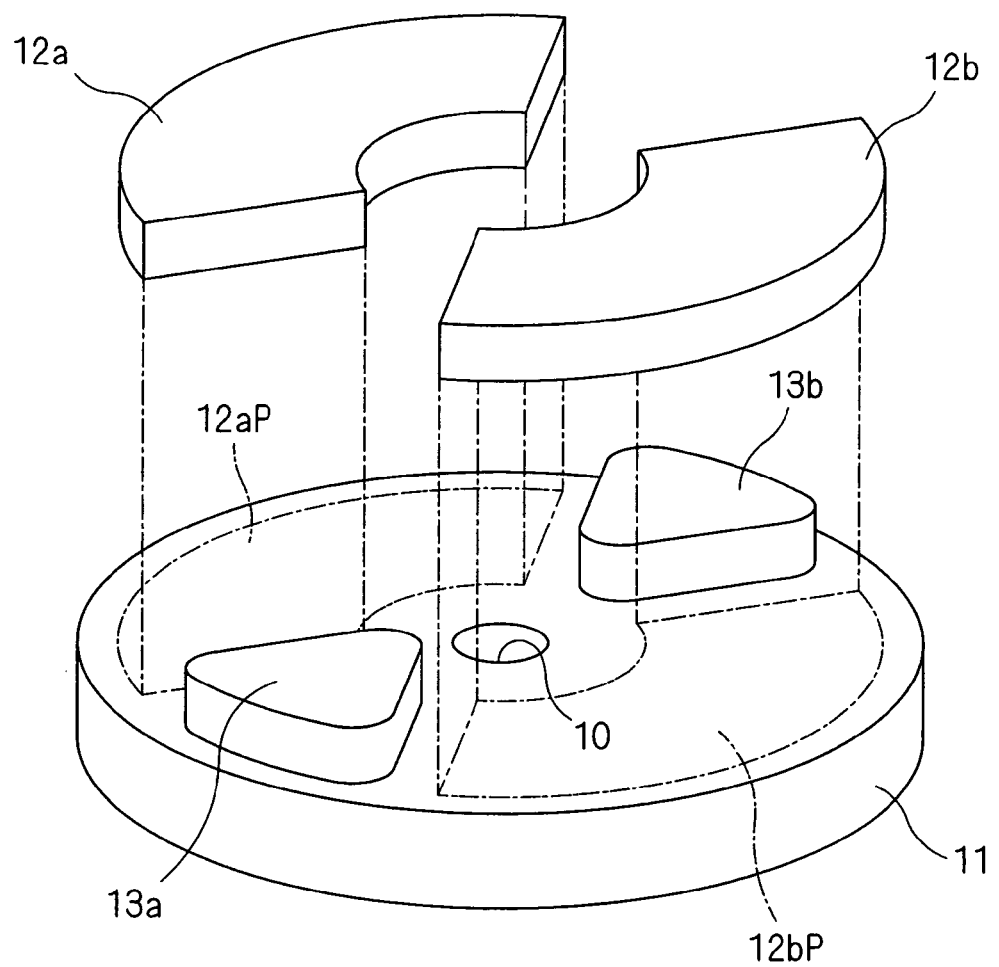
FIG. 4 is a perspective view illustrating a method of manufacturing the rotor 1A.

FIG. 4 is a perspective view illustrating a method of manufacturing the rotor 1A. The substrate 11 with the magnetic member 13a and magnetic member 13b mounted in predetermined positions is prepared. Then, the magnets 12a and 12b are mounted respectively in predetermined positions 12aP, 12bP between the magnetic member 13a and magnetic member 13b on the substrate 11. In the case where the substrate 11 also serves as a back yoke, the substrate 11, magnetic member 13a and magnetic member 13b may be formed integrally.

The magnets 12a and 12b may be fixed to the substrate 11 by an adhesive or the like, but may previously be formed integrally on the substrate 11 on the side where the magnetic members 13a and 13b are provided in the case of using a bonded magnet. In this case, the magnets 12a and 12b and magnetic members 13a and 13b come into intimate contact, so that the gaps G1 cannot be provided.

However, magnetizing with distribution of the magnetic flux density so as to be extremely low at the edges of the magnets 12a and 12b in the circumferential direction around the rotation shaft can provide a structure magnetically equivalent substantially to providing the gaps G1.

It is possible to previously form the substrate 11 and magnets 12a and 12b integrally by a bonded magnet. In this case, so-called polar anisotropic orientation may be employed.

Second Embodiment

Figure 5:
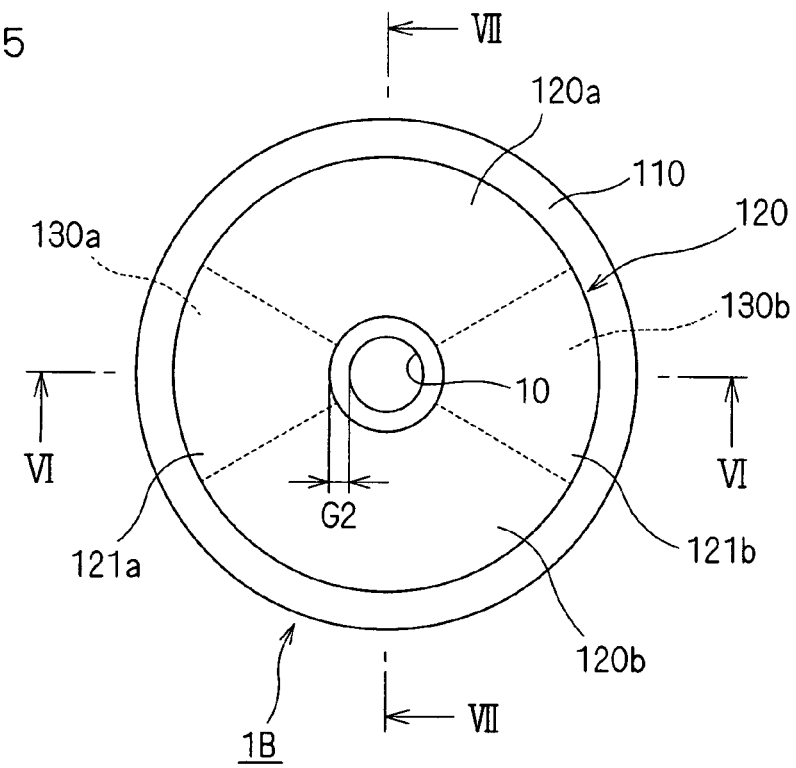
FIG. 5 is a diagram illustrating the structure of a rotor 1B according to a second embodiment of the present invention.
Figure 6:
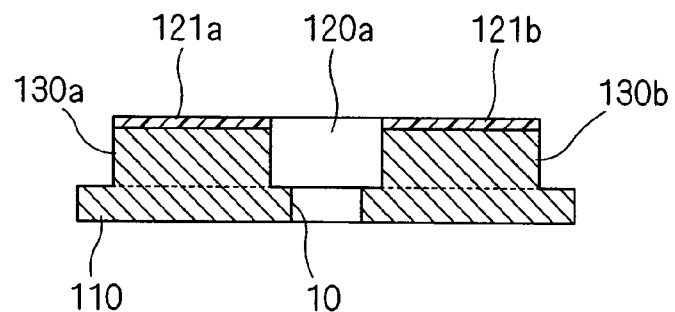
FIG. 6 is a sectional arrowed view in a position VI-VI in FIG. 5.
Figure 7:
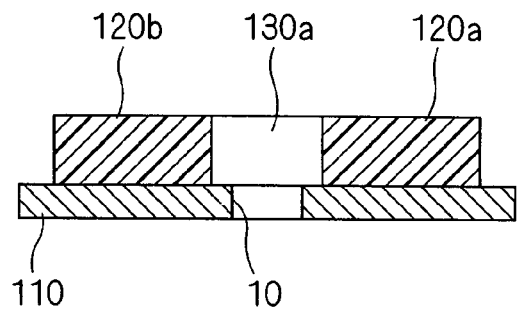
FIG. 7 is a sectional arrowed view in a position VII-VII in FIG. 5.

FIG. 5 is a diagram illustrating the structure of a rotor 1B according to a second embodiment of the present invention, which is a plan view as viewed from the side of a stator (not shown) in the case of constituting a motor along with the stator. FIGS. 6 and 7 are sectional arrowed views in positions VI-VI and VII-VII, respectively.

The rotor 1B includes magnets 120a, 120b, magnetic members 130a, 130b and a substrate 110 on which they are mounted. That is, the rotor 1B can also be employed as a rotor with one pole pair (the number of poles: 2). The substrate 110 is also provided with the shaft hole 10 at its center.

The substrate 110 and magnetic members 13a and 13b are formed integrally employing, for example, a high permeable magnetic material such as iron, iron dust core, or the like. That is, the substrate 110 also serves as a back yoke. It is desirable to employ iron dust core for the substrate 110 and magnetic members 130a and 130b both in terms of forming integrally and in terms of reducing iron loss.

The substrate 110 and magnetic members 130a and 130b are provided with a bonded magnet 120 from the side where the magnetic members 130a and 130b are provided, and the stator (not shown) is to be disposed on this side.

The bonded magnet 120 is formed to cover not only the portions interposed between the magnetic members 130a and 130b but also the magnetic members 130a and 130b. The bonded magnet 120 may be formed without covering these portions, but even if there exist portions 121a, 121b which cover the magnetic members 130a and 130b, respectively, these portions substantially serve as magnetic barriers having high magnetic resistance since they are thin.

The magnets 120a and 120b can be achieved by magnetizing the bonded magnet 120. Specifically, the portions interposed between the magnetic members 130a and 130b are magnetized, and the portions 121a, 121b are not magnetized substantially. The magnets 120a and 120b adjacent with the magnetic members 130a and 130b interposed therebetween are magnetized with different polarities.

Accordingly, the first type magnetic path is also achieved by the magnetic members 130a and 130b in the rotor 1B, similarly to the rotor 1A. Therefore, the q-axis inductance can be increased, and anti-saliency can be improved.

Figure 8:
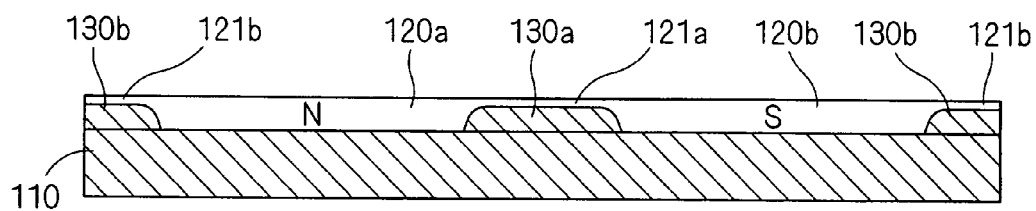
FIG. 8 is a developed view in which the structure of the rotor 1B is developed in the circumferential direction.

FIG. 8 is a developed view in which the structure of the rotor 1B is developed in the circumferential direction. In the drawing, the upper side is the side of the stator, and symbols "N" and "S" respectively indicate polarities exhibited by the pole faces of the magnets 120a and 120b on the side of the stator.

Magnetization with such polarities prevents the bonded magnet 120 positioned at the border between the magnets 120a and 120b, i.e., the portions 121a and 121b covering the magnetic members 130a, 130b from being magnetized substantially, which serve as magnetic barriers between the magnets 120a and 120b. This is because the material for bonded magnet generally has a low permeability, and the portions 121a and 121b can be formed thin.

The permeance coefficient can further be increased since the employment of such structure increases the degree of contact between the magnets 120a and 120b and substrate 110 serving as a yoke in the rotor 1B. Further, the rotor 1B can be formed with improved adhesion between magnets and substrate without separately bonding the magnets to the substrate.

The bonded magnet is a mixture of a binder such as resin and magnet dust, and thus has a high electric resistance, which can extremely reduce the eddy-current loss as compared to the case of employing a sintered rare-earth magnet. Of course, a rare-earth magnet may be employed as the magnet dust, and in that case, the magnetic flux density generated by the rotor can be increased.

Figure 9:
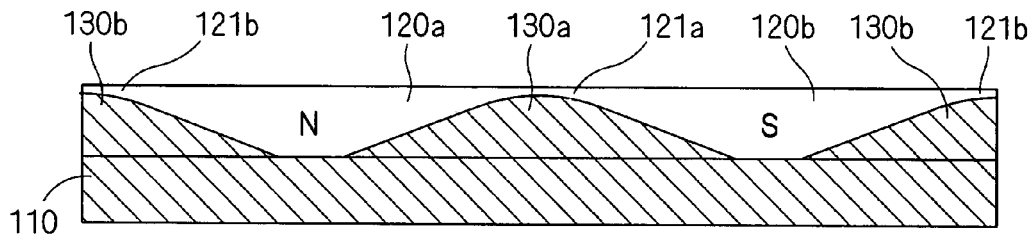
FIG. 9 is a developed view in which a modified structure of the rotor 1B is developed in the circumferential direction.

FIG. 9 is a developed view showing a modification of the present embodiment in which a modified structure of the rotor 1B is developed in the circumferential direction. In this structure, the magnetic members 130a and 130b have their surfaces vary sinusoidally in the circumferential direction. More specifically, a sine wave appears at the same frequency as the number of poles (1, here) of the rotor per cycle.

Forming the bonded magnet 120 on such substrate 110 and magnetic members 130a and 130b facilitates control of the magnetic flux supplied from the rotor 1B sinusoidally around the rotation shaft, thus allowing the cogging torque to be reduced.

The use of the bonded magnet 120 increases the flexibility in shape of the magnets 120a and 120b, which facilitates control of the distribution of magnetic flux supplied from the rotor 1B as in the modification shown in FIG. 9.

Figure 10:
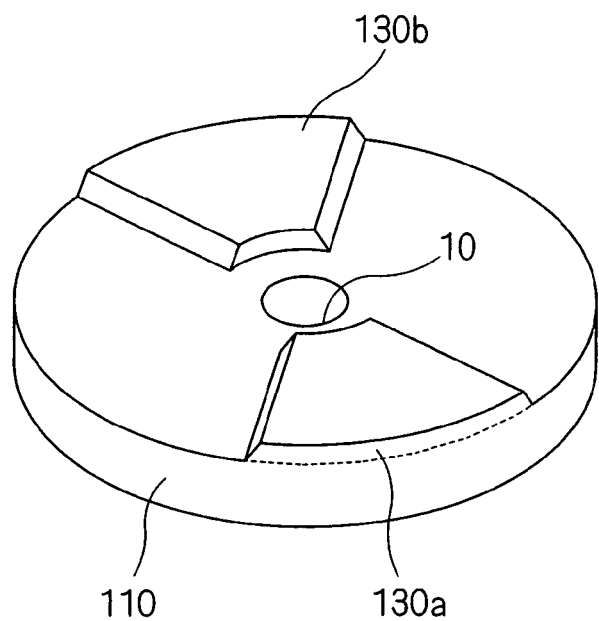
FIG. 10 and 11 are perspective views each illustrating a method of manufacturing the rotor 1B.
Figure 11:
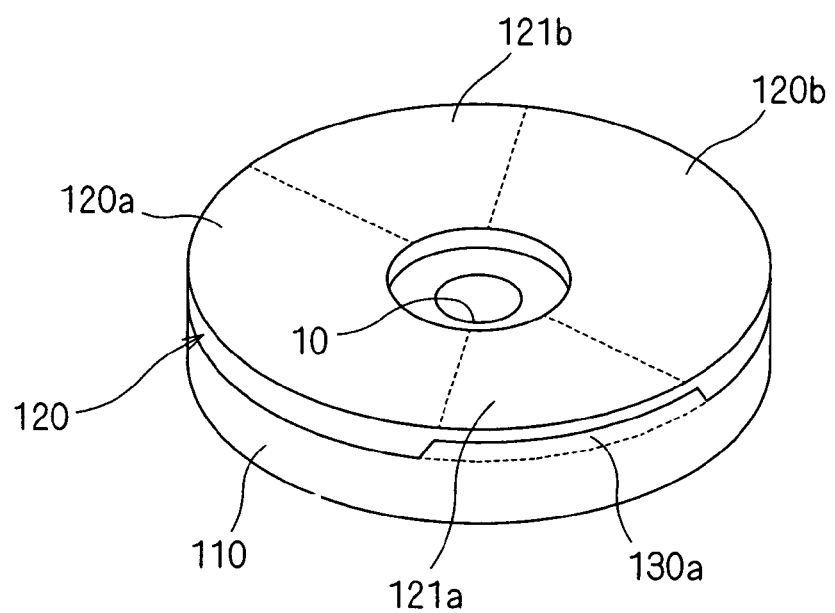

FIGS. 10 and 11 are perspective views illustrating a method of manufacturing the rotor 1B. The substrate 110 with the magnetic members 130a and 130b mounted in predetermined positions is prepared (FIG. 10). Then, the bonded magnet 120 is formed on top of these members (FIG. 11). To optimize the interposed distance to armature, it is desirable to planarize the surface of the bonded magnet 120 on the side of the stator. The bonded magnet 120 may or may not be subjected to magnetic field orientation at the time of molding, and is easily magnetized anytime after molding to obtain the magnets 120a and 120b. When performing magnetic field orientation at the time of molding, it is also easy to give an optimized magnetic distribution in order to reduce vibrations and noise.

Further, by providing wedge-like projections or recesses in the substrate and applying the bonded magnet to cover or fill the portions, the bonded magnet and substrate are less likely to be separated.

If the bonded magnet 120 is present outside the magnets 130a and 130b, the bonded magnet 120 is formed thick on the substrate 110 at that portion. Therefore, to make an unmagnetized portion thin, it is desirable to coincide the outer edges of the magnetic members 130a and 130b with the outer edge of the bonded magnet 120. To achieve this simply, it is desirable to coincide the outer edges of the magnetic members 130a and 130b with the outer edge of the substrate 110. FIG. 10 illustrates the case where the outer edges of the magnetic members 130a and 130b coincide with the outer edge of the substrate 110.

In the rotor 1B, it is desirable that the gap 2G be provided around the shaft hole 10 adjacent to the magnets 120a, 120b and magnetic members 130a, 130b, similarly to the rotor 1A.

Third Embodiment

Figure 12:
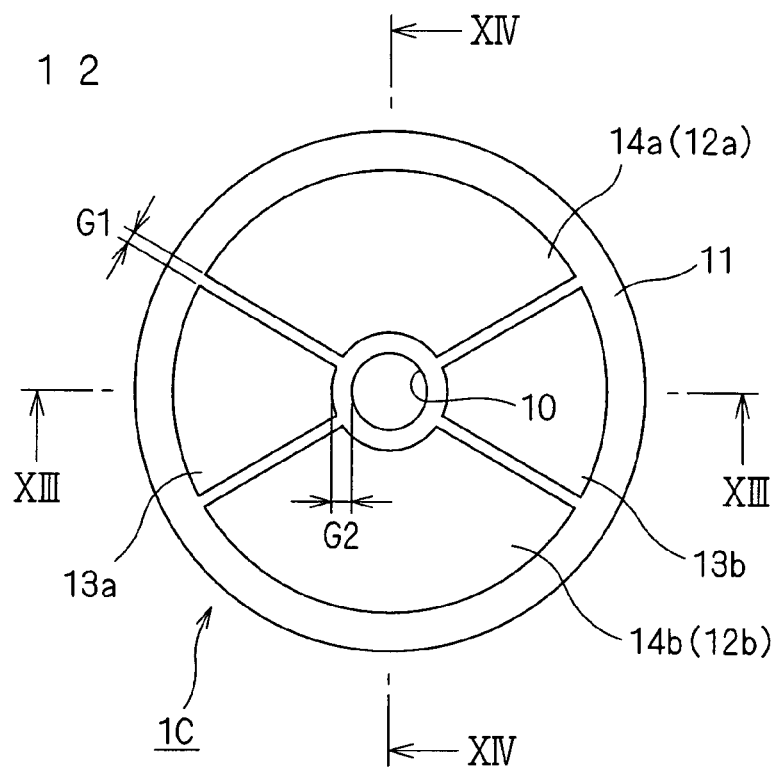
FIG. 12 is a diagram illustrating the structure of a rotor 1C according to a third embodiment of the present invention.
Figure 13:
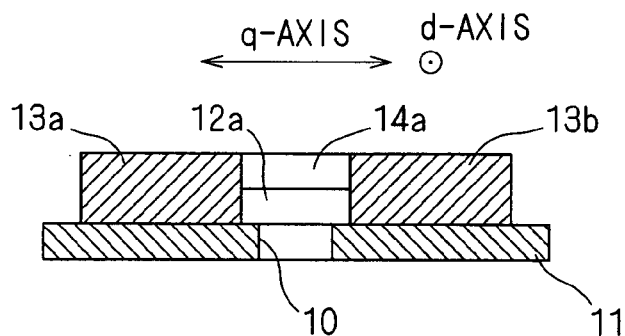
FIG. 13 is a sectional arrowed view in a position XIII-XIII in FIG. 13.
Figure 14:
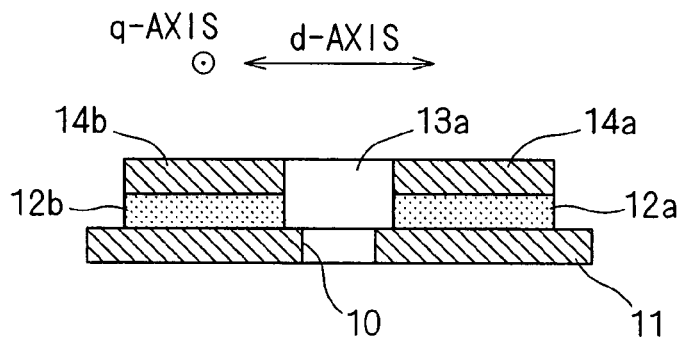
FIG. 14 is a sectional arrowed view in a position XIV-XIV in FIG. 13.

FIG. 12 is a diagram illustrating the structure of a rotor 1C according to a third embodiment of the present invention, which is a plan view as viewed from the side of a stator (not shown) in the case of constituting a motor along with the stator. FIGS. 13 and 14 are sectional arrowed views in positions XIII-XIII and XIV-XIV, respectively. The rotor 1C has a structure in which magnetic members 14a and 14b provided magnetically independently are individually mounted on the pole faces of the magnets 12a and 12b for coverage in the rotor 1A (FIGS. 1 to 3) shown in the first embodiment. Illustrated here is the case where the magnetic members 14a and 14b are of the same type as the magnets 12a and 12b. Since FIG. 12 is a plan view as viewed from the side of the stator, the symbols 14a (12a) and 14b (12b) indicate that the magnets 12a and 12b are hidden by the magnetic members 14a, 14b. The pole face of the rotor 1C serves as the surfaces of the magnetic members 14a and 14b on the side of the stator.

In the rotor 1C, the first type magnetic path is formed by the magnetic members 13a and 13b similarly to the rotor 1A, and in addition, the second type magnetic path is formed by the magnetic members 14a and 14b provided closer to the side of the stator than the magnets 12a and 12b. That is, the presence of the magnetic members 14a and 14b in the d-axis direction as shown in FIG. 14 can further increase the q-axis inductance as compared to the rotor 1A.

Figure 15:
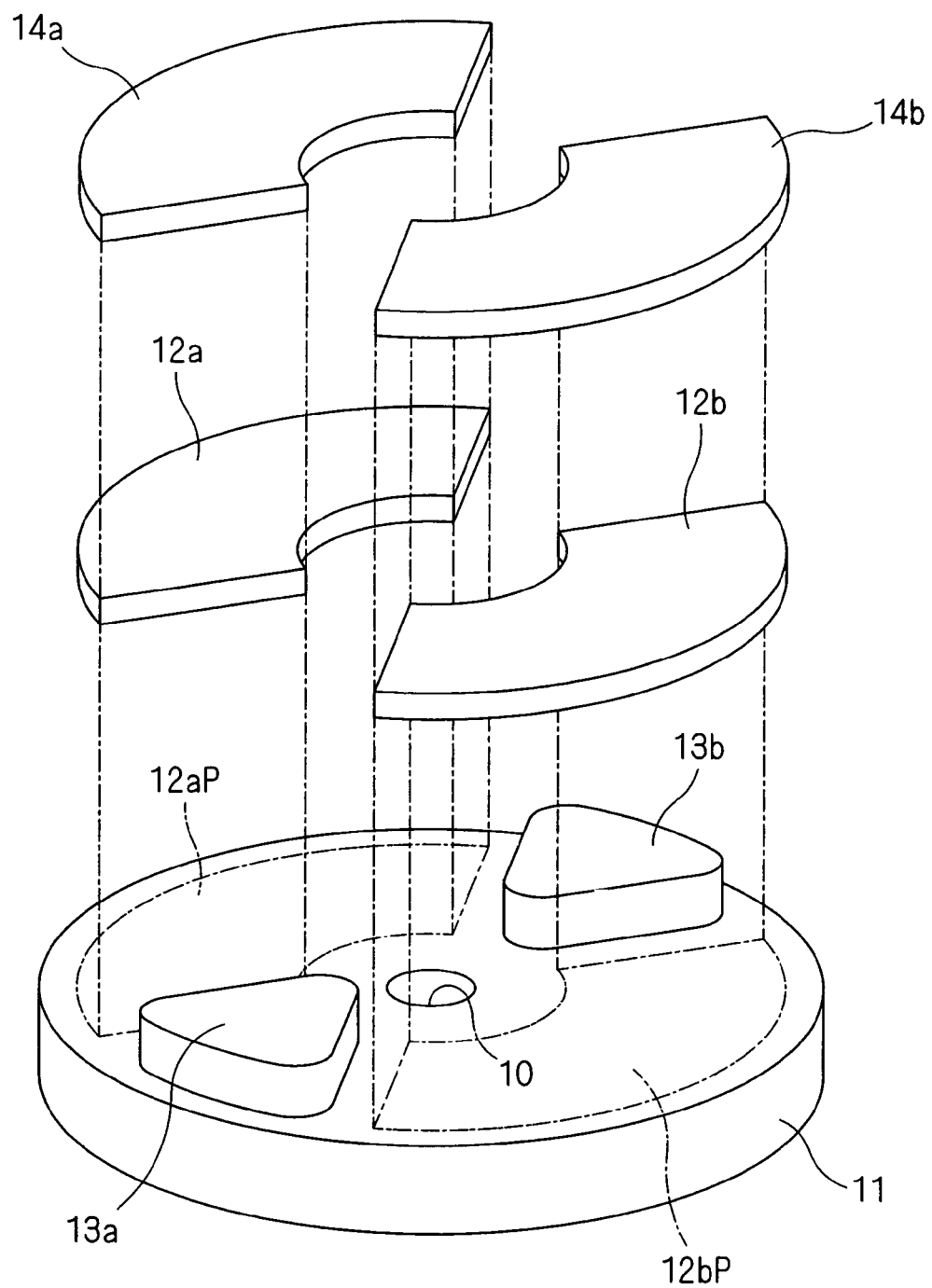
FIG. 15 is a perspective view illustrating a method of manufacturing the rotor 1C.
Figure 16:
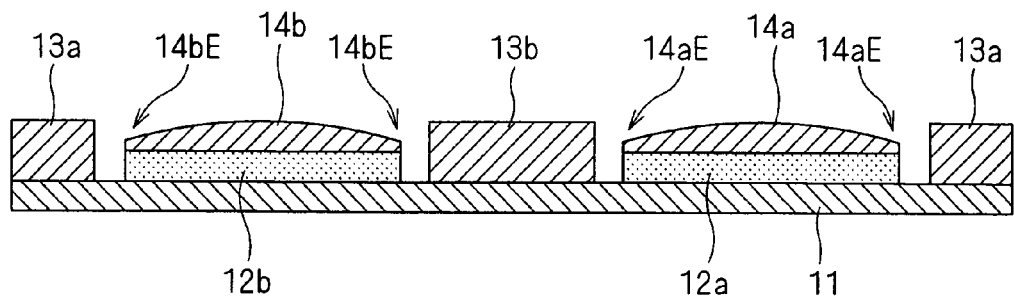
FIG. 16 to 19 are developed views in each of which a modification of the rotor 1C is developed in the circumferential direction.

The rotor 1C can be manufactured similarly to the rotor 1A, and the magnetic members 14a and 14b are mounted on the magnets 12a and 12b, respectively. FIG. 15 is a perspective view illustrating a method of manufacturing the rotor 1C to be manufactured in this manner. While the shape of the magnetic members 13a and 13b shown in FIG. 15 is slightly different from the magnetic members 13a and 13b shown in FIG. 12, no particular description for distinction is not made here. This also applies to other embodiments.

The substrate 11 may be made of a magnetic member, and may be provided with the function as a back yoke for the magnets 12a and 12b.

Here, the thickness of magnetic member 13a, the thickness of magnetic member 13b, the sum of thicknesses of magnetic member 14a and magnet 12a, and the sum of thicknesses of magnetic member 14b and magnet 12b are chosen to be equal to one another. Provision of the magnetic members 14a and 14b in the rotor 1C on the side of the stator in this manner has the disadvantage of difficulty in reducing the size of the motor in the axial direction, but facilitates device for reducing the cogging torque and device for obtaining skews, as will be described below.

Further, the arrangement of the magnetic members 14a and 14b closer to the side of the stator than the magnets 12a and 12b makes an eddy current, if occurred, to be more likely to occur in the magnetic members 14a and 14b, and prevents the occurrence of eddy current inside the magnets 12a and 12b. This is particularly advantageous in the case of employing a material of low electric resistance, e.g., a sintered rare-earth magnet for the magnets 12a and 12b. This is because it is possible to suppress reduction in efficiency due to heat generation of magnets and increase in iron loss. In other words, the rotor of high magnetic flux density can be obtained employing a sintered rare-earth magnet for the magnets 12a and 12b without concern about the occurrence of eddy current.

Of course, employing a material of low iron loss, e.g., iron, for the magnetic members 14a and 14b present in positions where eddy current is likely to occur permits reduction in eddy-current loss.

Such advantage is particularly suitable for the case of employing the rotor 1C in a motor driven by a PWM inverter. This is because current flown into the motor by the PWM inverter has a high frequency, and an eddy current is likely to occur near the surface of magnetic members because of the skin effect.

FIGS. 16 to 19 are all developed views in which various modifications of the rotor 1C are developed in the circumferential direction. In the drawing, the upper side is the side of the stator. In the first modification shown in FIG. 16, the magnetic members 14a and 14b have a drum shape that projects toward the stator, and an edge 14aE of the magnetic member 14a in the circumferential direction and an edge 14bE of the magnetic member 14b in the circumferential direction are thinner than the central portions of the magnetic members 14a and 14b. The cogging torque can thereby be reduced, similarly to the device that the tip of the teeth of the stator retracts from the rotor in a radial gap type motor.

Figure 17:
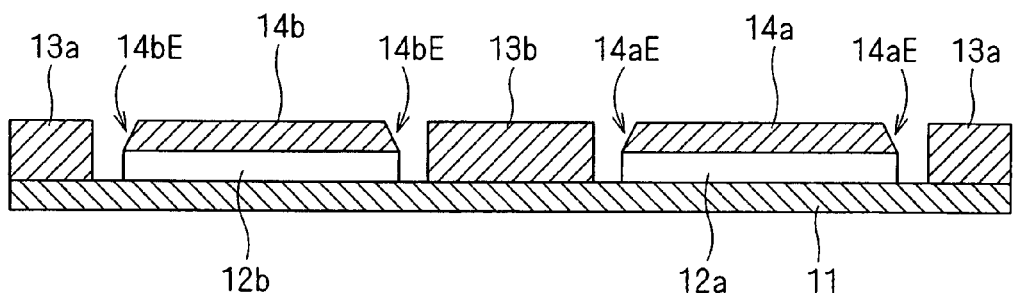

Further, as in the second modification shown in FIG. 17, the edges 14aE and 14bE may be beveled to be thinner than the central portions of the magnetic members 14a and 14b.

Figure 18:
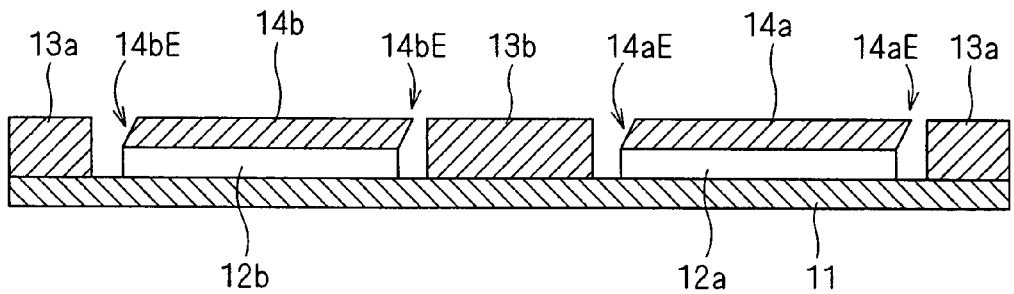

Alternatively, as in the third modification shown in FIG. 18, inclining the side faces of the edges 14aE and 14bE toward the direction of thickness (direction of rotation shaft) in the circumferential direction with respect to the axial direction further allows skews to be obtained.

Figure 19:
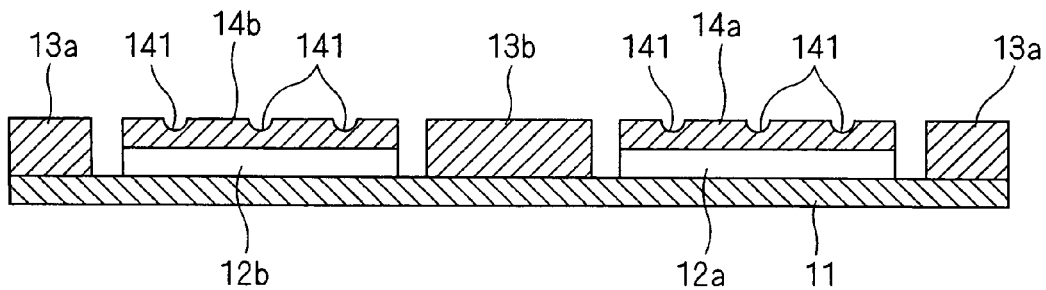

In the fourth modification shown in FIG. 19, so-called supplemental grooves 141 are provided on the surfaces of the magnetic members 14a and 14b on the side of the stator in the radial direction. The supplemental grooves 141 can shorten and reduce the cycle of cogging torque, similarly to supplemental grooves provided in the axial direction on the teeth surface of a stator in a radial gap type motor.

In the rotor 1C and the above-described modifications, it is desirable to provide the gaps G1 and G2, similarly to the rotor 1A. While the magnetic members 14a and 14b do not always need to be of the same type as the magnets 12a and 12b, the dimensional relationship between magnets and magnetic members forming the second type magnetic path will be described in a subsequent embodiment.

Fourth Embodiment

While the third embodiment has described the case where both the first type magnetic path and second type magnetic path are present, it is possible to form the second type magnetic path only. When such mode is to be achieved by an embedded magnet type rotor of a radial gap type motor, the structure will rather become complicated.

Figure 20:
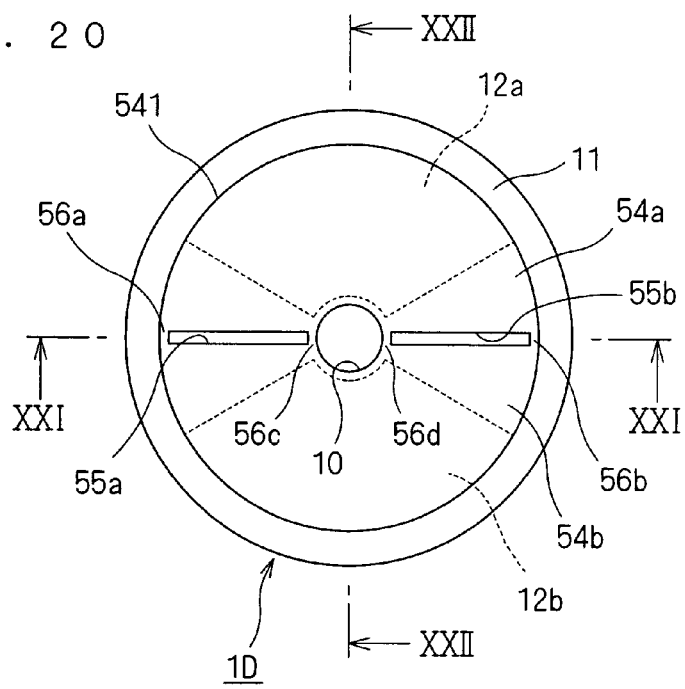
FIG. 20 is a diagram illustrating the structure of a rotor 1D according to a fourth embodiment of the present invention.
Figure 21:
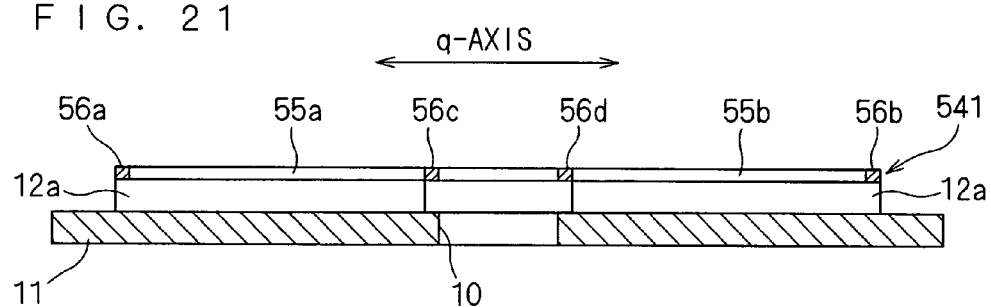
FIG. 21 is a sectional arrowed view in a position XXI-XXI in FIG. 20.
Figure 22:
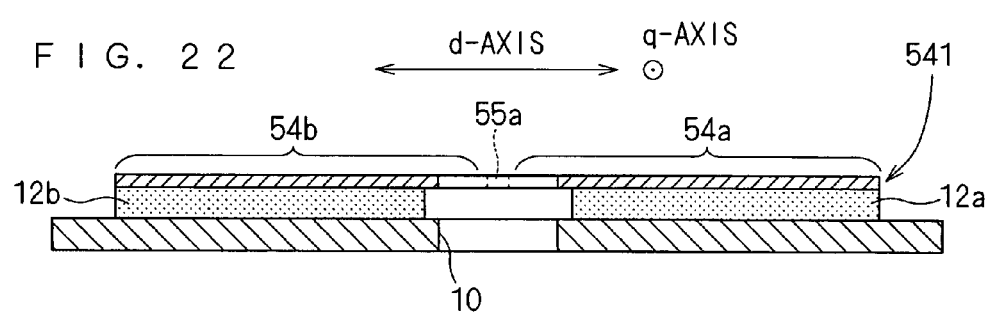
FIG. 22 is a sectional arrowed view in a position XXII-XXII in FIG. 20.

FIG. 20 is a diagram illustrating the structure of a rotor 1D according to a fourth embodiment of the present invention, which is a plan view as viewed from the side of a stator (not shown) in the case of constituting a motor along with the stator. FIGS. 21 and 22 are sectional arrowed views in positions XXI-XXI and XXII-XXII, respectively. The rotor 1D has a structure in which the magnetic members 13a and 13b are omitted from the rotor 1A (FIGS. 1 to 3) shown in the first embodiment, and a magnetic plate 541 mounted on the pole faces of the magnets 12a and 12b from the side of the stator to cover them is added.

The magnetic plate 541 has opening through slits 55a, 55b extending from positions close to the shaft hole 10 to farther positions. And, the magnetic plate 541 divided by the slits 55a and 55b in the circumferential direction around the shaft hole 10 serves as magnetic members 54a and 54b, respectively. The magnetic members 54a and 54b are connected to each other at the ends of the slits 55a and 55b on the outer peripheral side with thin portions 56a and 56b interposed therebetween and at the ends on the side of the shaft hole 10 with thin portions 56c and 56d interposed therebetween. The slits 55a and 55b are positioned between the magnets 12a and 12b in plan view, and prevent the magnetic flux from short circuiting. The pole face of the rotor 1D serves as the surfaces of the magnetic members 54a and 54b on the side of the stator.

With such structure, the magnetic members 54a and 54b can be obtained with less number of components than in the case of forming individually and separately like the magnetic members 14a and 14b of the rotor 1C (FIGS. 12 to 19) shown in the third embodiment, and the magnetic plate 541 can be increased in strength. Since the thin portions 56a to 56d are easy to become magnetically saturated, a short circuit of magnetic flux inside the rotor 1D is extremely small even when the magnetic members 54a and 54b are connected with these portions interposed therebetween.

And, the magnetic members 54a and 54b suppress the occurrence of eddy current inside the magnets 12a and 12b, similarly to the magnetic members 14a and 14b. Of course, employing a material of low iron loss, e.g., iron dust core, electromagnetic steel sheets stacked in a suitable direction or the like, for the magnetic plate 541 present in positions where eddy current is likely to occur permits reduction in eddy-current loss.

Further, the area of the magnetic members 54a and 54b covering the pole faces of the magnets 12a and 12b can easily be made larger than the area of the pole faces. Since the area of the pole faces is increased while reducing a short circuit of magnetic flux inside the rotor by the presence of the slits 55a and 55b, magnetic saturation inside the magnetic plate 541 can be reduced.

It is desirable that the width of the slits 55a and 55b in the circumferential direction be chosen to be not less than twice the interposed distance to armature. This is to make the magnetic resistance of the magnetic path passing between the magnets 12a and 12b through the magnetic members 54a and 54b higher than the magnetic resistance between the stator and rotor, thereby reducing the magnetic flux short circuit within the rotor.

Figure 23:
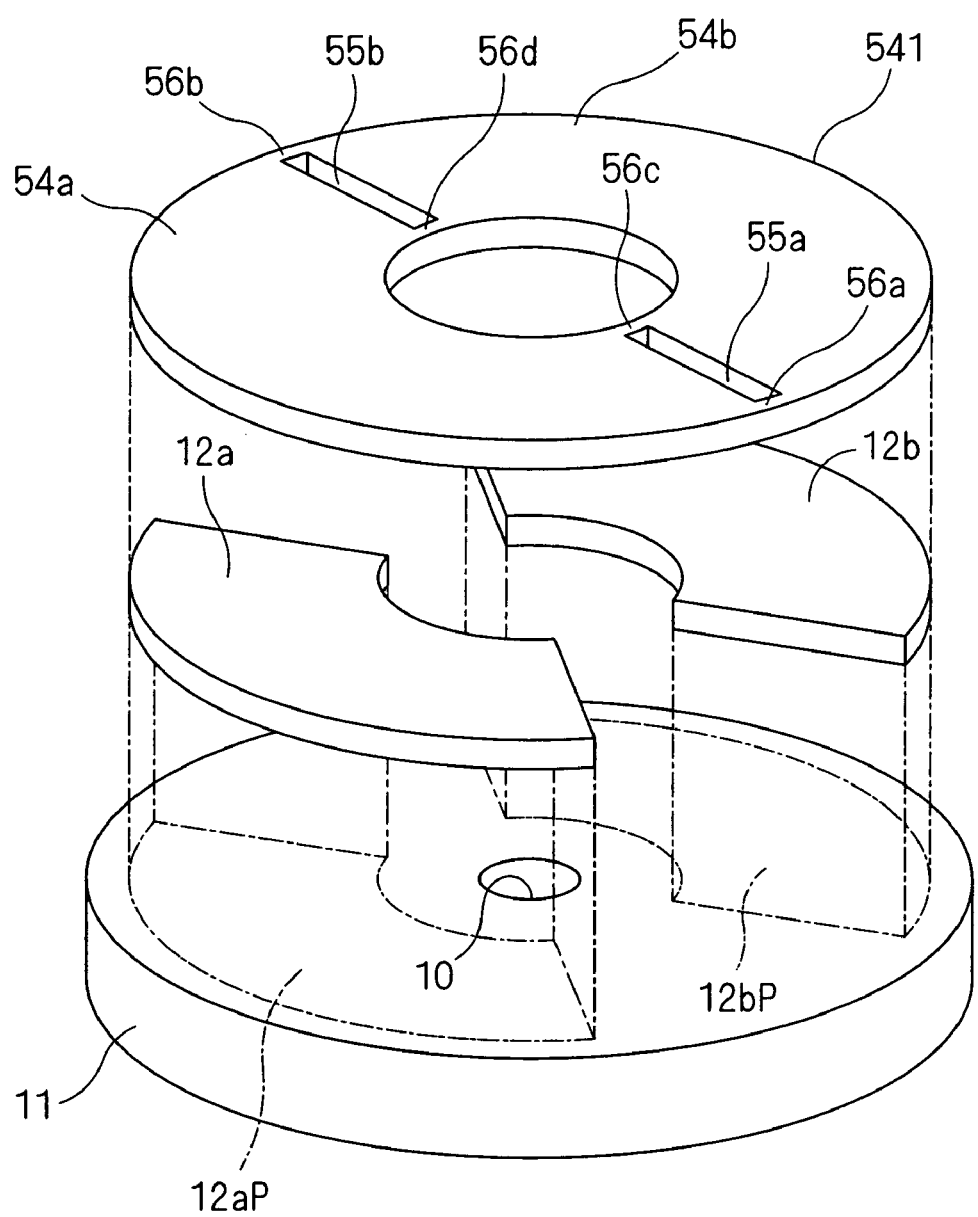
FIG. 23 is a perspective view illustrating a method of manufacturing the rotor 1D.

FIG. 23 is a perspective view illustrating a method of manufacturing the rotor 1D. The rotor 1D can be manufactured similarly to the rotor 1C. That is, the magnets 12a and 12b are mounted in the predetermined positions 12aP and 12bP on the substrate 11, respectively, and the magnetic plate 541 instead of the magnetic members 14a and 14b (FIG. 15) is mounted on the magnets 12a and 12b. The positions of the slits 55a and 55b at this time are as described above.

Of course, shape modifications as shown in FIGS. 16 to 19 in the third embodiment may be made in the magnetic members 54a and 54b.

Further, the magnets 12a and 12b may be formed integrally by a ring-like magnet. In that case, it is desirable to substantially unmagnetize in the vicinity of the positions where the slits 55a and 55b are provided in plan view. This mode also has advantages of easy manufacture and that the substrate 11 on which the magnets 12a and 12b are mounted can be omitted.

Unmagnetization substantially involves the case of being simply not magnetized, and in addition, also involves the case of being magnetized perpendicularly to the axial direction and not containing a magnetized component in the axial direction.

Further, the substrate 11 may be made of a magnetic member, and may be provided with the function as a back yoke for the magnets 12a and 12b. It is possible to previously form the substrate 11 and magnets 12a and 12b integrally by a bonded magnet. In this case, so-called polar anisotropic orientation may be employed.

In the case where the substrate 11 is made of a magnetic member, the magnetic field from the stator is likely to flow from the magnetic members 54a and 54b covering the pole face to the substrate 11 bypassing the magnets 12a and 12b, so that the magnets 12a and 12b are less likely to become demagnetized.

Fifth Embodiment

Figure 24:
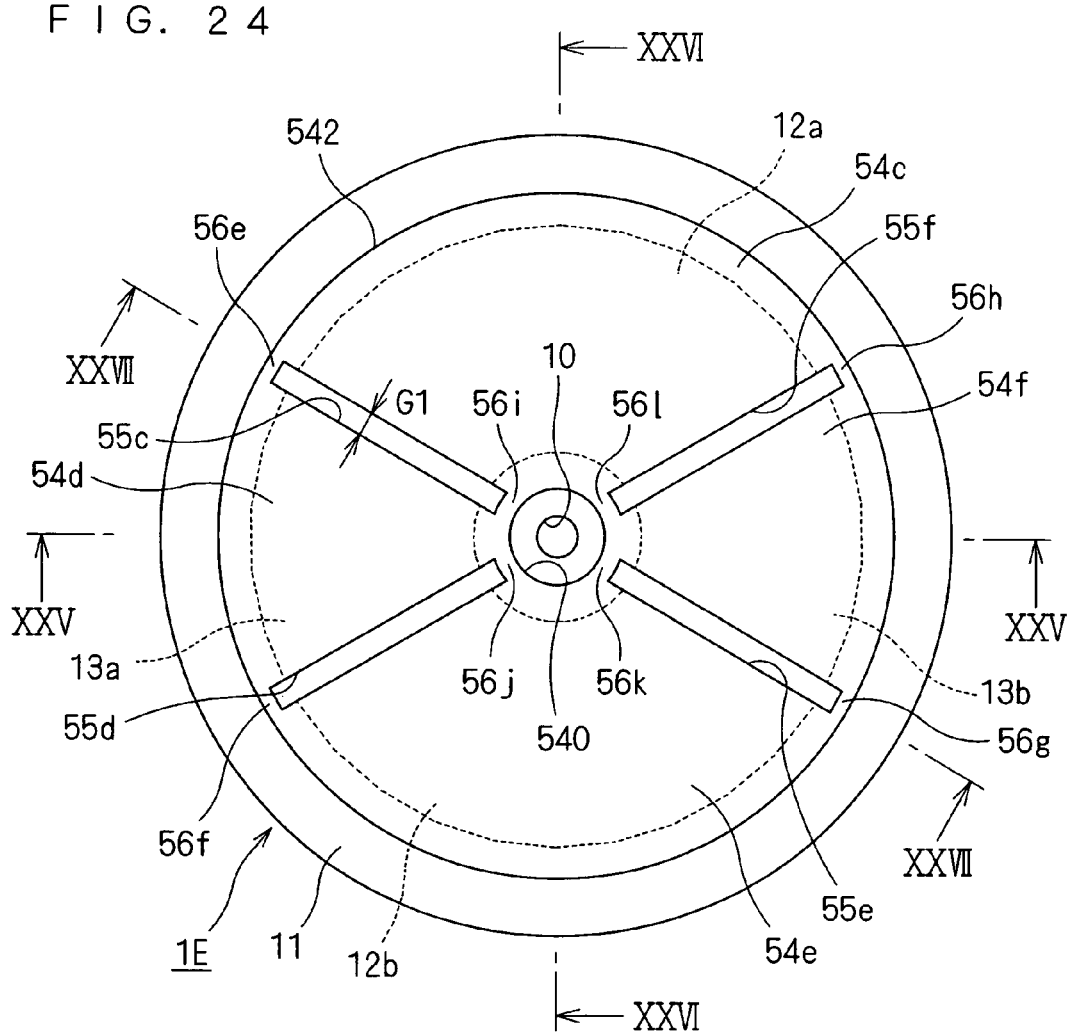
FIG. 24 is a diagram illustrating the structure of a rotor 1 E according to a fifth embodiment of the present invention.
Figure 25:
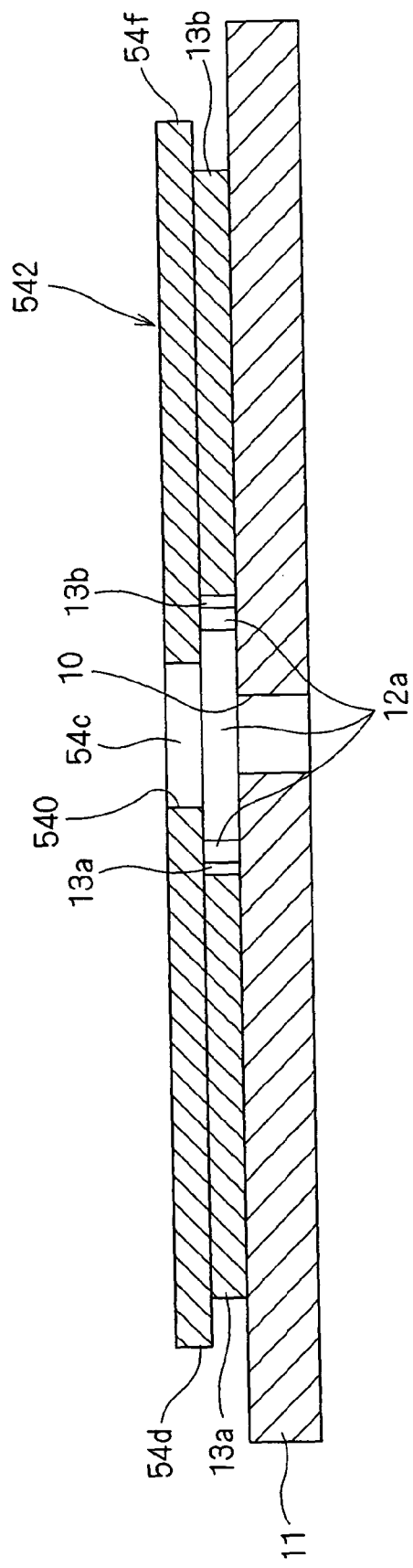
FIG. 25 is a sectional arrowed view in a position XXV-XXV in FIG. 24.
Figure 26:
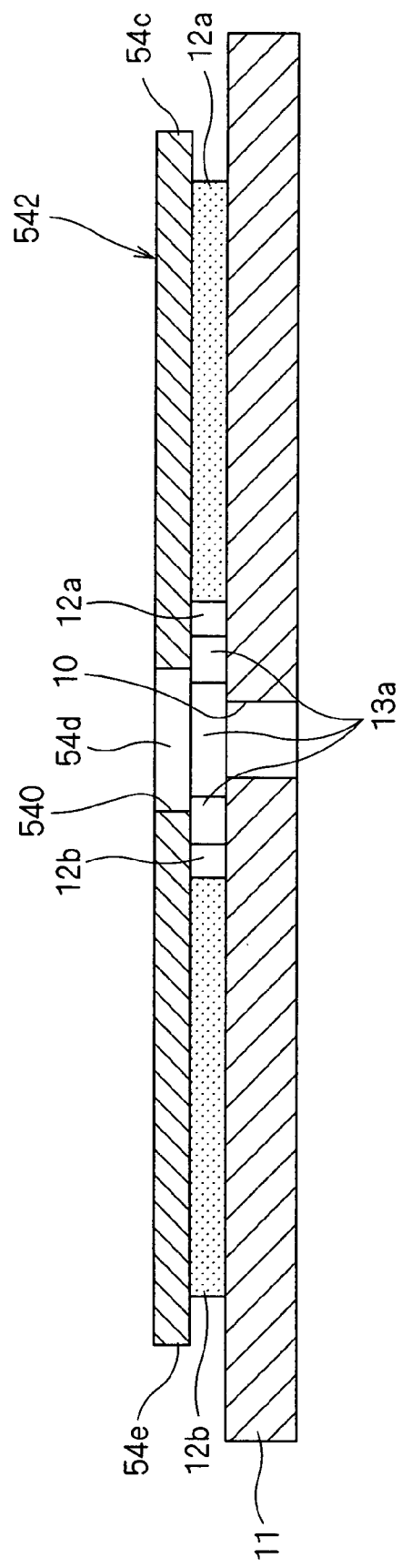
FIG. 26 is a sectional arrowed view in a position XXVI-XXVI in FIG. 24.
Figure 27:
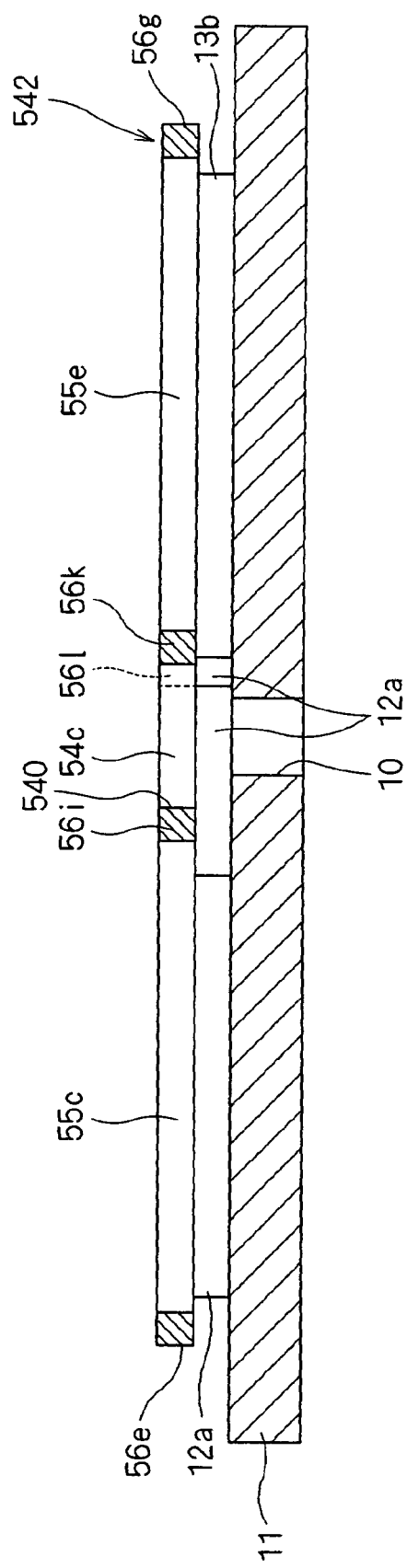
FIG. 27 is a sectional arrowed view in a position XXVII-XXVII in FIG. 24.

FIG. 24 is a diagram illustrating the structure of a rotor 1E according to a fifth embodiment of the present invention, which is a plan view as viewed from the side of a stator (not shown) in the case of constituting a motor along with the stator. FIGS. 25, 26 and 27 are sectional arrowed views in positions XXV-XXV, XXVI-XXVI and XXVII-XXVII, respectively. The rotor 1E has a structure in which other magnetic members 54c, 54e, 54d and 54f respectively mounted on the magnets 12a and 12b and magnetic members 13a and 13b from the side of the stator to cover them are added to the rotor 1A (FIGS. 1 to 3) shown in the first embodiment.

Specifically, a magnetic plate 542 mounted from the side of the stator on the magnets 12a and 12b and magnetic members 13a and 13b to cover them is provided. The magnetic plate 542 has a hole 540 larger than the shaft hole 10. And, the magnetic plate 542 has opening through slits 55c to 55f extending from positions close to the shaft hole 10 to farther positions, and the magnetic plate 542 divided by these slits in the circumferential direction serves as magnetic members 54c to 54f.

More specifically, in plan view, the slit 55c is positioned between the magnet 12a and magnetic member 13a, the slit 55d is positioned between the magnet 12b and magnetic member 13a, the slit 55e is positioned between the magnet 12b and magnetic member 13b, and the slit 55f is positioned between the magnet 12a and magnetic member 13b.

And, the magnetic plate 542 positioned between the slits 55c and 55d serves as the magnetic member 54d, the magnetic plate 542 positioned between the slits 55d and 55e serves as the magnetic member 54e, the magnetic plate 542 positioned between the slits 55e and 55f serves as the magnetic member 54f, and the magnetic plate 542 positioned between the slits 55f and 55c serves as the magnetic member 54c.

The magnetic members 54c and 54d are connected to each other at the end of the slit 55c on the outer peripheral side with a thin portion 56e interposed therebetween and at the end on the side of the shaft hole 10 with a thin portion 56i interposed therebetween, the magnetic members 54d, 54e are connected to each other at the end of the slit 55d on the outer peripheral side with a thin portion 56f interposed therebetween and at the end on the side of the shaft hole 10 with a thin portion 56j interposed therebetween, the magnetic members 54e, 54f are connected to each other at the end of the slit 55e on the outer peripheral side with a thin portion 56g interposed therebetween and at the end on the side of the shaft hole 10 with a thin portion 56k interposed therebetween, and the magnetic members 54f and 54c are connected to each other at the end of the slit 55c on the outer peripheral side with a thin portion 56h interposed therebetween and at the end on the side of the shaft hole 10 with a thin portion 56l interposed therebetween. The pole face of the rotor 1E serves as the surfaces of the magnetic members 54c and 54e on the side of the stator.

In another point of view, the magnetic members 54c and 54e covering the magnets 12a and 12b are connected to the magnetic members 54d and 54f covering the magnetic members 13a and 13b with the aforementioned thin portions interposed therebetween.

The slits 55c to 55f prevent the magnetic flux from flowing between the magnets 12a and 12b and magnetic members 13a and 13b in the magnetic plate 542. Since the thin portions 56e to 56l are easy to become magnetically saturated, a short circuit of magnetic flux inside the rotor 1E is extremely small even when the magnetic members 54c to 54f are connected to one another with these portions interposed therebetween.

It is desirable that the width of the slits 55c to 55f in the circumferential direction be chosen to be greater than the interposed distance to armature, unlike the case described in the fourth embodiment. This is because the magnetic path passing through the magnetic members 54c, 54d and 54e between the magnets 12a and 12b has two slits 55c and 55d.

While FIG. 24 illustrates the case of employing the width of the slits 55c to 55f in the circumferential direction equal to the gaps G1 in the circumferential direction positioned at the border between the magnets 12a and 12b and magnetic members 13a and 13b, both do not always need to be in agreement. The width of the slits 55c to 55f in the circumferential direction can be set larger when designing with a view to reducing the leakage flux within the rotor 1E, and smaller when designing with a view to obtaining the substantial pole faces of the magnets 12a and 12b widely.

With such structure, the magnetic inductance of the second type magnetic path can be made still larger, and anti-saliency can be improved. Further, the number of components can be less, and the magnetic plate 542 can be made stronger than in the case of forming the magnetic members 54c to 54f individually and separately. Of course, employing a material of low iron loss, e.g., iron dust core, electromagnetic steel sheets stacked in a suitable direction or the like, for the magnetic plate 542 present in the position where eddy current is likely to occur permits reduction in eddy-current loss.

Figure 28:
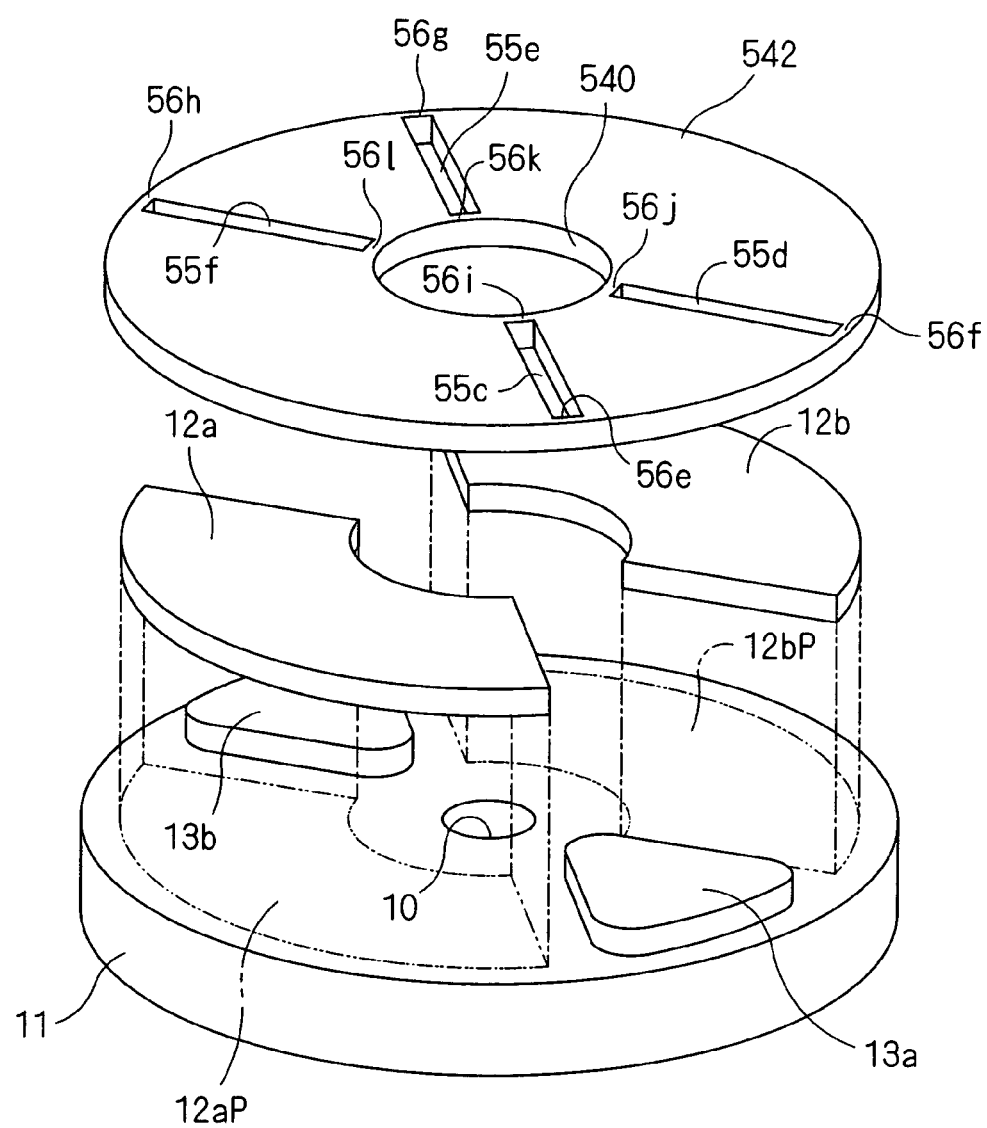
FIG. 28 is a perspective view illustrating a method of manufacturing the rotor 1E.

FIG. 28 is a perspective view illustrating a method of manufacturing the rotor 1E. The rotor 1E can be manufactured similarly to the rotor 1D. That is, the magnets 12a and 12b are mounted in the predetermined positions 12aP and 12bP on the substrate 11, respectively, and the magnetic plate 542 is mounted on the magnets 12a and 12b and magnetic members 13a and 13b. The positions of the slits 55c to 55f at this time are as described above.

Of course, shape modifications as shown in FIGS. 16 to 19 in the third embodiment may be made in the magnetic members 54c to 54f.

Further, the substrate 11 may be made of a magnetic member, and may be provided with the function as a back yoke for the magnets 12a and 12b. It is possible to previously form the substrate 11 and magnets 12a and 12b integrally by a bonded magnet. In this case, so-called polar anisotropic orientation may be employed.

In the case where the substrate 11 is a magnetic member, the magnetic flux flows between the magnets 12a and 12b passing through the magnetic member 13a or magnetic member 13b, one slit and substrate 11, so that it is desirable that the width of slit be chosen to be not less than twice the interposed distance to armature.

Sixth Embodiment

Figure 29:
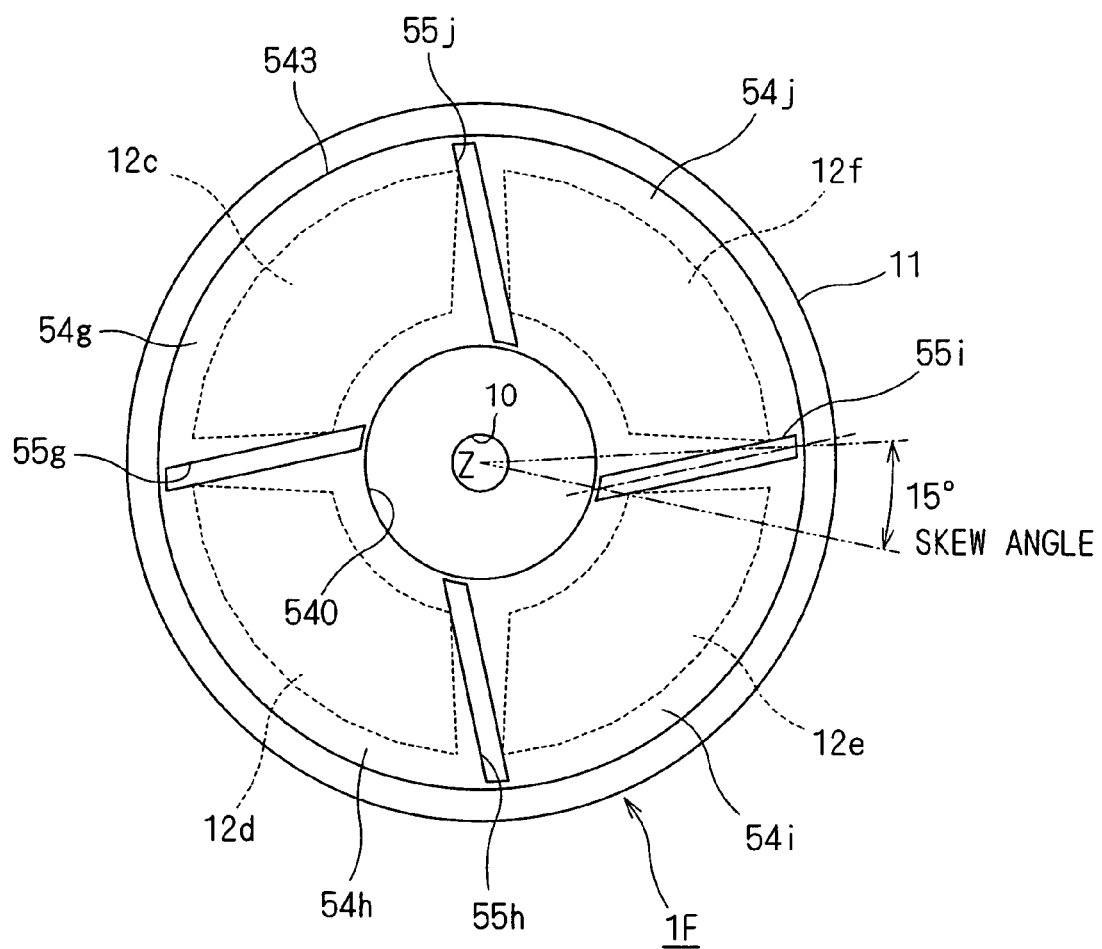
FIG. 29 is a diagram illustrating the structure of a rotor 1F according to a sixth embodiment of the present invention.

FIG. 29 is a diagram illustrating the structure of a rotor 1F according to a sixth embodiment of the present invention, which is a plan view as viewed from the side of a stator (not shown) in the case of constituting a motor along with the stator. The substrate 11 is provided with the shaft hole 10 at its center. Four magnets 12c, 12d, 12e and 12f are provided on the substrate 11, and the magnets 12c and 12e presents a first polarity (e.g., N pole), and the magnets 12d and 12f presents a second polarity (e.g., S pole), respectively, with respect to the stator (this side of the sheet of drawing). Accordingly, the rotor 1F can be employed as a rotor with two pole pairs (the number of poles: 4).

The rotor 1F does not have magnetic members between the magnets, similarly to the rotor 1D (FIGS. 20 to 22) shown in the fourth embodiment, and a magnetic plate 543 is mounted instead of the magnetic plate 541. The magnetic plate 543 has the hole 540 larger than the shaft hole 10. The magnetic plate 542 has opening through slits 55g to 55j extending from positions close to the shaft hole 10 to farther positions, and the magnetic plate 543 divided by these slits in the circumferential direction serves as magnetic members 54g to 54j.

More specifically, in plan view, the slit 55g is positioned between the magnets 12c and 12d, the slit 55h is positioned between the magnets 12d and 12e, the slit 55i is positioned between the magnets 12e and 12f, and the slit 55j is positioned between the magnets 12f and 12c.

And, the magnetic plate 543 positioned between the slits 55j and 55g serves as the magnetic member 54g, the magnetic plate 543 positioned between the slits 55g and 55h serves as the magnetic member 54h, the magnetic plate 543 positioned between the slits 55h and 55i serves as the magnetic member 54i, and the magnetic plate 543 positioned between the slits 55i and 55j serves as the magnetic member 54j.

Similarly to the rotor 1D (FIGS. 20 to 23) shown in the fourth embodiment and rotor 1E (FIGS. 24 to 28) shown in the fifth embodiment, adjacent ones of the magnetic members 54g to 54j are connected to each other at the ends of the slits 55g to 55j on the outer peripheral side and on the side of the shaft hole 10 with thin portions interposed therebetween. The pole face of the rotor 1F serves as the surfaces of the magnetic members 54g to 54j on the side of the stator.

Similarly to the slits 55a to 55f described in the fourth embodiment and fifth embodiment, the slits 55g to 55j blocks the magnetic flux from flowing between the magnets 12c and 12d in the magnetic plate 543. Further, since the thin portions in the rotor 1F are also easy to become magnetically saturated similarly to the already-mentioned thin portions 56a to 56l, a short circuit of magnetic flux inside the rotor 1F is extremely small even when the magnetic members 54g to 54j are connected to each other with these portions interposed therebetween.

With such structure, effects similar to the fourth embodiment and fifth embodiment can be obtained. Further, in the rotor 1F according to the present embodiment, the slits 55g to 55j are inclined with respect to the radial direction, so that the borders of pole faces of the rotor 1F are inclined with respect to the radial direction. Thus, so-called skews are provided, which can reduce the cogging torque.

In FIG. 29, the line connecting the end of each of the slits 55g to 55j on the outer peripheral side and the center Z of the rotor 1F is shown as an skew angle relative to the line connecting the end on the side of the shaft hole 10 and the center Z of the rotor 1F, and the case of 15 degrees is illustrated. Further, the case in which the slits 55g to 55j extend linearly is shown, but they may extend in curve.

Further, the magnets 12c to 12d may be formed integrally by a ring-like magnet. In that case, it is desirable to substantially unmagnetize in the positions where the slits 55g to 55j are provided in plan view. This mode also has advantages of easy manufacture and that the substrate 11 on which the magnets 12a and 12b are mounted can be omitted. In the case of omitting the substrate 11, it is desirable to subject the magnets to polar anisotropic orientation.

It is desirable that the width of the slits 55g to 55j in the circumferential direction be chosen to be not less than twice the interposed distance to armature, similarly to the case described in the fourth embodiment. This is because the magnetic path through which the magnetic flux short circuits between adjacent magnets flows corresponds to one slit.

Of course, shape modifications as shown in FIGS. 16 to 19 in the third embodiment may be made in the magnetic members 54g to 54j.

Further, the substrate 11 may be made of a magnetic member, and may be provided with the function as a back yoke for the magnets 12c and 12d. It is possible to previously form the substrate 11 and magnets 12c and 12d integrally by a bonded magnet. In this case, so-called polar anisotropic orientation may be employed.

FIG. 30 is a plan view showing a rotor 1F1 according to a modification of the sixth embodiment of the present invention. The rotor 1F1 has a configuration that the slits 55g, 55h, 55i and 55j of the rotor 1F are extended in width. Specifically, both ends of one slit in the circumferential direction are inclined with respect to the radial direction. And, the case in which the angle formed by lines respectively dividing the skew angles is 30 degrees is illustrated.

By extending the slits in this manner, the magnetic flux concentrates on the center of each of the magnetic members 54g to 54j in plan view, which may increase the torque.

Seventh Embodiment

The first to sixth embodiments have specifically described the structures of the rotors 1A to 1F. Either of the rotors according to the present invention as illustrated in these embodiments may be combined with a conventional axial gap type stator to constitute an axial gap type motor. Of course, in either of the rotors obtained by the present invention, the structure of the stator is not limited to the stator 2 or a stator 3 which will be described later.

In the present embodiment and an eighth embodiment, the structure of a stator that can be employed with the rotors according to the present invention and the structure of a motor obtained by combination with the rotors will be illustrated.

Figure 31:
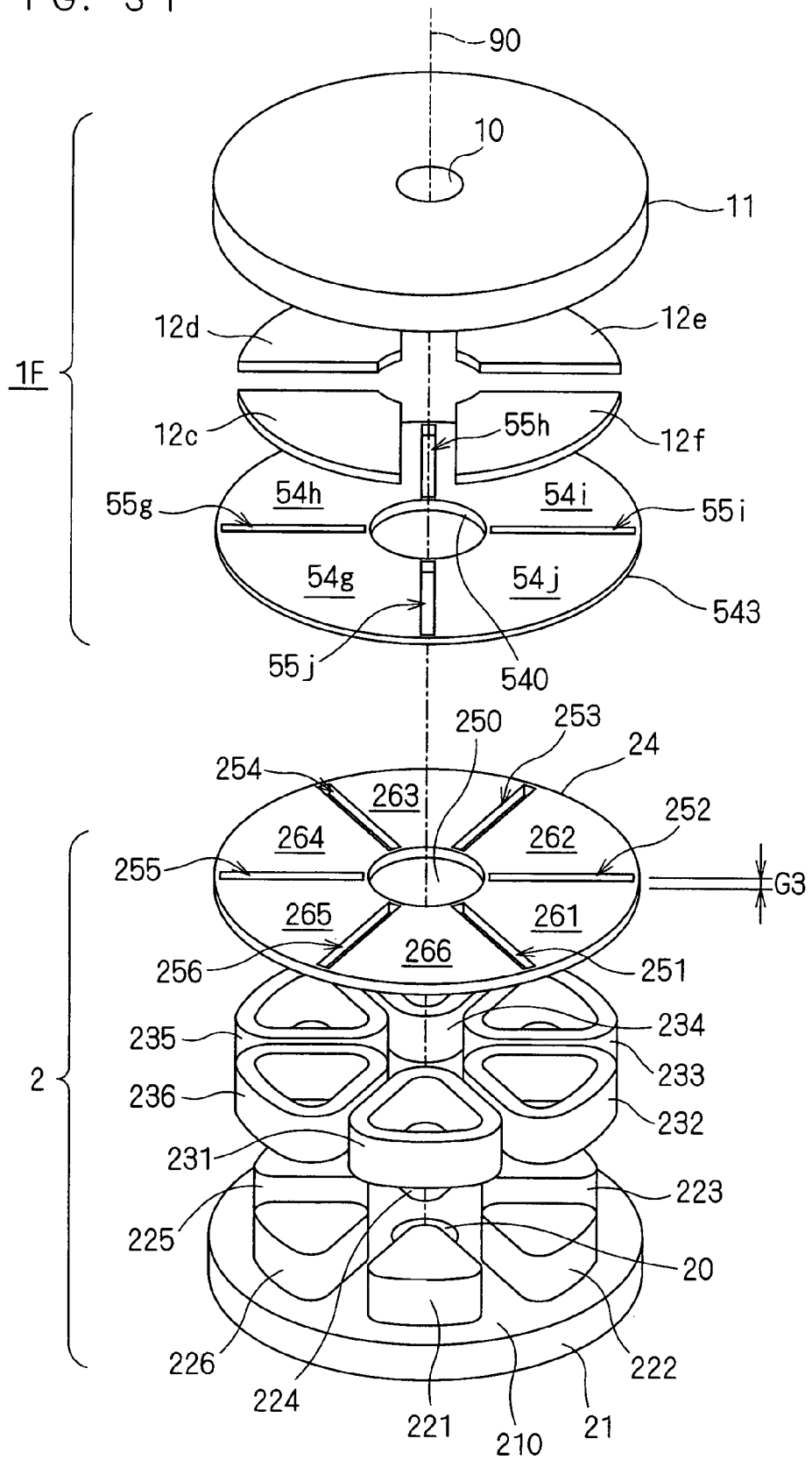
FIG. 31 is a perspective view illustrating the structure of a motor according to a seventh embodiment of the present invention.

FIG. 31 is a perspective view illustrating the structure of the rotor 1F and stator 2 that can be employed for the motor according to the present invention. While being disassembled along a rotation axis center 90 in FIG. 31, the rotor 1F and stator 2 are each practically stacked along the rotation axis center 90.

For simplicity, the case in which skews are not provided for the slits 55g to 55j of the rotor 1F is illustrated here.

A substrate 21 in the stator 2 has a surface 210 perpendicular to the rotation axis center 90, and magnetic cores 221 to 226 standing almost in parallel to the rotation axis center 90 and disposed annularly around the rotation axis center 90 are provided on the surface 210. The magnetic cores 221 to 226 are provided closer to the rotor than the substrate 21.

A high permeable magnetic material such as iron may be employed for the magnetic cores 221 to 226. While the case in which the magnetic cores 221 to 226 show rounded triangle poles is illustrated here, another configuration may be employed.

The substrate 21 and magnetic cores 221 to 226 may be formed integrally by, for example, iron dust core.

The substrate 21 may be either a magnetic member or a non-magnetic member, but it is desirable to employ a magnetic member in order to make it serve as a back yoke for the magnetic cores 221 to 226.

Windings 231 to 236 are wound around the magnetic cores 221 to 226, respectively. That is, the windings 231 to 236 are directly wound around the magnetic cores 221 to 226 by concentrated winding absolutely independently in different phases. Since the windings are in one layer in the direction of the rotation axis center 90 without overlapping, the amount of copper is small, and the dimension in the direction of the rotation axis center 90 can be reduced. In FIG. 31, conductors of each of the windings 231 to 236 are not minutely shown but shown collectively per winding.

The windings 231 to 236 are wound as three-phase windings, and form pairs in each phase. And, the pairs of windings are disposed in positions shifted 180° from each other in the circumferential direction. And, by flowing current to the windings 231 to 236, a magnetic flux is generated from each of the windings 231 to 236.

In the case where the stator 2 constitutes a motor along with a rotor with one pole pair, magnetic fluxes of opposite phases to each other are generated by this one pair of windings. In the case where the stator 2 constitutes a motor along with a rotor with two pole pairs, magnetic fluxes of the same phase to each other are generated by this one pair of windings. Since the rotor 1F illustrated in FIG. 31 has two pole pairs, magnetic fluxes of the same phase to each other are generated by the aforementioned one pair of windings.

While FIG. 31 illustrates the case in which a magnetic plate 24 is mounted on the magnet cores 221 to 226 in the stator 2, this may be omitted. The magnetic plate 24 is provided with a central hole 250 and slits 251 to 256, all extending therethrough. The slits 251 to 256 are provided to extend through from the inner peripheral side (the side of the central hole 250) to the outer peripheral side of the magnetic plate 24 while leaving thin portions.

In plan view along the rotation axis center 90, the central hole 250 is surrounded by the magnetic cores 221 to 226, and the slit 251 is interposed between the magnetic cores 221 and 222, the slit 252 between the magnetic cores 222 and 223, the slit 253 between the magnetic cores 223 and 224, the slit 254 between the magnetic cores 224 and 225, the slit 255 between the magnetic cores 225 and 226, and the slit 256 between the magnetic cores 226 and 221.

Even with such magnetic plate 24 provided, the likelihood that the thin portions become magnetically saturated and the presence of the slits 251 to 256 prevent the magnetic fluxes generated from the magnetic cores 221 to 226 from short circuiting due to the magnetic plate 24. In other words, the magnetic plate 24 serves as six magnetic members 261 to 266 each interposed between a pair of slits, and the magnetic members 261 to 266 may have the function of substantially widening the pole faces of the magnetic cores 221 to 226.

Since the windings 231 to 236 are enclosed in the border areas between each of the magnetic cores 221 to 226 in the circumferential direction, the border areas cannot be reduced. However, the pole face of the stator 2 can be grasped as the surface of the magnetic plate 24 on the side of the rotor. Therefore, the substantial widening of the pole face by the magnetic cores 221 to 226 than the magnetic members 261 to 266 makes it easier to make the magnetic flux density between the rotor and stator uniform.

It is desirable that a suitable value for a width G3 of the slits 251 to 256 in the circumferential direction be set not less than twice the interposed distance to armature. This is because a magnetic barrier corresponding to one slit exists on the magnetic path leaking between two of the magnetic members 261 to 266 within the stator, and on the other hand, the magnetic path flowing through the rotor goes and returns between the stator and rotor.

The magnetic plate 24 and magnetic plate 543 are desirable in terms of allowing magnetic fluxes to be exchanged efficiently between the rotor and stator, provided that they are almost equal in inside diameter and outside diameter. The magnetic plate 24 also serves to protect the windings 231 to 236.

Figure 32:
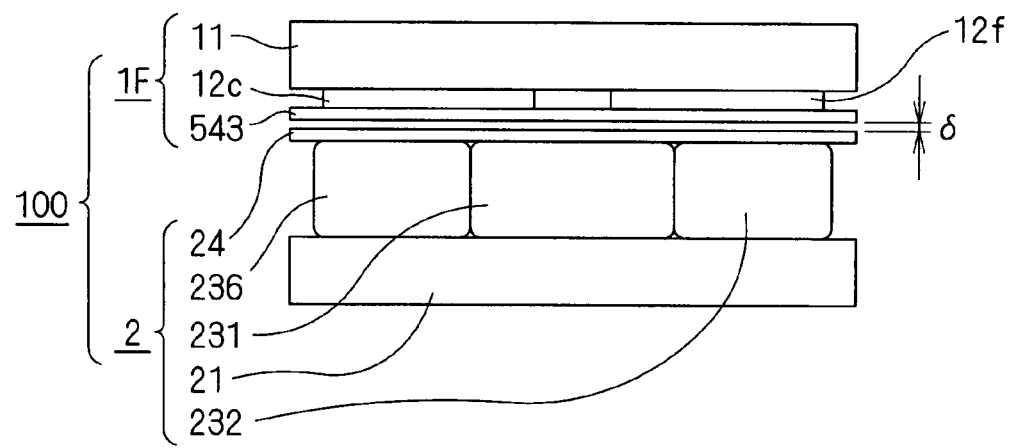
FIG. 32 is a side view of a motor 100 according to the present invention.

FIG. 32 is a side view of a motor 100 constructed by combining the structure shown in FIG. 31 along the rotation axis center 90, and the interposed distance to armature δ is illustrated.

Figure 33:
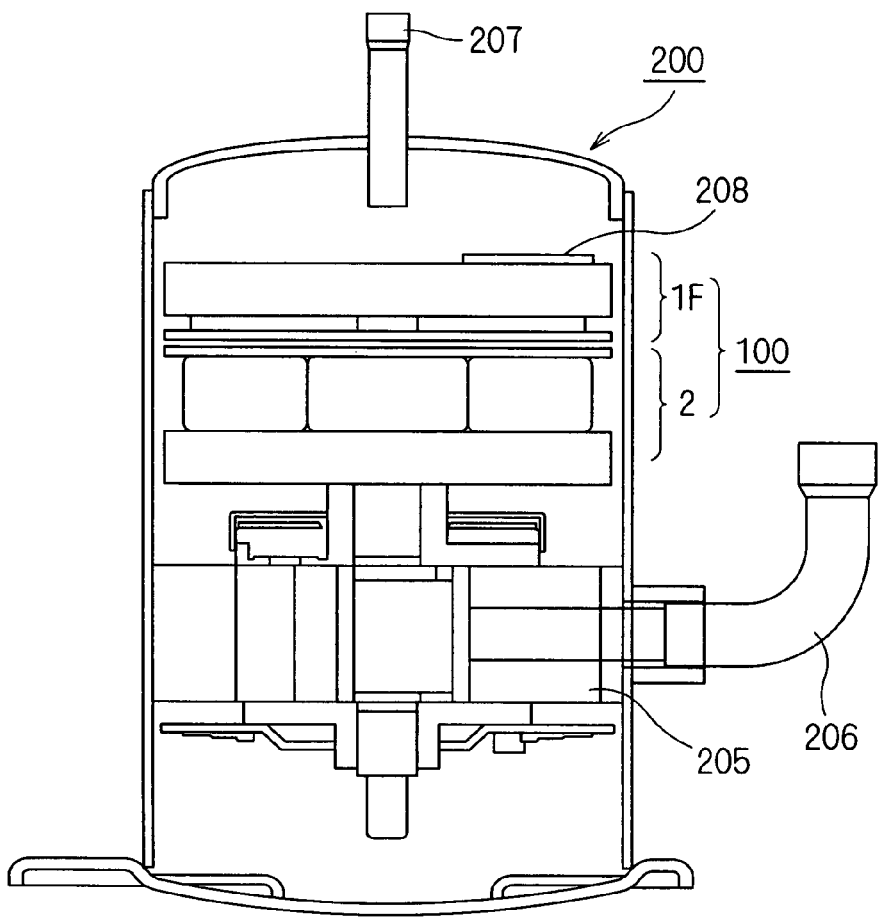
FIG. 33 is a sectional view illustrating a compressor 200 to which the motor 100 is applied.

FIG. 33 is a sectional view illustrating a compressor 200 to which the above-mentioned motor 100 is applied. The motor 100 is shown by using a side view.

A coolant is supplied from an inlet pipe 206, and the coolant is compressed by a compression element 205 driven by the motor 100, and the compressed high-pressure coolant is discharged from a discharge pipe 207. The use of a radial gap type motor causes a problem in that even ice machine oil goes out from the discharge pipe since an air gap communicates with the discharge pipe without its top shielded.

However, when employing the axial gap type motor 100 as in the present invention, ice machine oil can be dropped by centrifugal force from the lower surface of the rotor 1F disposed on the upper side toward the sidewall of the compressor 200, which is desirable in terms of reduction in oil coming-up.

Further, a balance weight 208 attached to the rotor 1F on the opposite side of the stator 2 can be increased in diameter, and thus can be reduced in length in the direction of rotation axis.

The compression element 205 is more suitable when disposed below the motor 100. This is not to stir the ice machine oil since the rotor 1F has a large diameter. When disposed horizontally, the rotor is immersed in the ice machine oil, so that it is desirable to dispose the compressor 200 vertically.

The driving circuit may be driven by a three-phase inverter. In a single phase, the direction of rotation is difficult to be fixed, and the circuit will become complicated in four or more phases. In terms of control of torque ripple, the driving current waveform should be a sine wave.

Since the compressor 200 is thus driven by the motor which employs the rotor according to the present invention, the compressor efficiency is high. It is needless to say that application to such compressor is possible even when employing the rotor other than that of the present embodiment.

Eighth Embodiment

Figure 34:
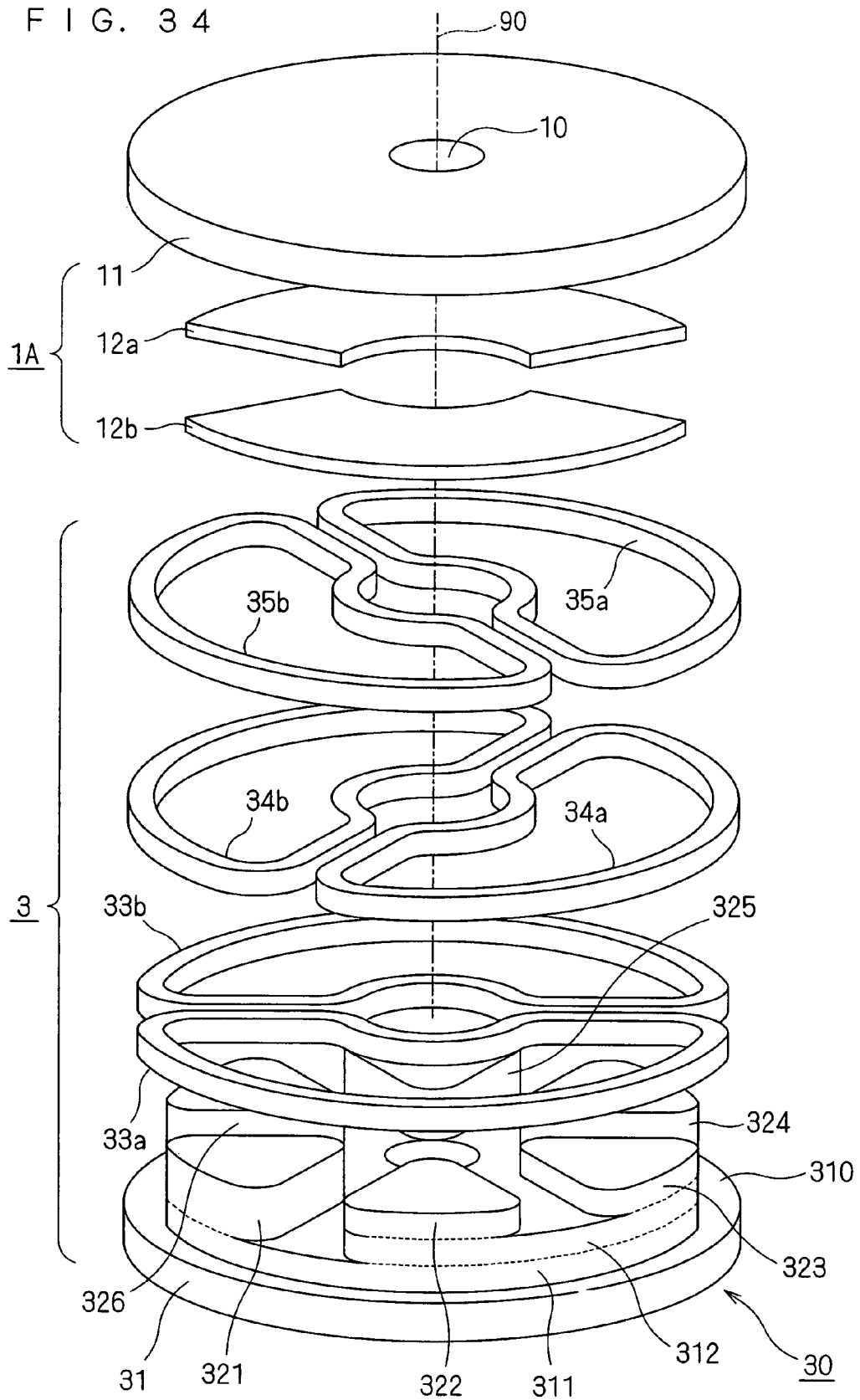
FIG. 34 is a perspective view illustrating the structure of a motor according to an eighth embodiment of the present invention.
Figure 35:
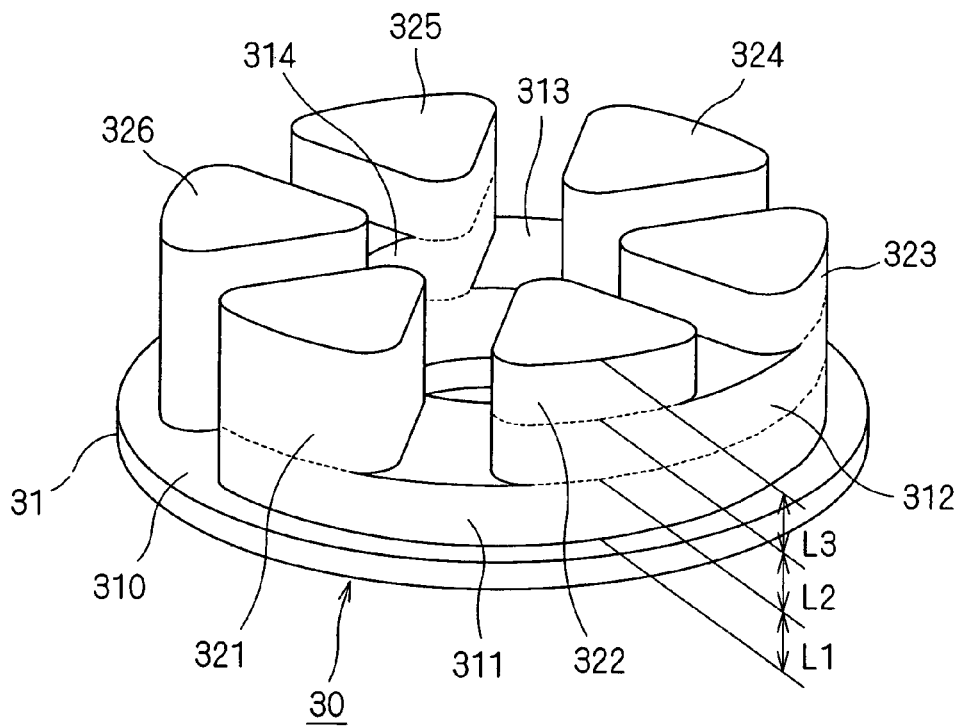
FIG. 35 is a perspective view showing the structure of a magnetic member 30 employed in the eighth embodiment of the present invention.

FIG. 34 is a perspective view illustrating the structure of the rotor 1F and stator 3 that can be employed for a motor according to the present invention. While being disassembled along the rotation axis center 90, the rotor 1F and stator 3 are each practically stacked along the rotation axis center 90. FIG. 35 is a perspective view of a magnetic member 30 provided for the stator 3.

The magnetic members 13a and 13b (FIGS. 1 to 4) provided on the substrate 11 are hidden by the substrate 11, and thus do not appear in FIG. 34. Conductors of each of windings 33a, 33b, 34a, 34b, 35a and 35b are not minutely shown but shown collectively per winding.

In the magnetic member 30, a substrate 31 has a surface 310 perpendicular to the rotation axis center 90, and first-stage spacers 311, 313 and second-stage spacers 312, 314 are provided on the surface 310. Magnetic cores 321 and 324 stand respectively on the first-stage spacers 311 and 313, and magnetic cores 322, 323 and magnetic cores 325, 326 stand respectively on the second-stage spacers 312 and 314, all almost in parallel to the rotation axis center 90. The magnetic cores 321 to 326 are disposed annularly in this order around the rotation axis center 90. The magnetic cores 321 to 326 are provided closer to the rotor than the substrate 31.

The first-stage spacers 311 and 313 are both provided on the surface 310, and extend with an angle of 180 degrees in the circumferential direction, but are separated from each other. The second-stage spacers 312 and 314 are respectively provided on the ends of the first-stage spacers 311 and 313 in the circumferential direction, and extend with an angle of 120 degrees, but are separated from each other.

Provided on the surface 310 are the magnetic members 311 to 316 standing almost in parallel to the rotation axis center 90 and disposed annularly with an angle of 60 degrees around the rotation axis center 90. The magnetic members 311 to 316 are provided closer to the rotor than the substrate 31.

The stator 3 has the three pairs of windings 33a, 33b, 34a, 34b, 35a and 35b, each of which is wound around three magnetic members by so-called distributed winding. For instance, as shown in FIG. 34, the windings 33a, 33b, 34a, 34b, 35a and 35b previously wound into a predetermined shape are prepared, and they are embedded into the magnetic member 30 along the rotation axis center 90 in the order to be described below.

Specifically, first, the winding 33a is provided to surround the magnetic cores 321, 322 and 323, and the winding 33b is provided to surround the magnetic cores 324, 325 and 326. At this time, the windings 33a and 33b are provided around the first-stage spacers 311 and 313, respectively.

By making the height of the first-stage spacers 311 and 313 coincide with the width of the windings 33a and 33b in the direction of rotation shaft, the first-stage spacers 311, 313 and windings 33a and 33b fit into a first layer L1.

Next, the winding 34a is provided to surround the magnetic cores 322, 323 and 324, and the winding 34b is provided to surround the magnetic cores 325, 326 and 321. At this time, the windings 34a and 34b are both mounted on the first-stage spacers 311, 313, windings 33a and 33b. As described above, by making the first-stage spacers 311, 313, windings 33a and 33b fit into the first layer L1, the windings 34a and 34b can be disposed stably.

By making the height of the second-stage spacers 312 and 314 coincide with the width of the windings 34a and 34b in the direction of rotation shaft, the second-stage spacers 312, 314, windings 34a and 34b fit into a second layer L2.

Further, the winding 35a is provided to surround the magnetic cores 323, 324 and 325, and the winding 35b is provided to surround the magnetic cores 326, 321 and 322. At this time, the windings 35a and 35b are both mounted on the second-stage spacers 312, 314, windings 34a and 34b. As described above, by making the second-stage spacers 312, 314, windings 34a and 34b fit into the second layer L2, the windings 35a and 35b can be disposed stably.

By making the height of the magnetic cores 323 and 326 coincide with the width of the windings 35a and 35b in the direction of rotation shaft, the magnetic cores 323, 326, windings 35a and 35b fit into a third layer L3. Of course, in order to reduce the interposed distance to armature, the top surfaces of the magnetic cores 321 to 326 on the side of the rotor 1A may extend off the windings 35a and 35b to the side of the stator 1A.

Figure 36:
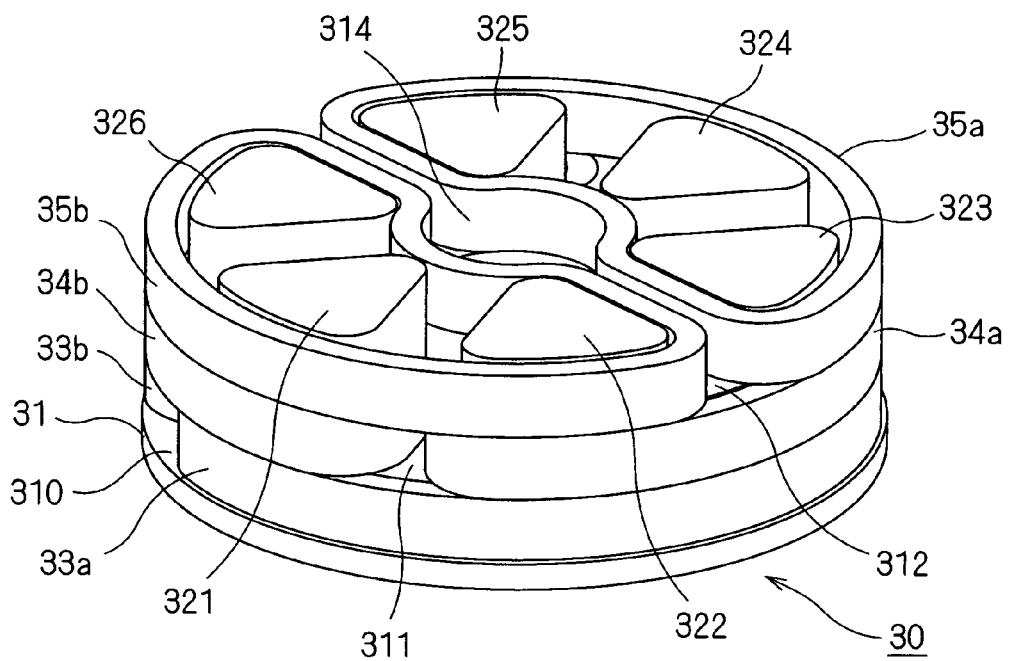
FIG. 36 is a perspective view showing the state in which the magnetic member 30 is provided with windings.

The state where the magnetic member 30 is provided with the windings 33a, 33b, 34a, 34b, 35a and 35b as described above is shown in FIG. 36 as a perspective view.

Next, current to be flown to the windings 33a, 33b, 34a, 34b, 35a and 35b in order to rotate the rotor 1A will be described. Here, the case of rotating the rotor 1A counterclockwise in the direction of looking at the stator 3 from the rotor 1A is illustrated as an example.

Since the windings 33a and 33b are directly opposed to the magnets 12a and 12b in the state shown in FIG. 34, current to be flown is zero. This is because a torque caused by current, if flowing, is zero.

On the other hand, current to be flown to the winding 34a excites the magnetic cores 322, 323 and 324 to the N pole in order to attract the magnet 12b exhibiting the S pole on the side of the stator 3. That is, the current is flown in the counterclockwise direction. Conversely, current is flown to the winding 34b in the clockwise direction, to excite the magnetic cores 326, 321 and 322 to the S pole, thereby attracting the magnet 12a exhibiting the N pole to the side of the stator 3.

Similarly, current to be flown to the winding 35a needs to be excited to the N pole in order to attract the magnet 12b. Therefore, the current is flown in the counterclockwise direction. Current to be flown to the winding 35b needs to be excited to the S pole in order to attract the magnet 12a. Therefore, the current is flown in the clockwise direction.

Since the magnet 12a exhibiting the N pole approaches the winding 33a when the rotor 1A starts to rotate in the counterclockwise direction, the magnetic cores 321, 322 and 323 are excited to the S pole. Specifically, a U-phase current is flown in the clockwise direction. On the other hand, since the magnets 12a and 12b approaches the winding 34a and 34b, respectively, the current value is made close to zero. Since the magnet 12b approaches the winding 35a in a position where the mutual positional relationship with the magnet 12b maximizes the torque, the current value is increased. This is similar to the winding 35b.

That is, using the positional relationship between the rotor 1A and stator 3 in the circumferential direction at a point of time as a reference as in FIG. 34, current phases of the windings 33a, 33b, 34a, 34b, 35a and 35b are 180°, 0°, 120°, 300°, 60° and 240°, respectively, which are not phase lead or phase lag.

A pair of windings in each of the layers L1, L2 and L3 is disposed in a position shifted 180 degrees from each other in the circumferential direction. Further, the respective pairs of windings are disposed in a position shifted 120 degrees from each other. Flowing a U-phase current to the windings 33a and 33b in opposite phases to each other (i.e., with a difference of 180 degrees in electric angle), flowing a V-phase current to the windings 34a and 34b in opposite phases to each other, and flowing a W-phase current to the windings 35a and 35b in opposite phases to each other achieves operation as a three-phase axial gap type stator. It is desirable that exciting currents flown to these windings be sine-wave currents. It is to suppress the torque ripple.

Three-phase currents shifted 120° from one another can be employed as currents to be flown to the windings 33b, 34b and 35b, when wound in the opposite direction to the windings 33a, 34a and 35a, respectively.

These currents are obtained by an inverter, for example, and the frequency and current value are varied according to necessity to drive the motor.

The rotor 1A has anti-saliency, and the q-axis inductance Lq is larger than the d-axis inductance Ld. Therefore, advancing the current phase allows an effective use of the reluctance torque. By advancing the current phase at an angle exceeding 0° and less than 45° from the above-mentioned current phase, the reluctance torque can be used in combination. While depending on the design of the q-axis inductance Lq and d-axis inductance Ld and loading point, the torque can be generally maximized by advancing at 15 to 30°, approximately.

Since magnetic fluxes flow to the magnetic member 30 and magnetic members 13a and 13b (cf. FIGS. 1 to 4) also in the axial direction, iron loss increases in steel sheets stacked in the axial direction. Therefore, it is desirable to use iron dust core.

Further, to the substrate 11, when serving as a back yoke, magnetic fluxes of the surfaces opposed to the pole faces of the magnets 12a and 12b flow constantly, and in addition, a magnetic flux that varies by the exciting current of the stator 3 also flows through the magnetic members 13a and 13b. Therefore, it is also desirable to employ iron dust core to form the substrate 11.

Of course, iron may be employed for the magnetic cores 321 to 326. Further, While the case in which the magnetic cores 321 to 326 show rounded triangle poles is illustrated, another configuration may be employed.

The substrate 31 of the magnetic member 30 may be a non-magnetic member, however, it is desirable to be a magnetic member in order to serve as a back yoke for the magnetic cores 321 to 326.

Further, a non-magnetic member may be employed for the first-stage spacers 311, 313, second-stage spacers 312 and 314. However, making these spacers of iron dust core similarly to the magnetic cores 321 to 326 achieves the advantage of being able to be formed integrally.

Of course, the substrate 31 may be made of iron dust core integrally with the first-stages pacers 311, 313, second-stage spacers 312, 314, and magnetic cores 321 to 326.

Ninth Embodiment

The rotors and motors described in the previous embodiments are provided with one stator. However, the present invention may also be applied to the case where a pair of stators interposing a rotor therebetween are provided as illustrated in Patent documents 1 to 4.

Figure 37:
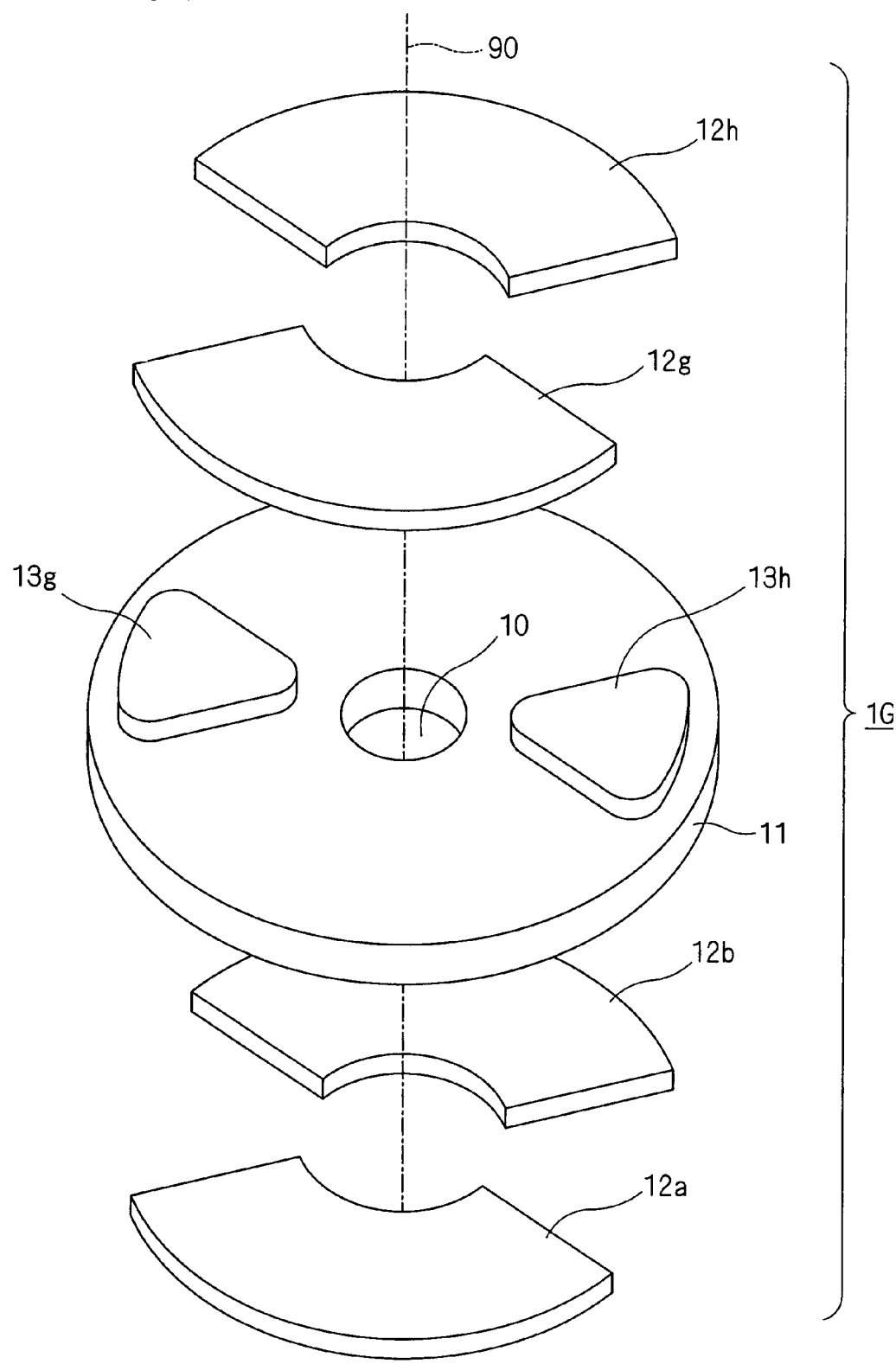
FIG. 37 is a perspective view illustrating the structure of a rotor 1G according to a ninth embodiment of the present invention.

FIG. 37 is a perspective view illustrating the structure of a rotor 1G according to a ninth embodiment of the present invention. While being disassembled along a rotation axis center 90 in FIG. 37, the rotor 1G is practically stacked along the rotation axis center 90.

The rotor 1G has a structure in which magnets 12g, 12h and magnetic members 13g and 13h are provided for the rotor 1A (FIGS. 1 to 4) shown in the first embodiment on the opposite side of the magnets 12a, 12b, magnetic members 13a and 13b (not appearing in FIG. 37). The positional relationship between the magnets 12g, 12h, magnetic members 13g and 13h on one side surface of the substrate 11 is the same as the positional relationship between the magnets 12a, 12b, magnetic members 13a and 13b on the other side surface of the substrate 11.

For instance, the magnets 12a, 12b, magnetic members 13a and 13b are equal in thickness to one another, and the magnets 12g, 12h, magnetic members 13g and 13h are equal in thickness to one another. Alternatively, they may all be equal in thickness to one another.

By providing such rotor 1G with stators respectively on the side of the magnets 12a and 12b and the side of the magnets 12g and 12h to constitute a motor, mechanisms for generating torque are generated on both sides of the substrate 11. Thus, the motor is easy to increase the torque, or easy to obtain a necessary torque with less current.

While the case where the magnets 12a, 12b and magnetic members 13a, 13b are opposite to the magnets 12g, 12h and magnetic members 13g, 13h, respectively, with the substrate 11 interposed therebetween is illustrated here, such opposition is not necessarily required. However, this opposition makes it easier to design the arrangement of the stators.

Of course, it is also desirable in terms of obtaining skews that the opposing relationship be slightly displaced from the directly-opposed position. Alternatively, it is not necessary to make the magnets 12a, 12b, magnetic members 13a, 13b and the magnets 12g, 12h, magnetic members 13g and 13h directly opposite to each other in the case where rotating fields generated by the pair of stators provided with the rotor 1G interposed therebetween are not directly opposite to each other with the rotor 1G interposed therebetween.

Further, in the case where the substrate 11 is made of a magnetic member to serve as a back yoke, it is desirable that the magnets 12g and 12h present the same polarities as the magnets 12a and 12b, respectively, on the opposite side of the substrate 11. That is, when the magnets 12a and 12b exhibit the N pole and S pole, respectively, on the opposite side of the substrate 11, it is desirable that the magnets 12g and 12h exhibit the N pole and S pole, respectively, on the opposite side of the substrate 11.

Such opposition of magnetic poles of opposite polarities with the substrate 11 interposed therebetween makes a magnetic flux less likely to flow between the magnets 12a, 12b and magnets 12g, 12h through the substrate 11, so that the substrate 11 is improved in function as a back yoke for the magnets 12a, 12b and for the magnets 12g, 12h. This extends a region in the substrate 11 where the magnetic flux saturates by means of magnetic fluxes of the magnets 12a, 12b, 12g and 12h, and reduces variations in magnetic fluxes flowing from the stators to the substrate 11, so that eddy-current loss based on the aforementioned variations in magnetic fluxes can be reduced.

FIG. 38 is a perspective view illustrating the structure of another rotor 1H according to the present embodiment. The rotor 1H has a structure in which the substrate 11 is omitted from the rotor 1A (FIGS. 1 to 4) shown in the first embodiment. Since the magnets 12a and 12b have magnetic poles on their both surfaces, providing the rotor 1H with stators on its both sides allows mechanisms for generating torque to be formed on the both sides.

It is desirable that the structure shown in FIG. 38 have gaps between the magnets 12a, 12b and magnetic members 13a, 13b (depicted as the gaps G1 in FIG. 1) as described with respect to the rotor 1A. Therefore, when forming the rotor 1H, it is desirable that a non-magnetic filling material be employed for the gaps and that the magnets 12a, 12b and magnetic members 13a, 13b be bonded to one another with this filling material interposed therebetween.

FIG. 39 is a perspective view illustrating another preferable mode of the rotor 1I4. In a rotor 4, the magnets 12a, 12b and magnetic members 13a, 13b shown in FIG. 38 are molded by resin or the like while keeping this positional relationship. The rotor 4 has a cylinder 40 at its center, and a rotation shaft (not shown) is inserted here. The cylinder 40 corresponds to the gap G2 shown in FIG. 1, and prevents the magnets 12a, 12b and magnetic members 13a, 13b from magnetically short circuiting even when the rotation shaft is a magnetic member.

The mode in which the cylinder 40 has a thickness in the radial direction larger than the thickness of most part of the rotor 4 in the radial direction and has a shape projecting from the surface is illustrated here. However, the size relationship between these thicknesses can be designed depending on various conditions.

Figure 40:
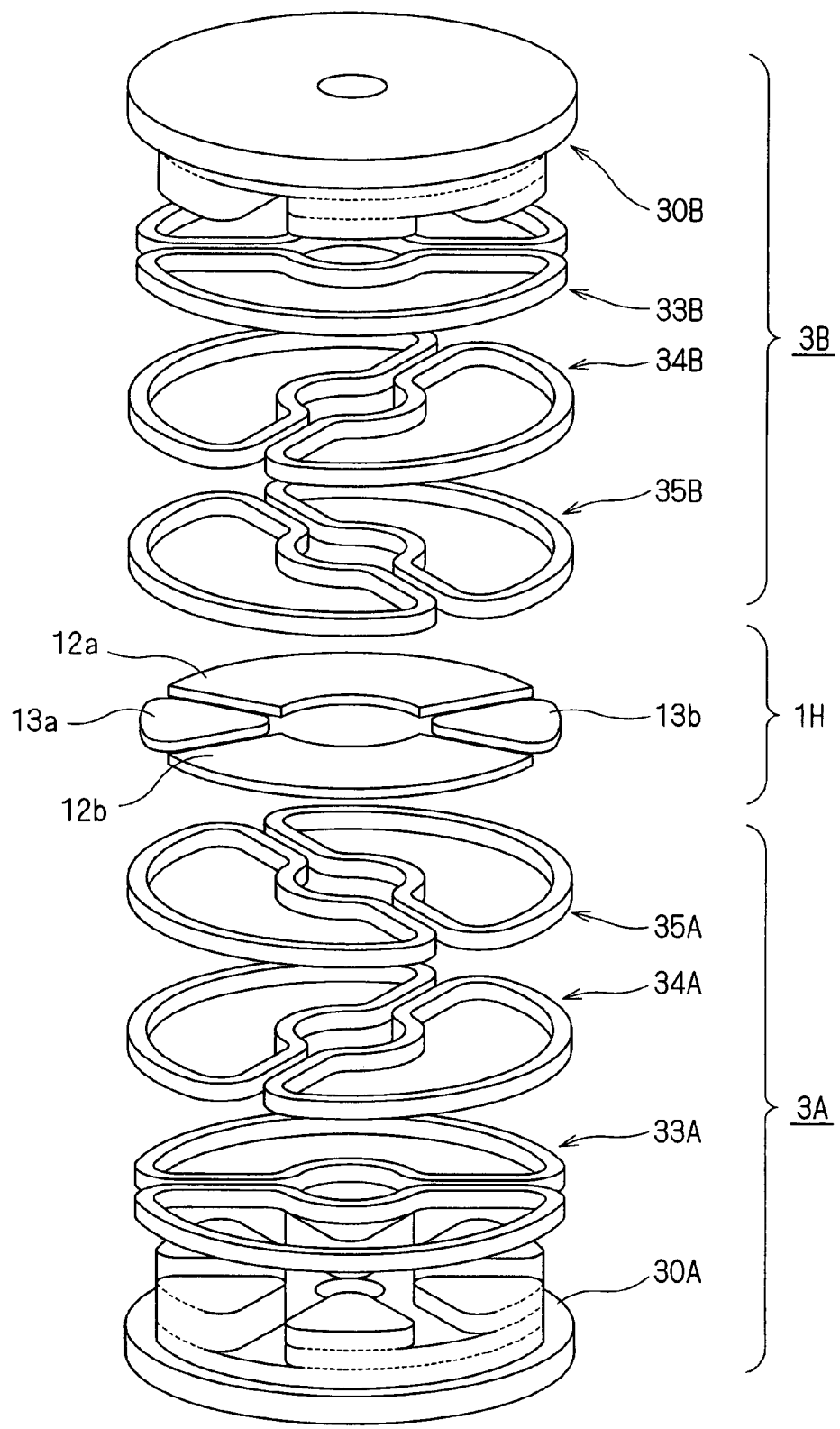
FIG. 40 is a perspective view illustrating the structure of a motor according to the ninth embodiment of the present invention.

FIG. 40 is a perspective view illustrating the structure of a motor including the rotor 1H and stators 3A and 3B interposing the rotor from its both sides, which is shown disassembled in the direction of thickness. Practically, the rotor 1H is molded as the rotor 4, for example, and the stators 3A and 3B are each stacked and held keeping the interposed distance to armature between the rotor 1H and stators 3A, 3B.

As the stators 3A and 3B, the stator 3 (FIGS. 34 to 36) described in the eighth embodiment may be employed. That is, the stator 3A has a magnetic member 30A in correspondence to the magnetic member 30, a winding 33A in correspondence to the windings 33a and 33b, a winding 34A in correspondence to the windings 34a and 34b, and a winding 35A in correspondence to the windings 35a and 35b. Similarly, the stator 3B has a magnetic member 30B in correspondence to the magnetic member 30, a winding 33B in correspondence to the windings 33a and 33b, a winding 34B in correspondence to the windings 34a and 34b, and a winding 35B in correspondence to the windings 35a and 35b.

In the rotor 1H, the magnets 12a, 12b and magnetic members 13a and 13b constitute a mechanism in which the stators 3A and 3B each generate torque, so that it is desirable that the structures of the stators 3A and 3B, particularly, the windings 33A and 33B, windings 34A and 34B, and windings 35A and 35B be in mirror image relation, with the substrate interposed therebetween. Since the magnets 12a and 12b show different magnetic poles on the both sides, respectively, it is also desirable that the direction of current to be flown in the windings 33A and 33B, the windings 34A and 34B, and the windings 35A and 35B be in mirror image relation.

Of course, their displacements from the mirror image relation is also a desirable design matter in terms of obtaining skews.

Figure 41:
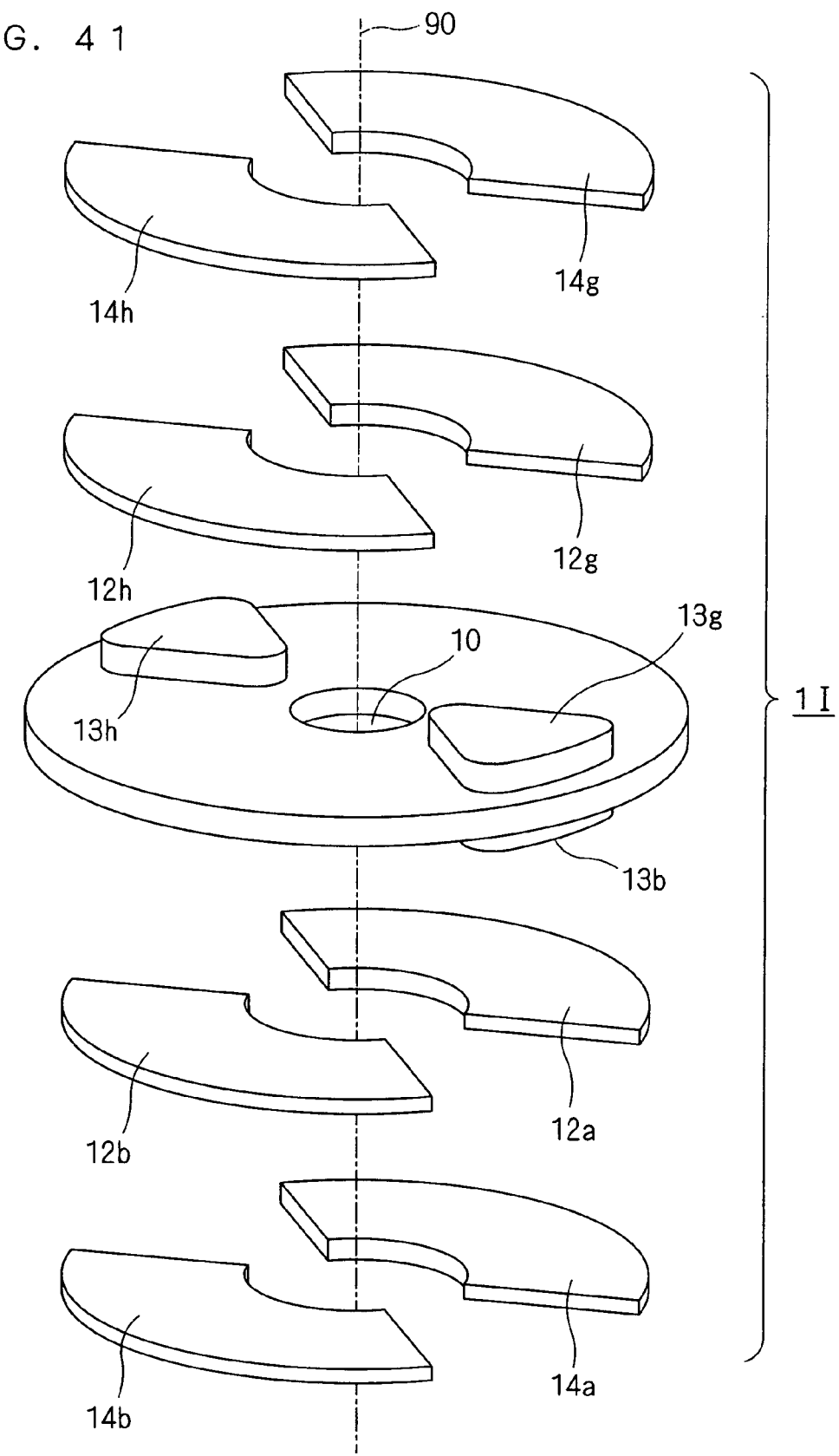
FIG. 41 is a perspective view illustrating the structure of another rotor 1I according to the ninth embodiment of the present invention.

FIG. 41 is a perspective view illustrating the structure of another rotor 1I according to the preset embodiment. While being disassembled along the rotation axis center 90, the rotor 1I is practically stacked along the rotation axis center 90.

The rotor 1I has a structure in which the rotor 1C (FIGS. 12 to 14) shown in the third embodiment is provided with the magnets 12g, 12h, magnetic members 13g, 13h, 14g and 14h on the substrate 11 on the opposite side of the magnets 12a, 12b, magnetic members 13a, 13b, 14a and 14b (magnetic member 13a does not appear in FIG. 41). The positional relationship between the magnets 12g, 12h, magnetic members 13g, 13h, 14g and 14h on one side surface of the substrate 11 is the same as the positional relationship between the magnets 12a, 12b, magnetic members 13a, 13b, 14a and 14b on the other side surface of the substrate 11.

For instance, the thickness of magnetic member 13a, the thickness of magnetic member 13b, the sum of thicknesses of magnetic member 14a and magnet 12a, and the sum of thicknesses of magnetic member 14b and magnet 12b are chosen to be equal to one another. Similarly, the thickness of magnetic member 13g, the thickness of magnetic member 13h, the sum of thicknesses of magnetic member 14g and magnet 12g, and the sum of thicknesses of magnetic member 14h and magnet 12h are chosen to be equal to one another. They may all be equal in thickness to one another.

By interposing such rotor 1I between stators from the both sides to constitute a motor, similarly to the rotor 1G, 1H or the like, the motor which is easy to increase the torque can be obtained.

In the rotor 1I, similarly to the rotor 1G, the case where the magnets 12a, 12b, magnetic members 13a, 13b, 14a and 14b are opposed to the magnets 12g, 12h and magnetic members 13g, 13h, 14g and 14h, respectively, is illustrated, however, such opposition is not necessarily required.

Figure 42:
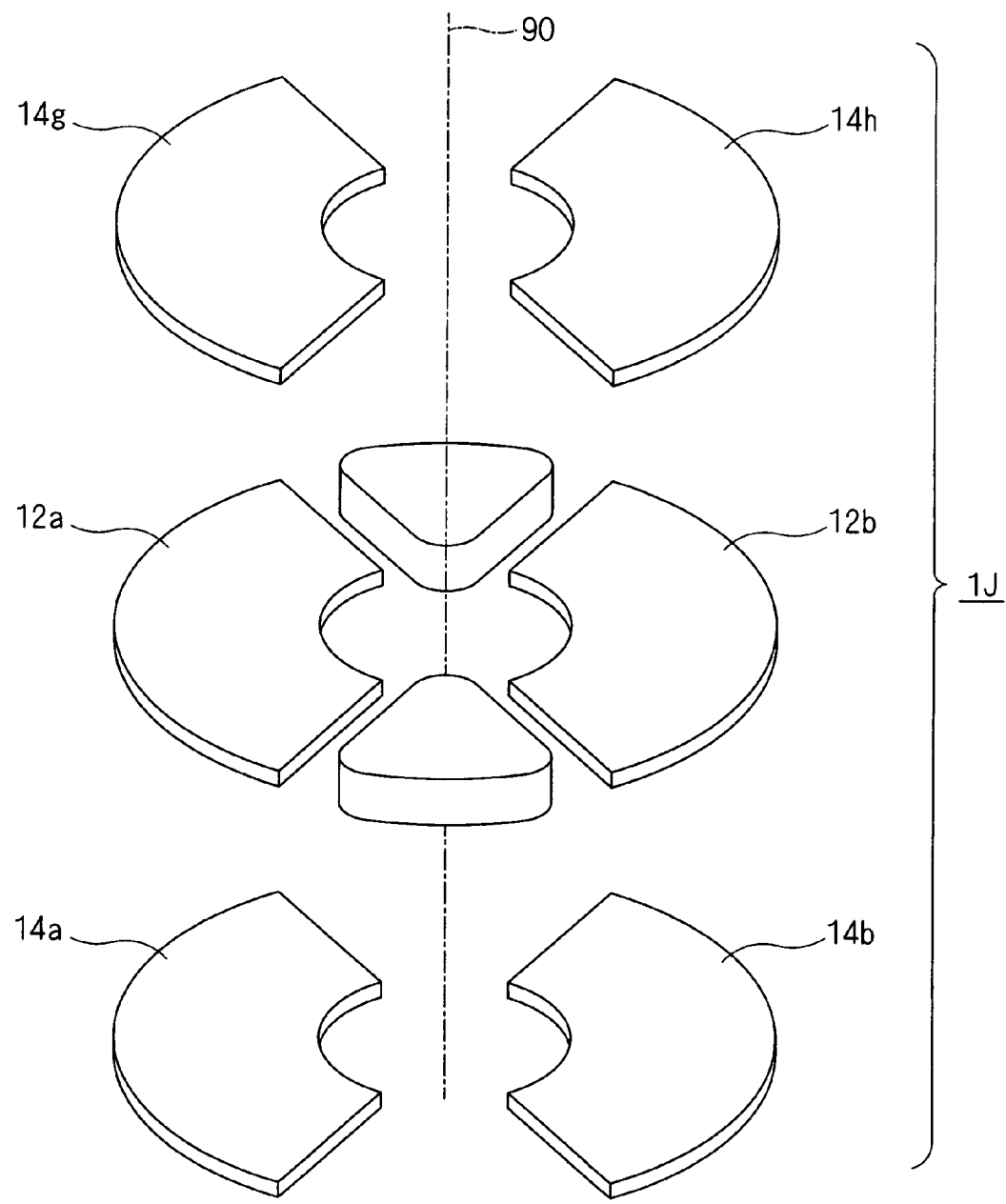
FIG. 42 is a perspective view illustrating the structure of another rotor 1J according to the ninth embodiment of the present invention.

FIG. 42 is a perspective view illustrating the structure of another rotor 1J according to the present embodiment. While being disassembled along the rotation axis center 90, the rotor 1J is practically stacked along the rotation axis center 90.

The rotor 1J has a structure in which the substrate 11 is omitted from the rotor 1C (FIGS. 12 to 14) shown in the third embodiment, and the magnetic members 14g and 14h are added. The magnetic members 14g and 14h are opposed to the magnetic members 14a and 14b with the magnets 12a and 12b interposed therebetween, respectively. It is also desirable to form the rotor 1J by molding by resin or the like, similarly to the rotor 4.

For instance, the sum of thicknesses of magnetic members 14a, 14g and magnet 12a, the sum of thicknesses of magnetic members 14b, 14h and magnet 12b, the thickness of magnetic member 13a, and the thickness of magnetic member 13b are chosen to be equal to one another.

Since the magnets 12a and 12b have magnetic poles on their both surfaces, providing the rotor 1J with stators on its opposite sides allows mechanisms for generating torque to be formed on the both sides.

Figure 43:
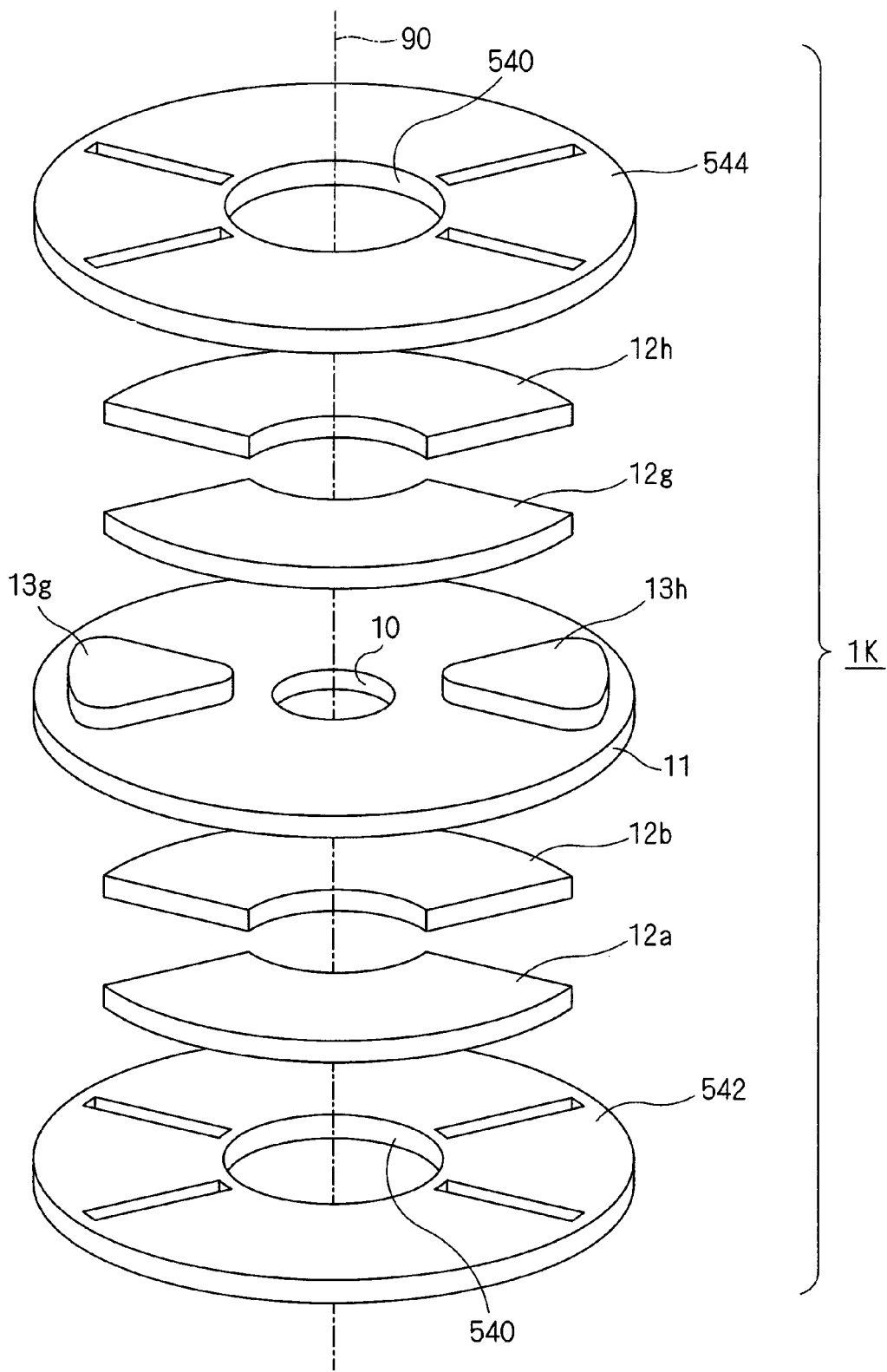
FIG. 43 is a perspective view illustrating the structure of another rotor 1K according to the ninth embodiment of the present invention.

FIG. 43 is a perspective view illustrating the structure of another rotor 1K according to the present embodiment. While being disassembled along the rotation axis center 90, the rotor 1K is practically stacked along the rotation axis center 90.

The rotor 1K has a structure in which the rotor 1E (FIGS. 24 to 28) shown in the fifth embodiment is provided with the magnets 12g, 12h, magnetic members 13g, 13h, and magnetic plate 544 on the substrate 11 on the opposite side of the magnets 12a, 12b, magnetic members 13a, 13b and magnetic plate 542 (magnetic members 13a and 13b do not appear in FIG. 43). The positional relationship between the magnets 12g, 12h, magnetic members 13g, 13h, and magnetic plate 542 on one side surface of the substrate 11 is the same as the positional relationship between the magnets 12a, 12b, magnetic members 13a, 13b and magnetic plate 544 on the other side surface of the substrate 11.

For instance, the thicknesses of magnets 12a, 12b, magnetic members 13a and 13b are equal to one another, and the thicknesses of magnets 12g, 12h, magnetic members 13g and 13h are equal to one another. Alternatively, they may all be equal in thickness to one another.

The magnetic plate 544 also has a similar structure to the magnetic plate 542, has the hole 540 and opening slits extending through in the vicinity of the border between each of the magnets 12*g*, 12*h*, magnetic members 13*g* and 13*h*, and is mounted on them from the opposite side of the substrate 11.

By interposing such rotor 1K between stators from the both sides to constitute a motor, the motor which is easy to increase the torque can be obtained.

In the rotor 1K, similarly to the rotor 1G, the case where the magnets 12*a*, 12*b*, magnetic members 13*a* and 13*b* are opposed to the magnets 12*g*, 12*h* and magnetic members 13*g* and 13*h*, respectively, is illustrated, however, such opposition is not necessarily required.

Figure 44:
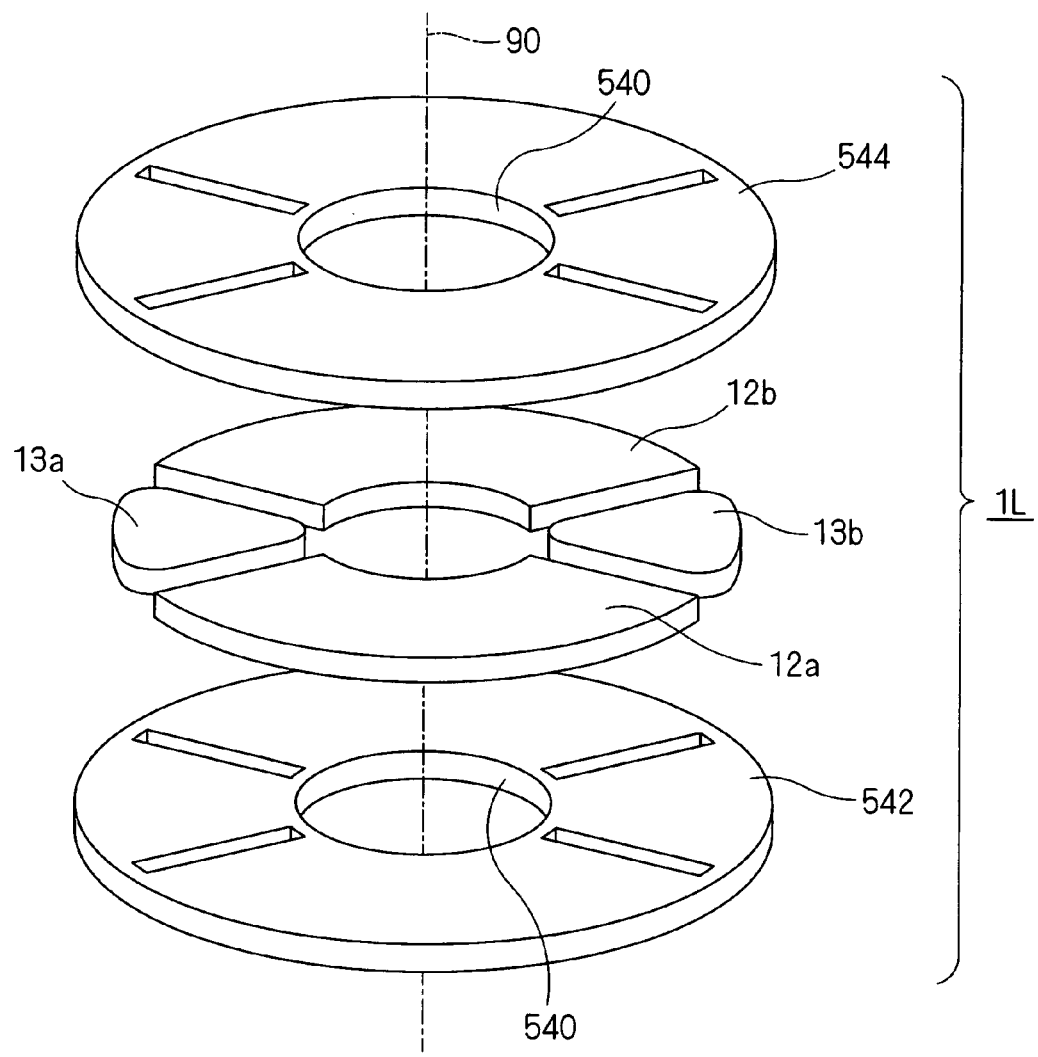
FIG. 44 is a perspective view illustrating the structure of another rotor 1L according to the ninth embodiment of the present invention.

FIG. 44 is a perspective view illustrating the structure of another rotor 1L according to the present embodiment. While being disassembled along the rotation axis center 90 in FIG. 44, the rotor 1L is practically stacked along the rotation axis center 90.

The rotor 1L has a structure in which the substrate 11 is omitted from the rotor 1E (FIGS. 24 to 28) shown in the fifth embodiment, and the magnetic plate 544 is added. It is desirable to form the rotor 1L by molding by resin or the like, similarly to the rotor 4.

The magnets 12*a* and 12*b* have magnetic poles on their both surfaces. That is, in the case where the magnets 12*a* and 12*b* have pole faces exhibiting the N pole and S pole, respectively, on the side of the magnetic plate 542, the magnets 12*a* and 12*b* have pole faces exhibiting the S pole and N pole, respectively, on the side of the magnetic plate 544. Therefore, providing the rotor 1L with stators on its opposite sides allows mechanisms for generating torque to be formed on the both sides.

Of course, shape modifications as shown in FIGS. 16 to 19 in the third embodiment may be made in the magnetic plates 542 and 544.

Figure 45:
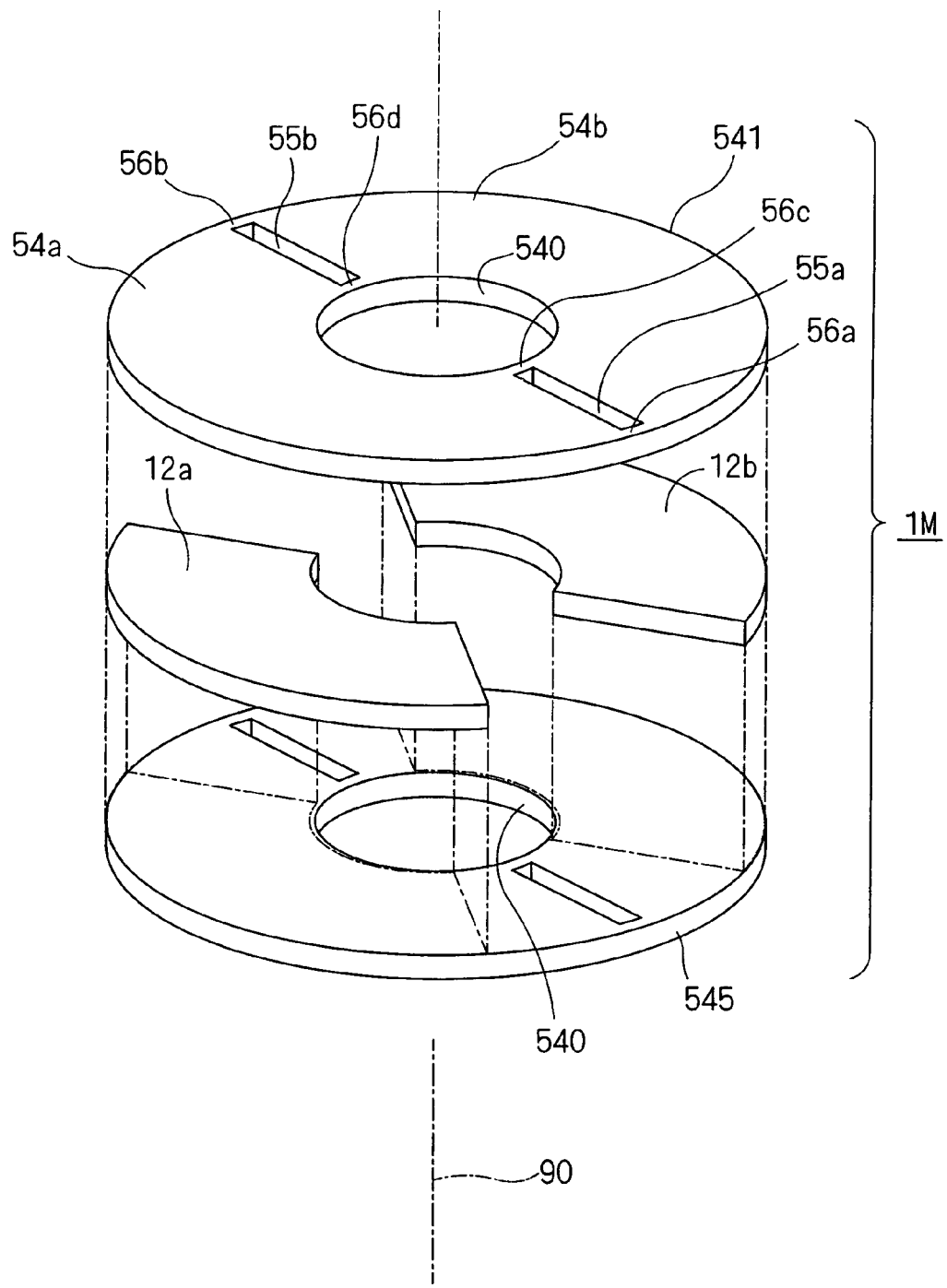
FIG. 45 is a perspective view illustrating the structure of another rotor 1M according to the ninth embodiment of the present invention.

FIG. 45 is a perspective view illustrating the structure of another rotor 1M according to the present embodiment. While being disassembled along the rotation axis center 90 in FIG. 45, the rotor 1M is practically stacked along the rotation axis center 90.

The rotor 1M has a structure in which the substrate 11 is omitted from the rotor 1D (FIGS. 20 to 23) shown in the fourth embodiment, and a magnetic plate 545 is added. The magnetic plate 545 has a structure of almost the same type as the magnetic plate 541.

Slits provided for the magnetic plate 545 are disposed to oppose to the slits 55*a* and 55*b* of the magnetic plate 541. However, they may be displaced from the directly-opposed position in terms of reducing the cogging torque, or the like.

Since the magnets 12*a* and 12*b* have magnetic poles on their both surfaces, providing the rotor 1M with stators on its opposite sides allows mechanisms for generating torque to be formed on the both sides.

Of course, shape modifications as shown in FIGS. 16 to 19 in the third embodiment may be made in the magnetic plates 541 and 545. Further, the magnets 12*a* and 12*b* may be formed integrally by a ring-like magnet, as described in the fourth embodiment.

The magnetic plates 541 and 545 are not necessarily required to be of completely the same type to each other, but may be of almost the same type and different from each other for the purpose of distinguishing front and rear of the rotor 1M, or the like. Further, they may be of almost the same type to a degree that similar effects can be obtained even with slight differences in shape.

Tenth Embodiment

Figure 46:
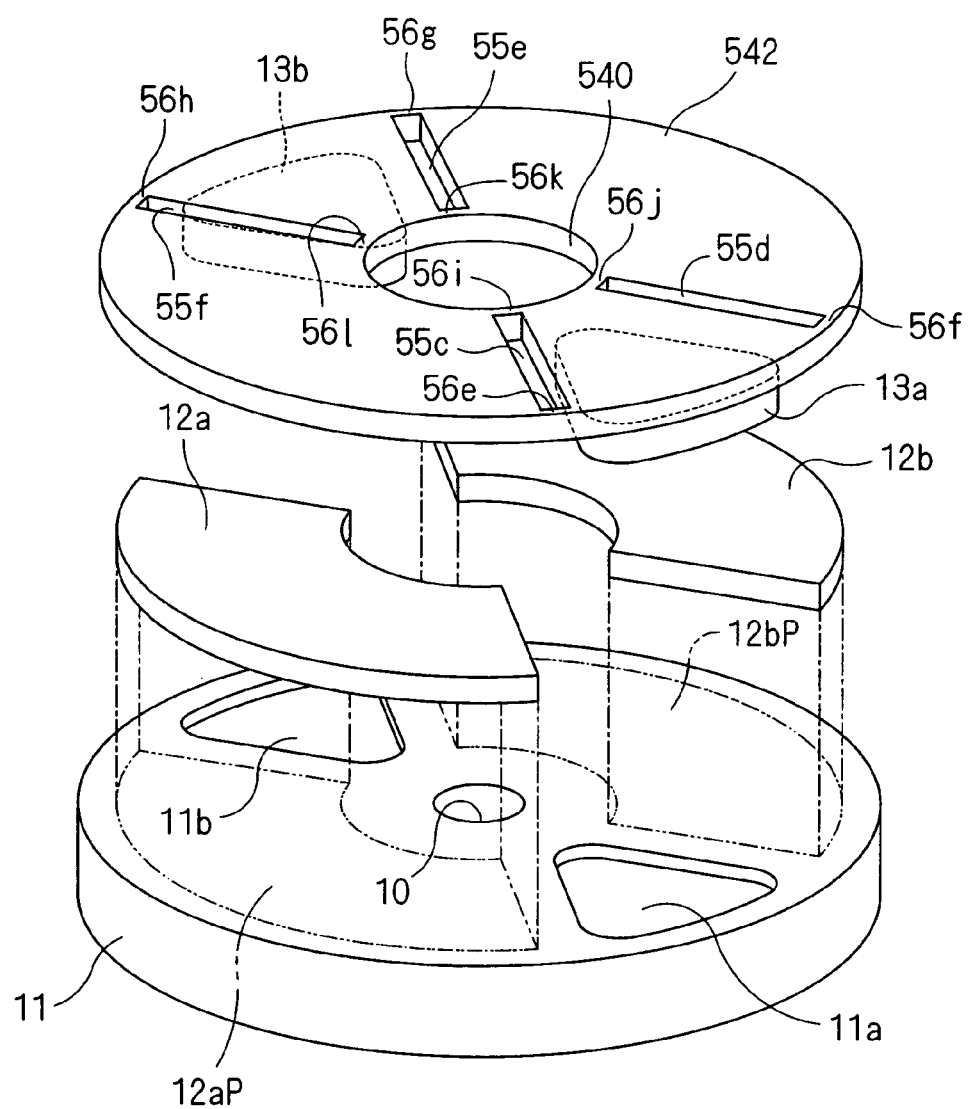
FIG. 46 is a perspective view illustrating a method of manufacturing a rotor according to a tenth embodiment of the present invention.
Figure 47:
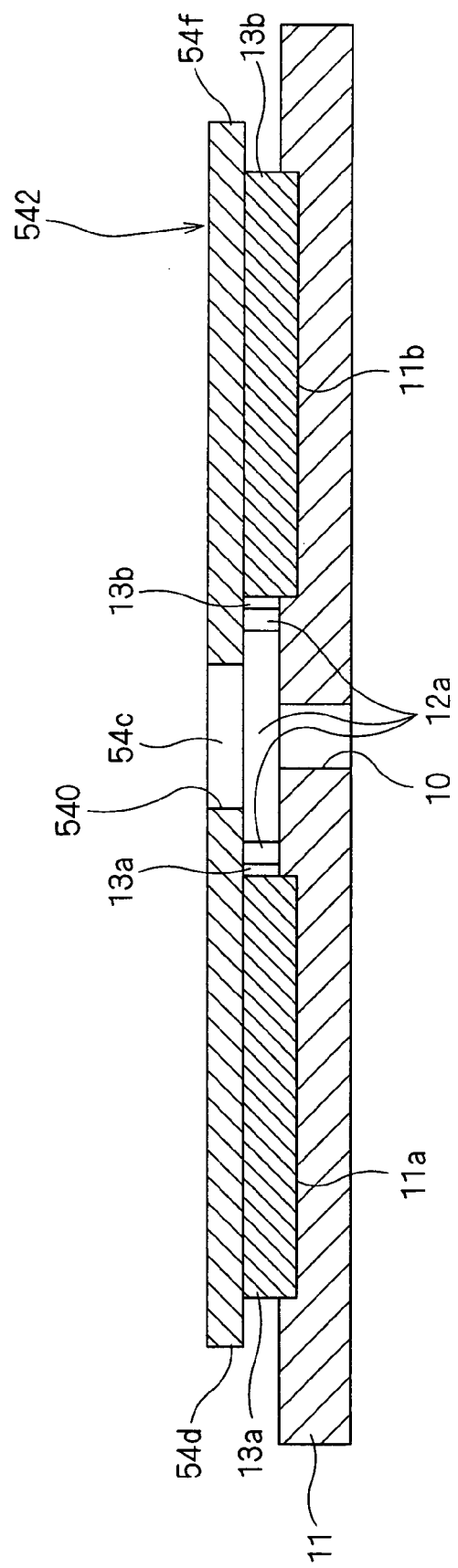
FIG. 47 is a sectional view of the rotor 1E when manufactured according to the tenth embodiment of the present invention.

FIG. 46 is a perspective view illustrating a method of manufacturing a rotor according to a tenth embodiment of the present invention. This can be employed as a method of manufacturing the rotor 1E shown in FIG. 24. FIG. 47 is a sectional view of the rotor 1E when manufactured according to the present embodiment, and shows a cross section in the same position as the sectional view shown in FIG. 25.

In the present embodiment, the substrate 11 is provided with recesses 11*a* and 11*b*, within which the magnetic members 13*a* and 13*b* fit in the direction along the rotation axis. Then, the magnetic members 13*a*, 13*b* and substrate 11 can easily be aligned, and both can easily be coupled.

Such structure, when viewed on the basis of the sectional view shown in FIG. 25, can be grasped that the substrate 11 is made of the same material as the magnetic members 13*a* and 13*b* in a position where the magnetic members 13*a* and 13*b* are extended along the rotation axis in a region having a predetermined length from the side of the magnetic plate 542. When the magnetic members 13*a* and 13*b* are made of dust core, the recesses 11*a* and 11*b* will be filled with iron dust core.

The substrate 11 other than the above-mentioned region may also be made of dust core. However, it is desirable that the substrate 11 other than the above-mentioned region be formed by stacking steel sheets perpendicular to the rotation axis. It is desirable to employ dust core in the above-mentioned region since the magnetic fluxes flow both in the direction parallel to the rotation axis and in the direction inclined thereto, and on the other hand, it is desirable to employ stacked steel sheets in terms of optimizing the magnetic characteristics of the rotor since most magnetic fluxes flow in the direction perpendicular to the rotation axis out of the above-mentioned region.

The structure in which stacked steel sheets, particularly, electromagnetic steel sheets are stacked is superior in magnetic characteristics in the direction perpendicular to the rotation axis, e.g., saturation magnetic flux density, permeability and iron loss. And, many magnetic fluxes in which the magnetic flux based on the current flown in the stator is superimposed on the magnetic fluxes of the permanent magnets need to flow in the substrate 11. Therefore, the substrate 11 can be reduced in thickness by employing stacked steel sheets for the substrate 11.

Further, it is also desirable to employ stacked steel sheets in terms of strength since there are many cases where the substrate 11 fits to the rotation shaft.

On the other hand, in the case where the rotor is a permanent magnet, variations in magnetic fluxes of permanent magnets result in many harmonics particularly by means of rotation of the rotor. Dust core having a low eddy-current loss is therefore desirable for the material of the magnetic plate 542.

Figure 48:
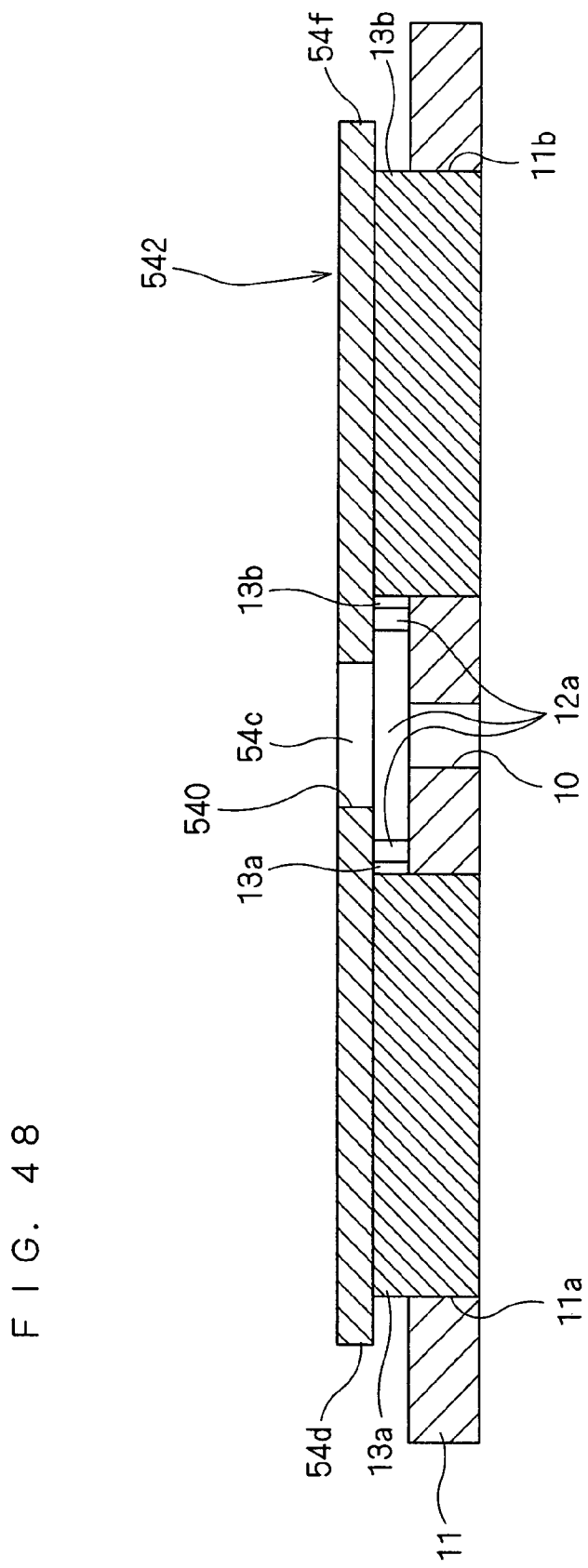
FIG. 48 is a sectional view showing another modification of the tenth embodiment of the present invention.

FIG. 48 is a sectional view showing another modification of the present embodiment, and shows a cross section in the position corresponding to FIGS. 25 and 47. In the substrate 11, the recesses 11*a* and 11*b* are both through holes, and the magnetic members 13*a* and 13*b* extend through the substrate 11 at the through holes in the direction along the rotation axis. At this time, it is desirable to employ dust core for the magnetic plate 542 and stacked steel sheets for the substrate 11 for similar reasons as described above. It is desirable that the magnetic members 13*a* and 13*b* be integral with magnetic members 54*d* and 54*f* of the magnetic plate 542 which cover the magnetic members 13*a* and 13*b*. This is because press fitting of the magnetic members 13*a* and 13*b* into the recesses (or through holes) 11*a* and 11*b* facilitates assembly of the rotor using the magnetic plate 542, magnetic members 13*a*, 13*b*, substrate 11, and magnets 12*a* and 12*b*.

The technique according to the present embodiment may be applied not only to the rotor 1E but also the rotors 1A (FIG. 1), 1C (FIG. 12), 1G (FIG. 37), 1I (FIG. 41) and 1K (FIG. 43).

Eleventh Embodiment

Figure 49:
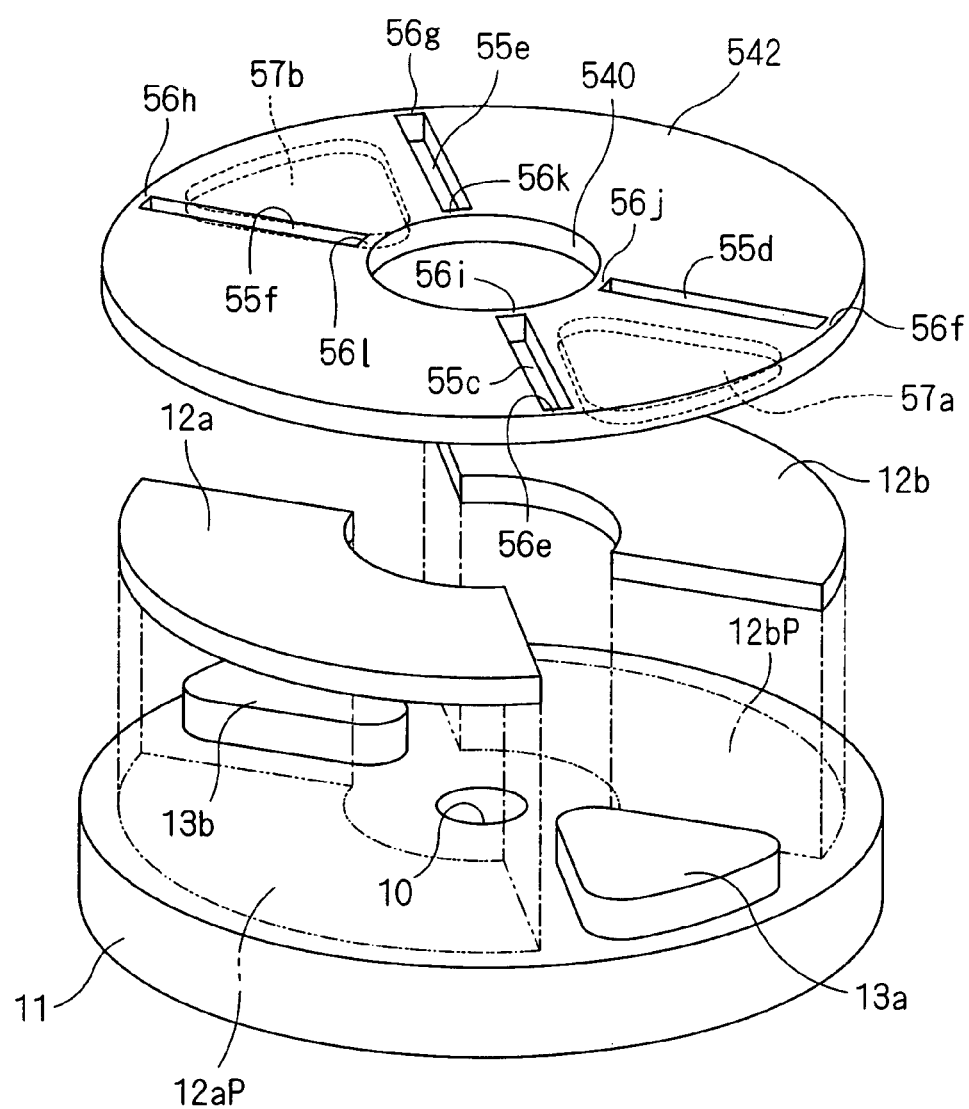
FIG. 49 is a perspective view illustrating a method of manufacturing a rotor according to an eleventh embodiment of the present invention.
Figure 50:
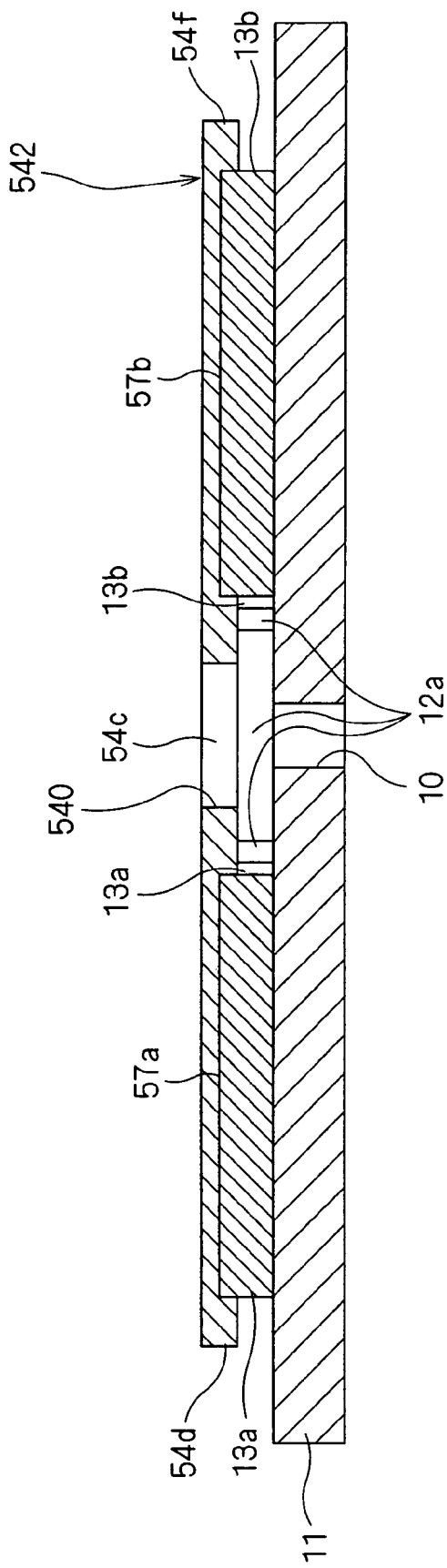
FIG. 50 is a sectional view of the rotor 1E when manufactured according to the eleventh embodiment of the present invention.

FIG. 49 is a perspective view illustrating a method of manufacturing a rotor according to an eleventh embodiment of the present invention. This can be employed as a method of manufacturing the rotor 1E shown in FIG. 24. FIG. 50 is a sectional view of the rotor 1E when manufactured according to the present embodiment, and shows a cross section in the same position as the sectional view shown in FIG. 25.

In the present embodiment, the magnetic members 54d and 54f of the magnetic plate 542 which cover the magnetic members 13a and 13b are provided with recesses 57a and 57b on the side of the magnetic members 13a and 13b, within which the magnetic members 13a and 13b fit in the direction along the rotation axis. Then, the magnetic members 13a, 13b and magnetic plate 542 can easily be aligned, and both can easily be coupled.

The magnetic plate 542 may be made of dust core along with the magnetic members 13a and 13b. In that case, the border between the magnetic members 13a, 13b and magnetic plate 542 arises no problem, provided that they fit ideally.

Figure 51:
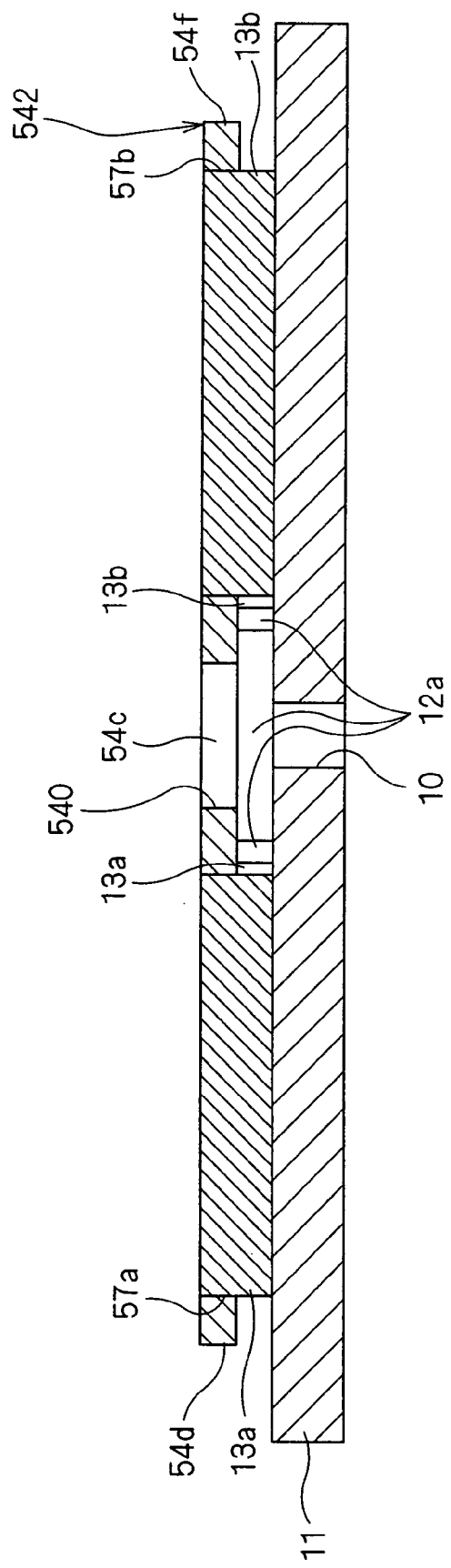
FIG. 51 is a sectional view showing a modification of the eleventh embodiment of the present invention.

FIG. 51 is a sectional view showing a modification of this embodiment, and shows a cross section in the position corresponding to FIGS. 25 and 50. In the magnetic plate 542, the recesses 57a and 57b are both through holes, and the magnetic members 13a and 13b extend through the magnetic plate 542 at the through holes in the direction along the rotation axis.

It is desirable that the magnetic members 13a and 13b be integral with the substrate 11. This is because it facilitates assembly of the rotor using the substrate 11, magnetic members 13a, 13b, magnetic plate 542, and magnets 12a and 12b.

The technique according to the present embodiment may be applied not only to the rotor 1E but also to the rotors 1K (FIG. 43) and 1L (FIG. 44).

Twelfth Embodiment

Figure 52:
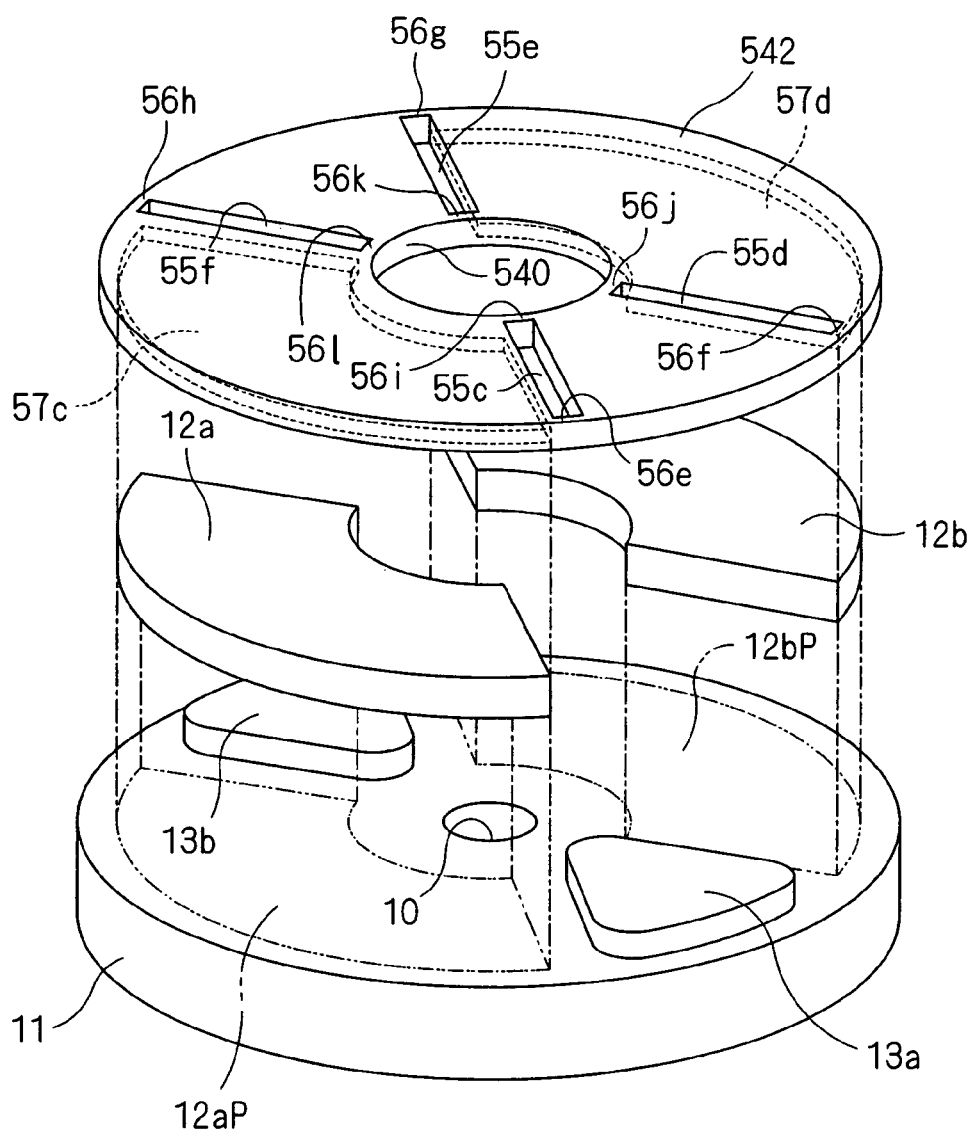
FIG. 52 is a perspective view illustrating a method of manufacturing a rotor according to a twelfth embodiment of the present invention.
Figure 53:
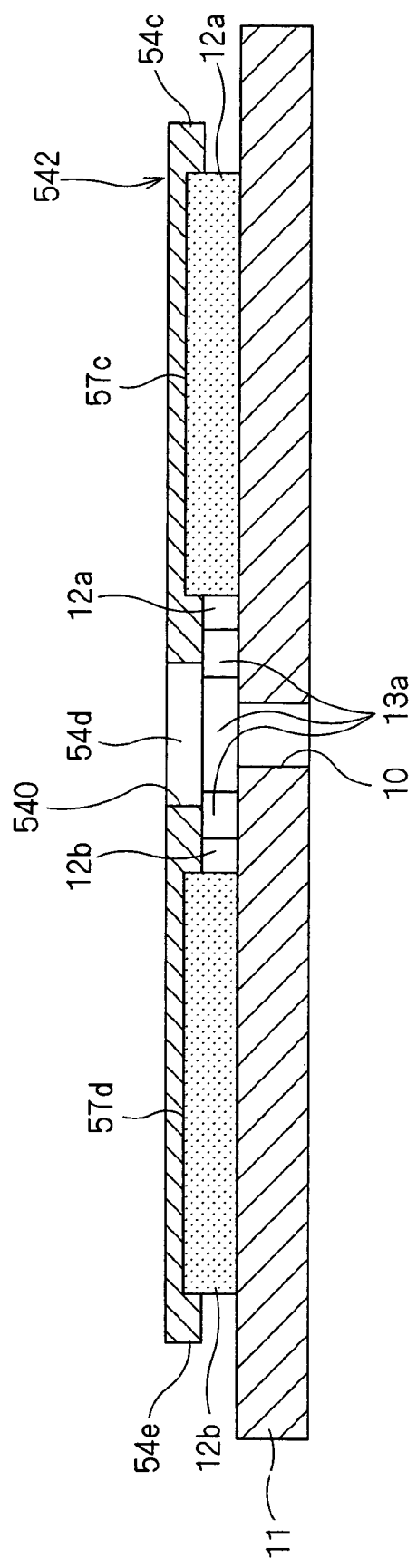
FIG. 53 is a sectional view of the rotor 1E when manufactured according to the twelfth embodiment of the present invention.

FIG. 52 is a perspective view illustrating a method of manufacturing a rotor according to a twelfth embodiment of the present invention. This can be employed as a method of manufacturing the rotor 1E shown in FIG. 24. FIG. 53 is a sectional view of the rotor 1E when manufactured according to the present embodiment, and shows a cross section in the same position as the sectional view shown in FIG. 26.

In the present embodiment, the magnetic members 54d and 54f of the magnetic plate 542 which cover the magnets 12a and 12b are provided with recesses 57c and 57d on the side of the magnets 12a and 12b, within which the magnets 12a and 12b fit in the direction along the rotation axis. Then, the magnets 12a, 12b and magnetic plate 542 can easily be aligned, and both can easily be coupled.

The technique of embedding the magnets in the magnetic plate in this manner may be applied not only to the rotor 1E but also to the rotors 1F (FIG. 29), 1F1 (FIG. 30), 1K (FIG. 43), 1L (FIG. 44) and 1M (FIG. 45).

Figure 54:
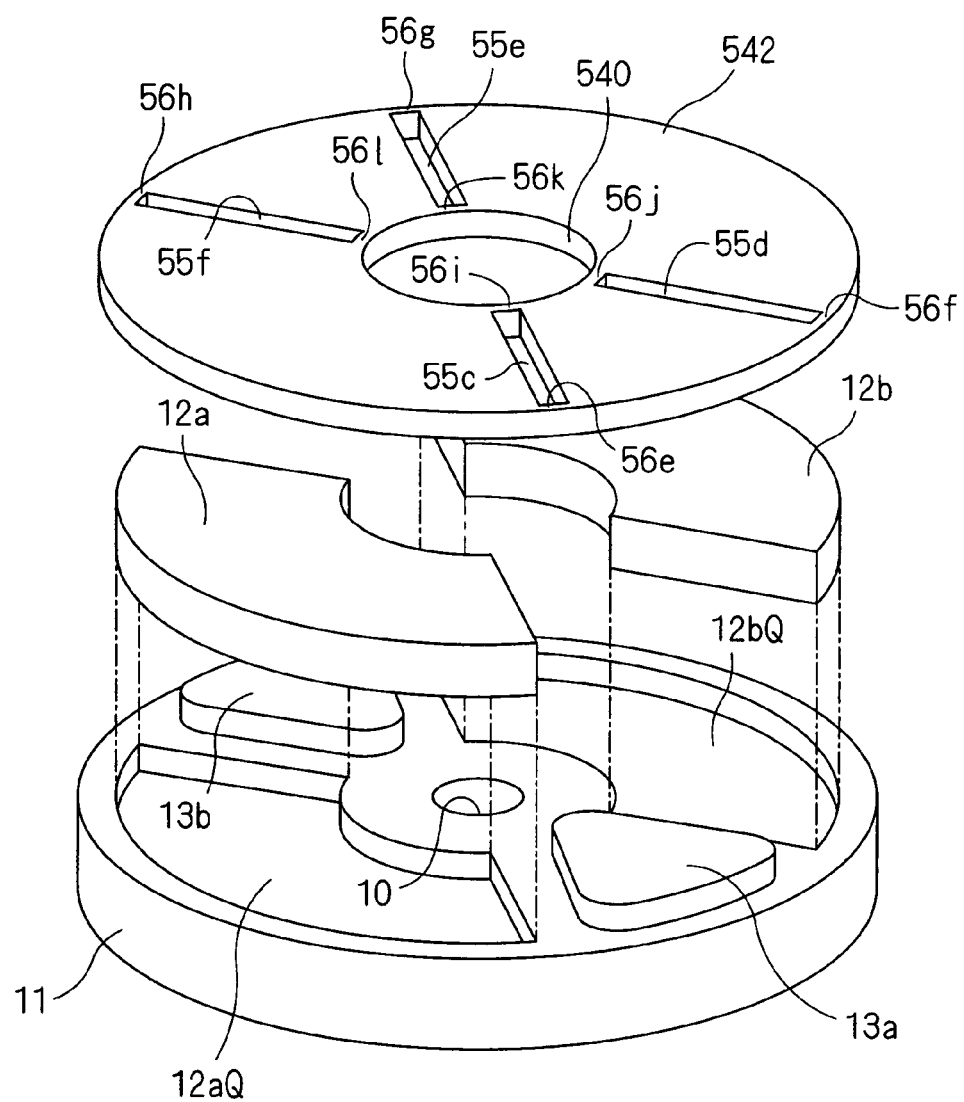
FIG. 54 is a perspective view illustrating another method of manufacturing the rotor according to the twelfth embodiment of the present invention. .
Figure 55:
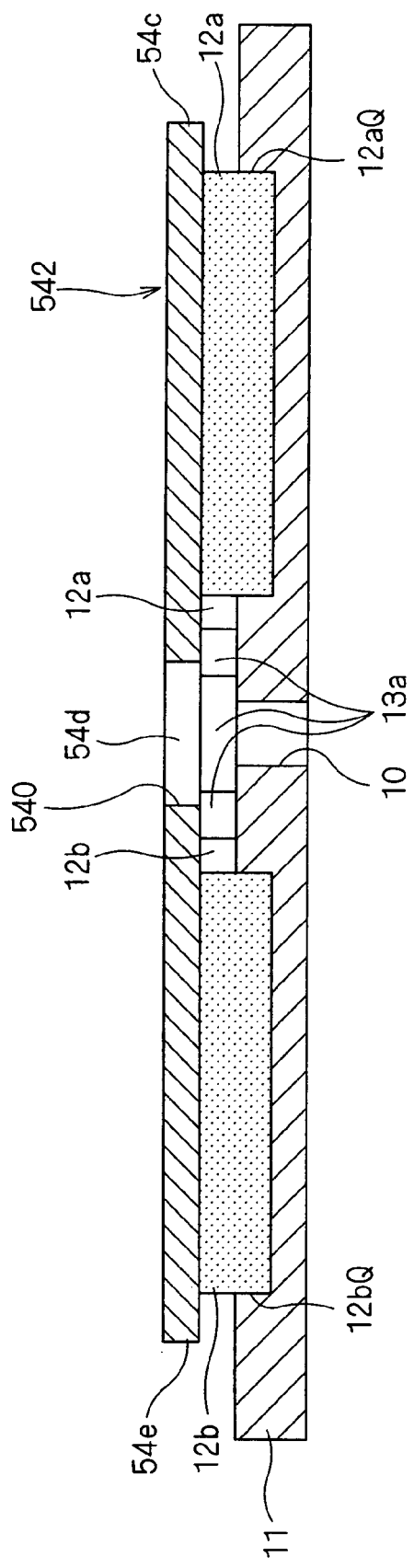
FIG. 55 is a sectional view of the rotor 1E when manufactured according to a modification of the twelfth embodiment of the present invention.

FIG. 54 is a perspective view illustrating another method of manufacturing the rotor according to this embodiment. FIG. 55 is a sectional view of the rotor 1E when manufactured according to this modification, and shows a cross section in the same position as the sectional view shown in FIG. 26.

In this modification, the substrate 11 is provided with recesses 12aQ and 12bQ, within which the magnets 12a and 12b fit in the direction along the rotation axis. Then, the magnets 12a, 12b and substrate 11 can easily be aligned, and both can easily be coupled.

The technique of embedding the magnets in the magnetic plate in this manner may be applied not only to the rotor 1E but also to the rotors 1A (FIG. 1), 1C (FIG. 12), 1F (FIG. 29), 1F1 (FIG. 30), 1G (FIG. 37), 1I (FIG. 41) and 1K (FIG. 43).

Figure 56:
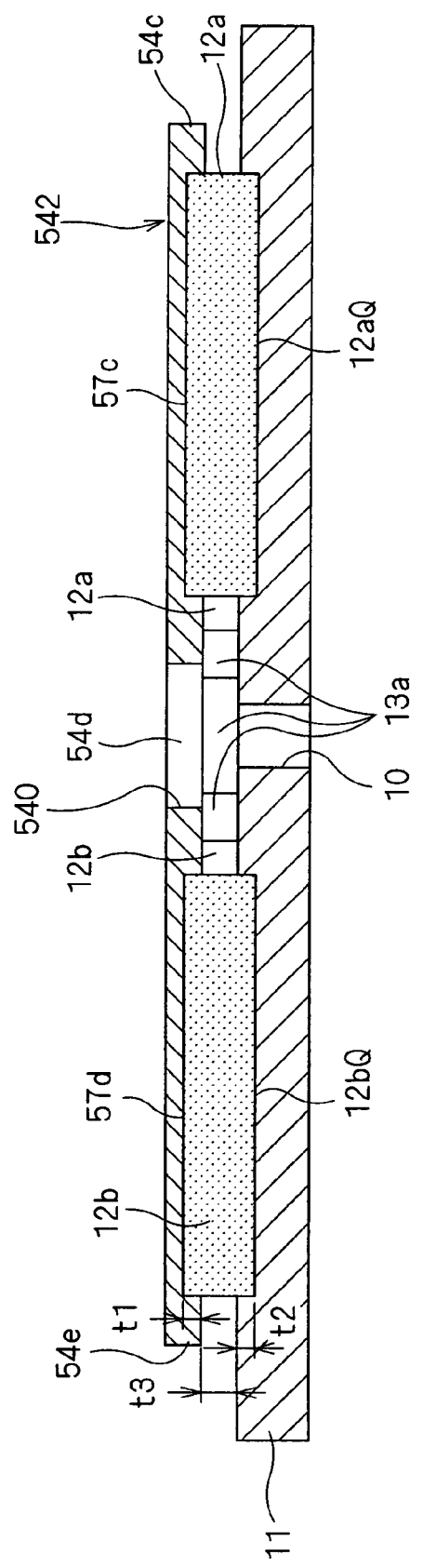
FIG. 56 is a sectional view showing another modification of the twelfth embodiment of the present invention.

FIG. 56 is a sectional view showing another modification of the present embodiment, and shows a cross section in the same position as the sectional view shown in FIG. 26. A structure in which the recesses 57c, 57d, recesses 12aQ and 12bQ are all provided is shown, and the magnets 12a and 12b are embedded in the magnetic plate 542 and substrate 11 with thicknesses t1 and t2, respectively. Introducing distance t3 between the yoke side of the magnetic plate 542 and the magnetic plate 542 side of the substrate 11, the thickness of the magnets 12a and 12b is the sum of the thicknesses t1, t2 and distance t3.

When the distance t3 is small, the magnetic flux generated by each of the magnets 12a and 12b flows between the substrate 11 and magnetic plate 542 in a short circuiting manner without interlinking with the stator. In other words, in order to flow the magnetic flux effectively to the stator, it is desirable to design the thickness of the magnets 12a and 12b to not less than the sum of twice the interposed distance to armature and thicknesses t1, t2.

Of course, the desirableness that the distance between the substrate 11 and magnetic plate 542 be not less than twice the interposed distance to armature is not limited to the present embodiment, but applies similarly to the other embodiments. Additionally saying, it is desirable that the distance between the magnetic plates 542 and 544 (or magnetic plates 541 and 545) interposing the magnets 12a and 12b be not less than twice the interposed distance to armature, like the rotors 1L (FIGS. 44) and 1M (FIG. 45).

Thirteenth Embodiment

Figure 57:
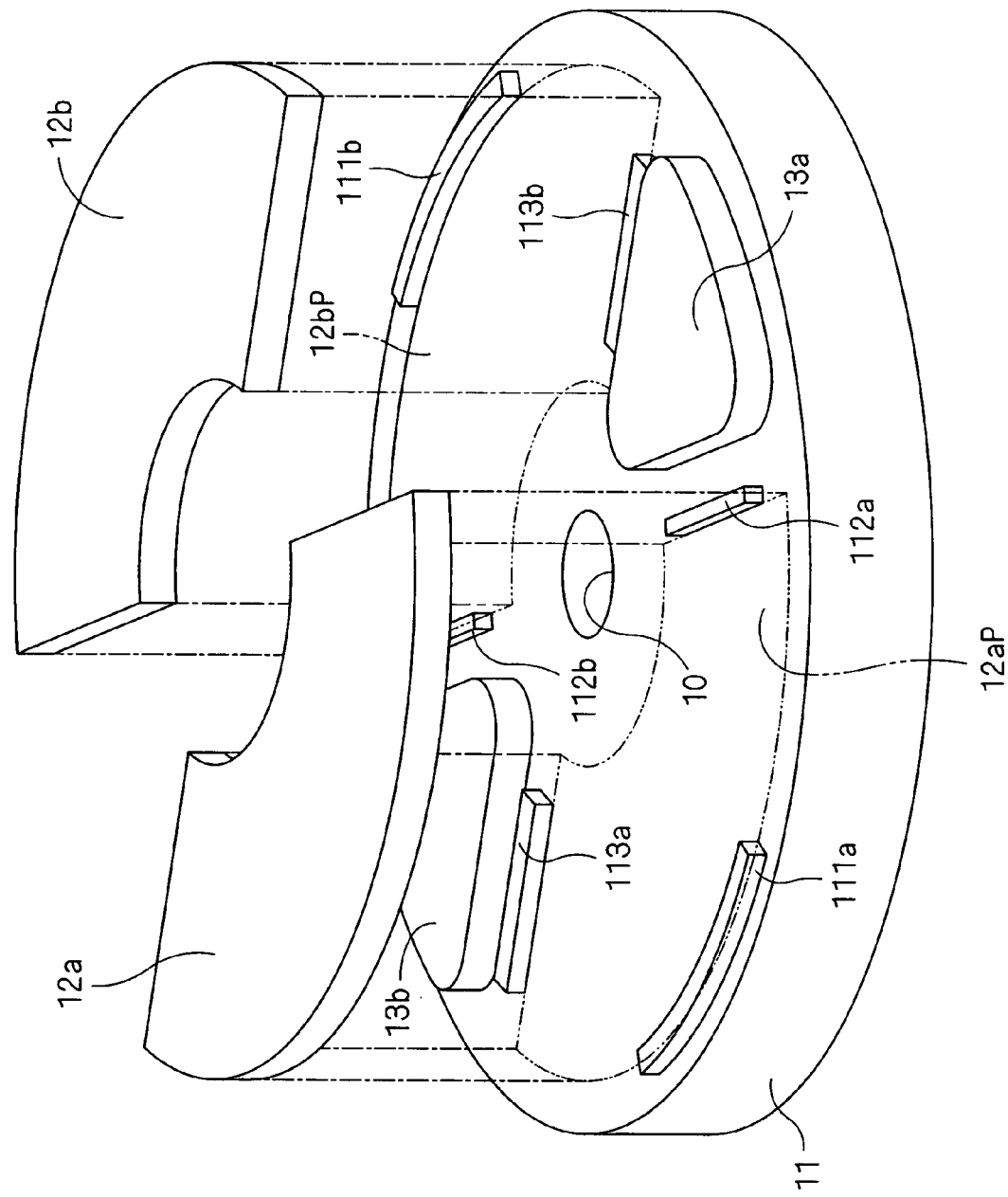
FIG. 57 is a perspective view illustrating a method of manufacturing a rotor according to a thirteenth embodiment of the present invention.
Figure 58:
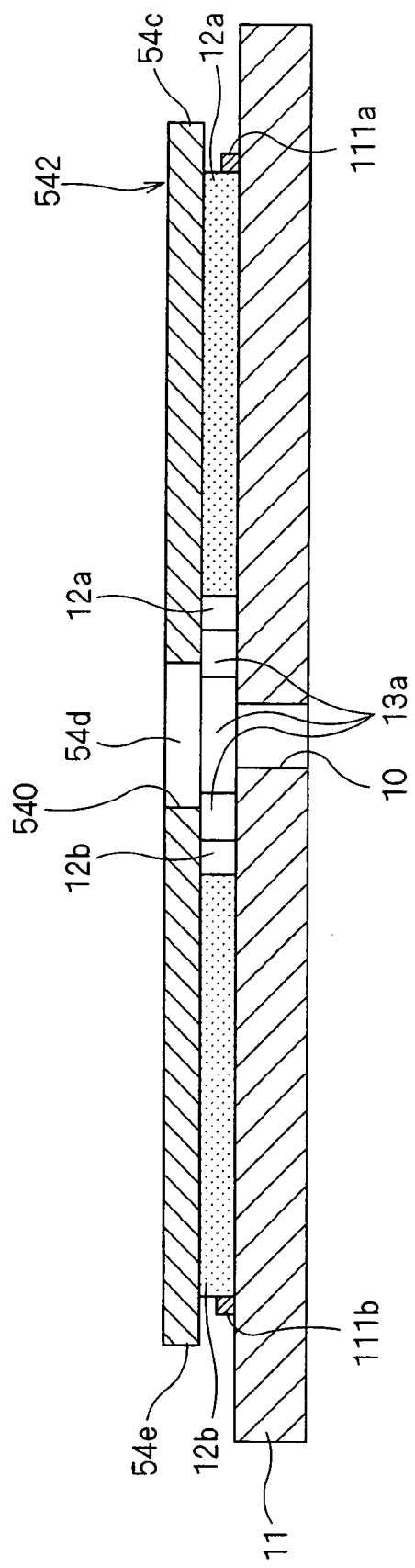
FIG. 58 is a sectional view of the rotor 1E when manufactured according to the thirteenth embodiment of the present invention.

FIG. 57 is a perspective view illustrating a method of manufacturing a rotor according to a thirteenth embodiment of the present invention. FIG. 58 is a sectional view of the rotor 1E manufactured according to the present embodiment corresponding to the position of FIG. 26. While description will be made here taking the rotor 1E shown in FIG. 24 as an example, it may be applied to other rotors 1A (FIG. 1), 1C (FIG. 12), 1F (FIG. 29), 1F1 (FIG. 30), 1G (FIG. 37), 1I (FIG. 41) and 1K (FIG. 43).

Ridges 111a and 111b coming into contact with the magnets 12a and 12b from their outer peripheral side are provided on the substrate 11. The ridges 111a and 111b facilitates alignment of the magnets 12a and 12b, and stop the magnets 12a and 12b against the centrifugal force produced in the magnets 12a and 12b by rotation of the rotor.

Ridges 112a, 112b, 113a and 113b coming into contact with the magnets 12a and 12b in the circumferential direction may be provided on the substrate 11. They also facilitate alignment of the magnets 12a and 12b.

Figure 59:
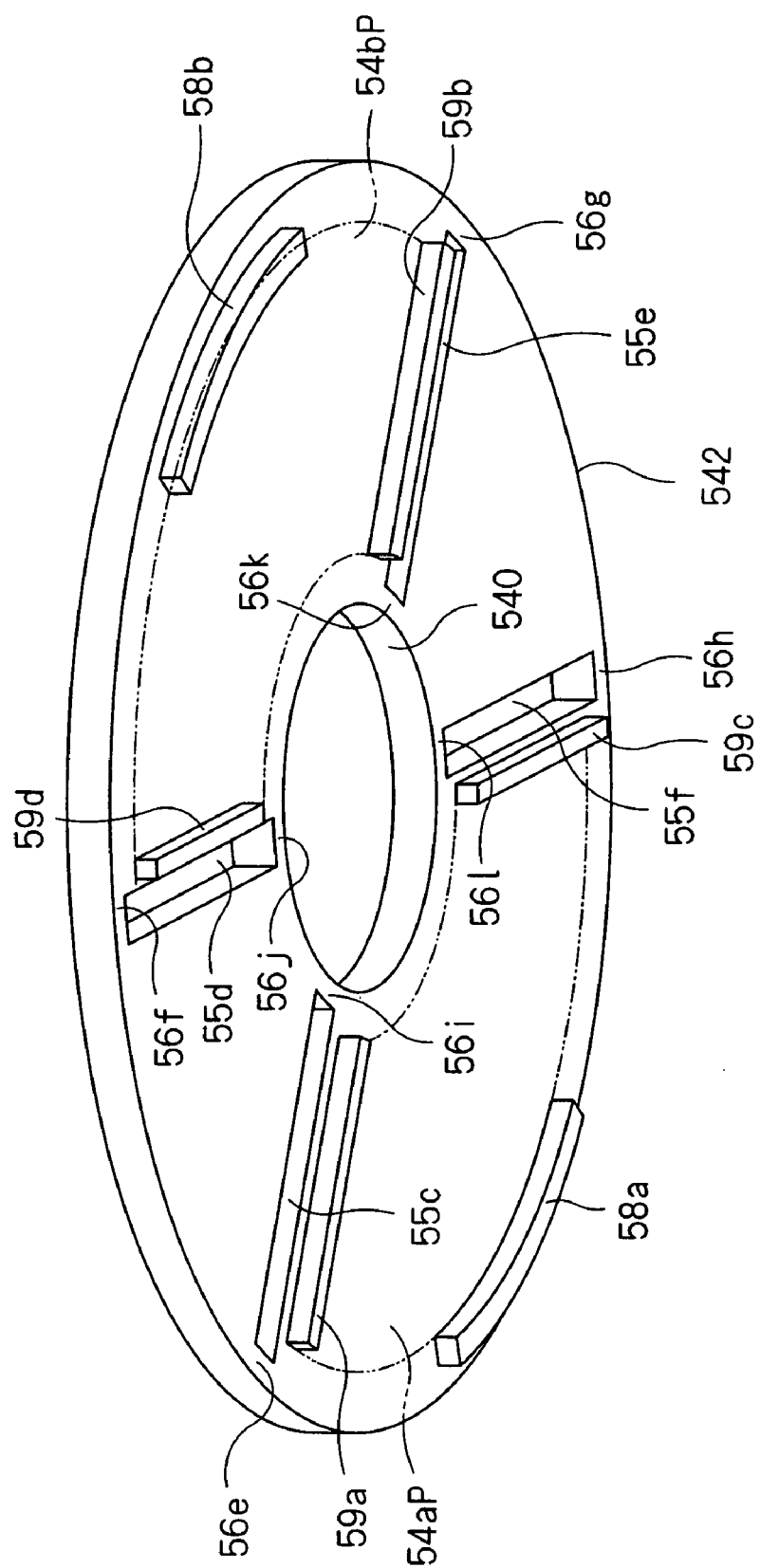
FIG. 59 is a perspective view illustrating another method of manufacturing the rotor according to the thirteenth embodiment of the present invention.
Figure 60:
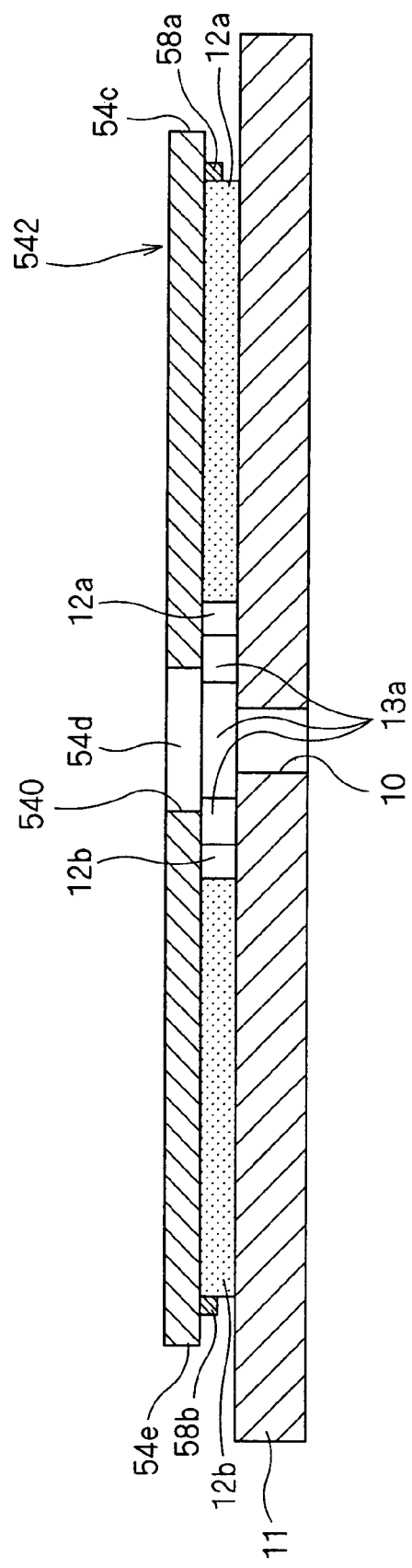
FIG. 60 is a sectional view of the rotor according to the thirteenth embodiment of the present invention.

FIG. 59 is a perspective view illustrating another method of manufacturing the rotor according to this embodiment. FIG. 60 is a sectional view corresponding to the position of FIG. 26. While description will be made here taking the rotor 1E shown in FIG. 24 as an example, it may be applied to other rotors 1F (FIG. 29), 1F1 (FIG. 30), 1K (FIG. 43), 1L (FIG. 44) and 1M (FIG. 45).

Ridges 58a and 58b coming into contact with the magnets 12a and 12b from their outer peripheral side are provided on the magnetic plate 542. The ridges 58a and 58b facilitate alignment of the magnets 12a and 12b, and stop the magnets 12a and 12b against the centrifugal force produced in the magnets 12a and 12b by rotation of the rotor.

Ridges 59a to 59d coming into contact with the magnets 12a and 12b in the circumferential direction may be provided on the magnetic plate 542. They also facilitate alignment of the magnets 12a and 12b.

It is desirable that the distance between the ridges 111a, 111b, 112a, 112b, 113a, 113b and magnetic plate 542, and the distance between the ridges 58a, 58b, 59a to 59d and substrate 11 not less than twice the interposed distance to armature, similarly to the aforementioned distance t3. This is to make the magnetic fluxes generated from the magnets 12a and 12b easier to flow into the stator.

However, the above-mentioned distances may be less than twice the interposed distance to armature, provided that width and length in which these ridges are provided are short. This is because these ridges are easy to become magnetically saturated, and have degraded function as the paths of magnetic fluxes.

The presence of the magnetic members 13a and 13b is not indispensable in the present embodiment. However, when they are provided, making them integral with the substrate 11 is desirable in terms of easier assembly of the rotor. Further, when a magnetic plate covering the magnets 12a and 12b is provided along with the magnetic members 13a and 13b, it is desirable that the magnetic plate be formed integrally with the magnetic members 13a and 13b from a similar point of view.

Fourteenth Embodiment

Figure 61:
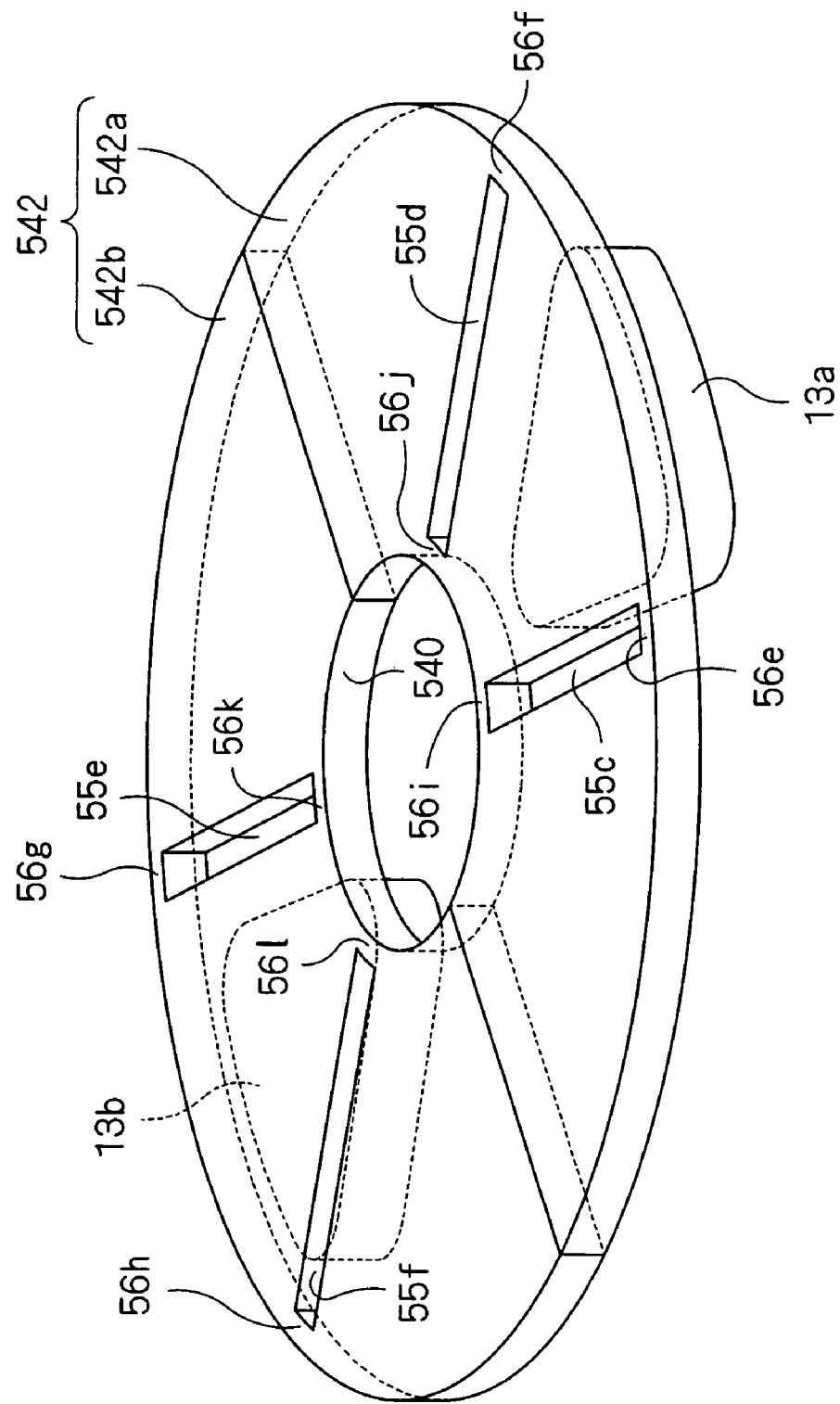
FIG. 61 is a perspective view illustrating the structure of a magnetic plate according to a fourteenth embodiment of the present invention.

FIG. 61 is a perspective view illustrating the structure of the magnetic plate 542 to be employed for a rotor according to a fourteenth embodiment of the present invention. While description will be made here taking the rotor 1E shown in FIG. 24 as an example, it may be applied to other rotors 1D (FIG. 20), 1F (FIG. 29), 1F1 (FIG. 30), 1K (FIG. 43), 1L (FIG. 44) and 1M (FIG. 45).

The magnetic plate 542 is composed of magnetic plate components 542a and 542b divided in a position where the pole faces of the magnets 12a and 12b (cf. FIG. 24, for example) are provided as viewed along the rotation axis (i.e., in plan view). For instance, the position of division is the position XXVI-XXVI shown in FIG. 24.

Dust core is generally formed, but press pressure can be made lower as a compressed portion decreases in area. Therefore, dividing the magnetic plate 542 into small-size magnetic plate components 542a and 542b facilitates manufacture by dust core.

The presence of the magnetic members 13a and 13b is not indispensable in the present embodiment. However, when they are provided, making them integral with the magnetic plate 542 is desirable in terms of facilitating alignment of the magnetic plate components 542a and 542b and assembly of the rotor.

Figure 62:
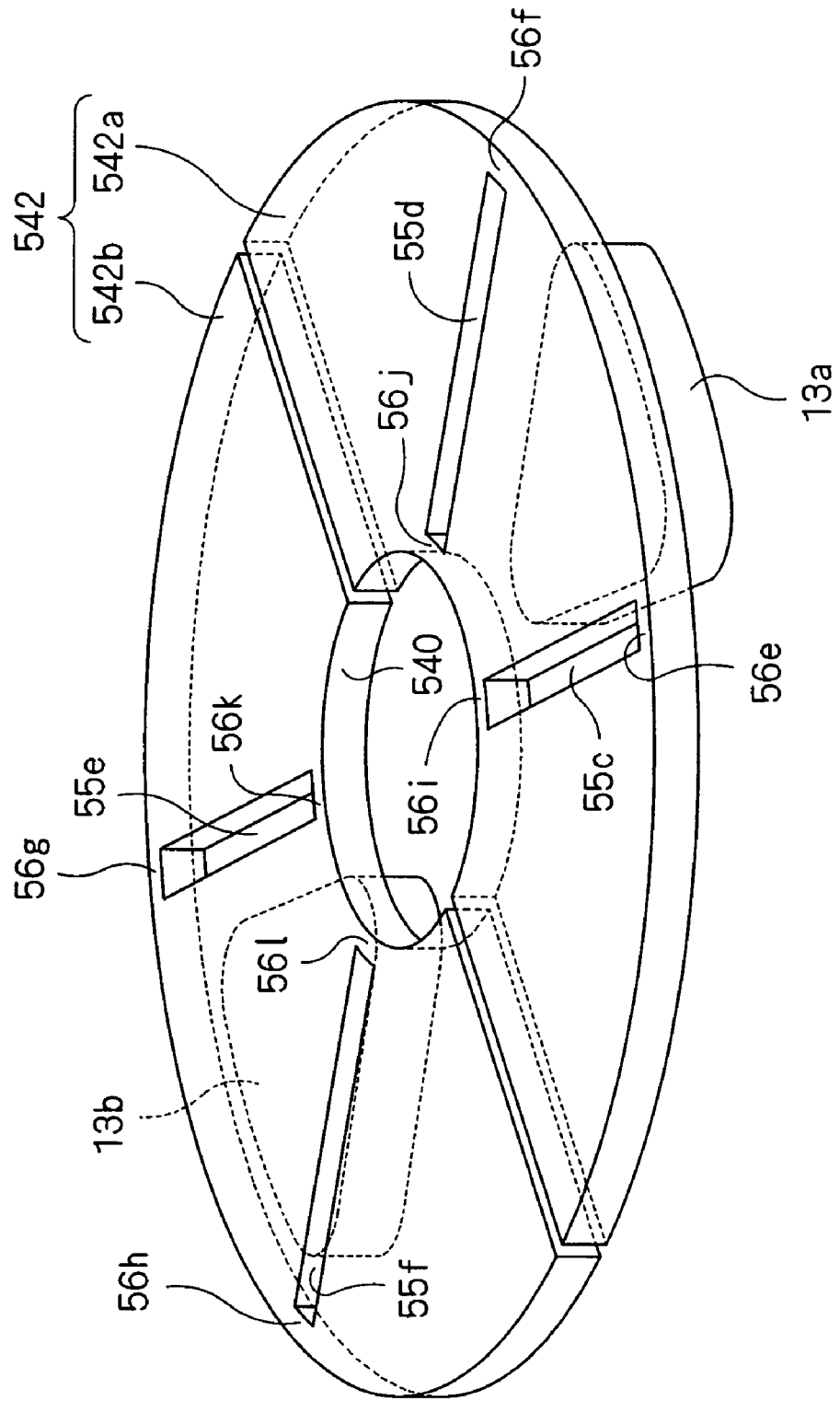
FIG. 62 is a perspective view illustrating another structure of the magnetic plate according to the fourteenth embodiment of the present invention.

As shown in FIG. 62, the magnetic plate components 542a and 542b may be adjacent to each other leaving gaps. The gaps are to be opposed to the stator side. Since the cogging torque is generally generated by variations in magnetic resistance of the gaps between the stator and rotor, the gaps serve as so-called supplemental grooves for shortening the cycle of cogging torque. The cogging torque is thereby reduced.

Figure 63:
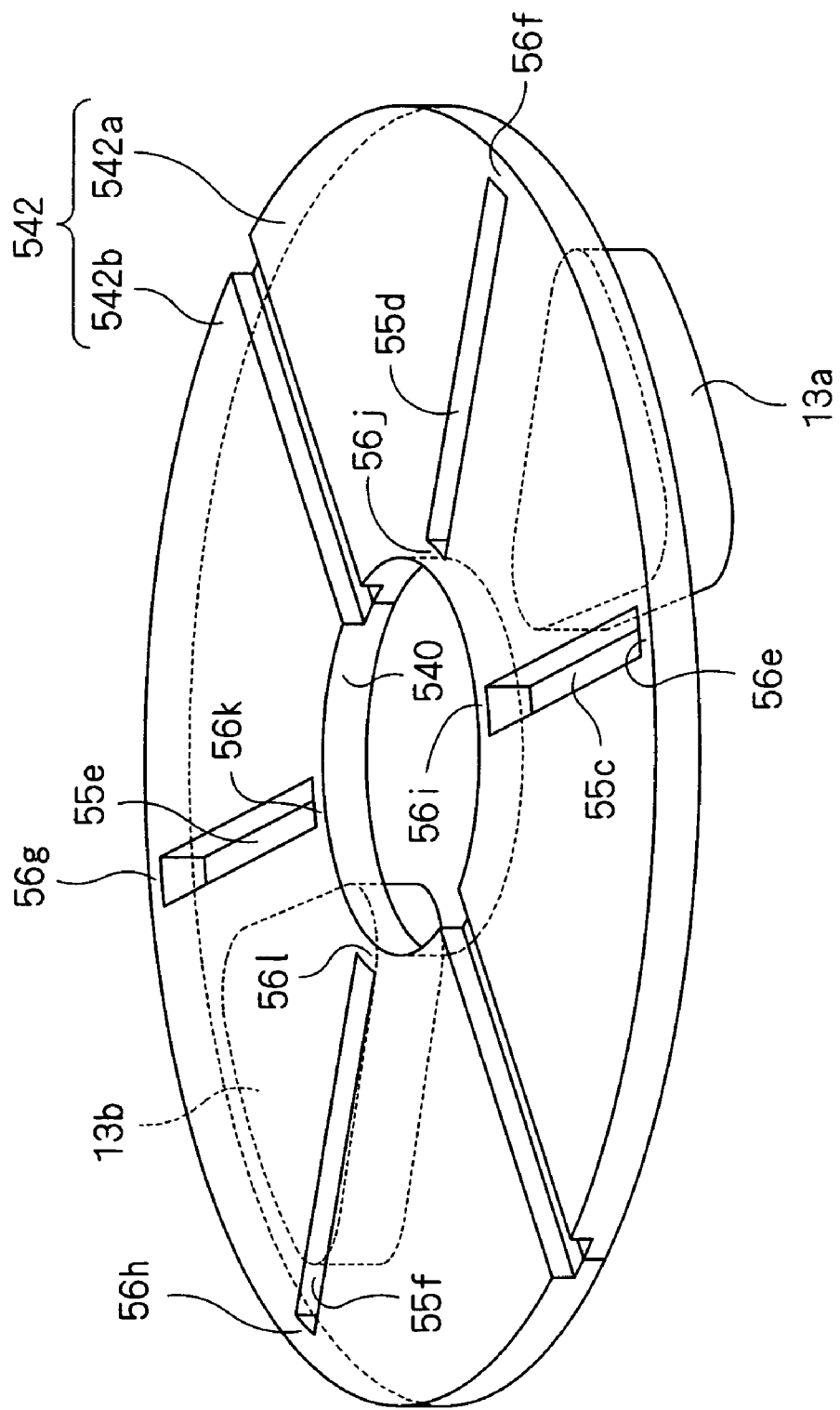
FIG. 63 is a perspective view illustrating still another structure of the magnetic plate according to the fourteenth embodiment of the present invention.

Further, the magnetic plate components 542a and 542b may have steps on their edges in the circumferential direction with respect to the direction along the rotation axis. FIG. 63 is a perspective view showing the state where the magnetic plate components 542a and 542b having the steps are adjacent to each other. The steps of the adjacent magnetic plate components 542a and 542b are adjacent to each other. And, these steps form recesses which come into contact on the side where the magnetic members 13a and 13b are provided and open on the opposite side (the stator side). In this mode, the cogging torque can also be reduced as described above. Further, the magnetic plate components 542a and 542b are in contact on the side where the magnets 12a and 12b are provided, which permits effective use of the magnetic fluxes form the magnets 12a and 12b.

Figure 64:
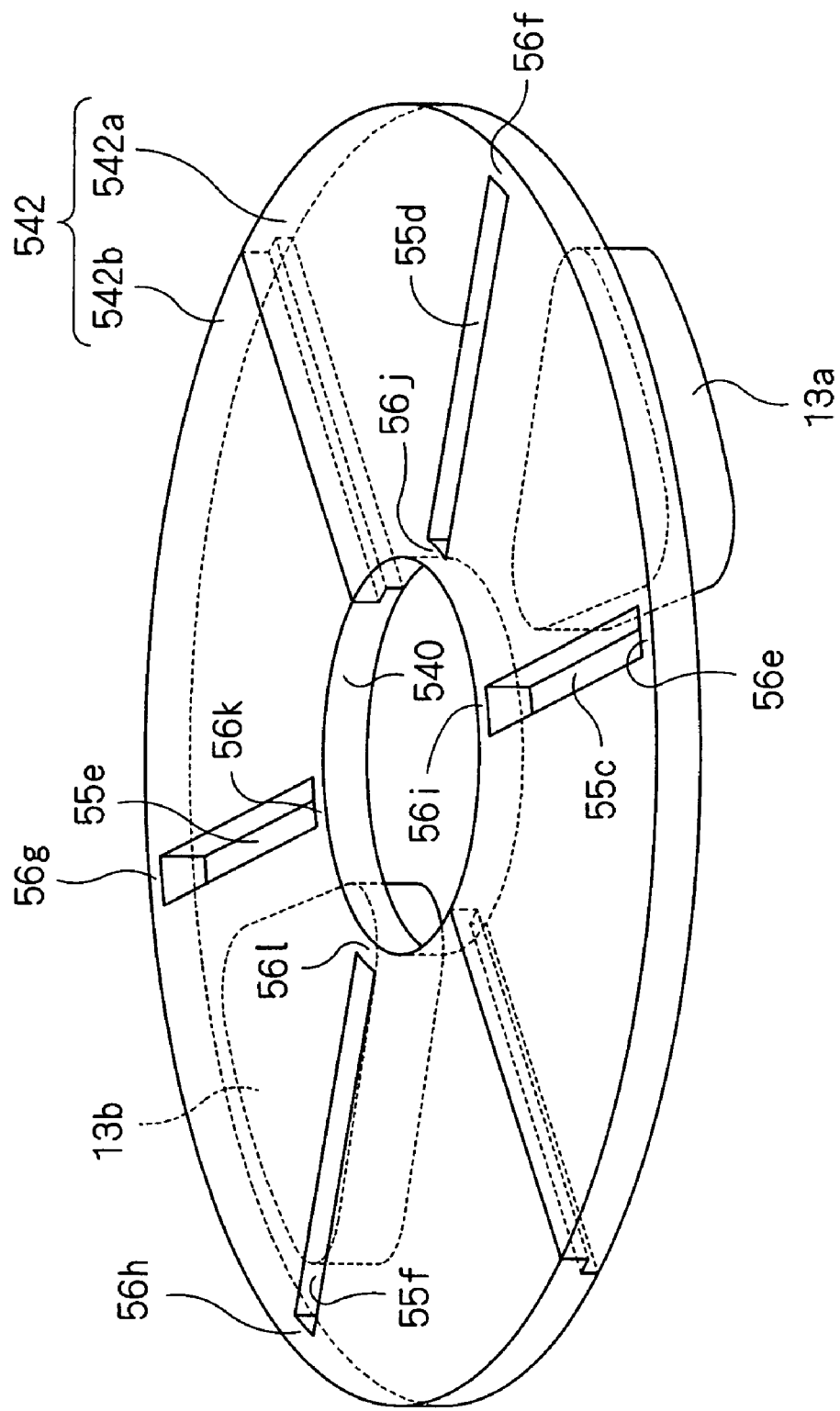
FIG. 64 is a perspective view illustrating still more another structure of the magnetic plate according to the fourteenth embodiment of the present invention.

Of course, the magnetic plate 542 may be formed with steps engaging with each other as shown in FIG. 64 without forming such recesses. Such engagement of steps is desirable in terms of making the structure of the magnetic plate composed of magnetic plate components strong.

Various Modifications

It is known that it is desirable that the angle at which a magnet extends to be widened in the circumferential direction fall within the range of {(120±20)/P} degrees, assuming the pole pair number to be P. It is therefore desirable in the rotors 1A to 1E, for example, that the angle at which the magnets 12a and 12b are widened in the circumferential direction fall within the range of (120±20) degrees. Further, in the rotors 1F and 1F1, it is desirable that the angle at which the magnets 12c to 12f are widened in the circumferential direction fall within the range of (60±10) degrees.

To prevent the magnetic fluxes from short circuiting through the rotation shaft in the rotor, it is desirable to provide the gap G2 (FIGS. 1, 5, 12, etc.), provide the cylinder 40 (FIG. 39) or employ non-magnetic steel for the rotation shaft, as described above.

To earn the distance corresponding to the gap G2, non-magnetic bosses may be provided on the inner periphery of the shaft hole 10 of the substrate 11 (FIGS. 1, 5, 12, etc.), the rotation shaft may be inserted into the shaft hole 10 with the bosses interposed therebetween.

It is not always required to provide the shaft hole 10 in the rotor. For instance, the rotation shaft may only be strongly coupled in the position of the shaft hole without coming into contact with the magnets and magnetic members. Further, the rotation shaft may be omitted like a magnetic bearing.

While the invention has been shown and described in detail, the foregoing description is in all aspects illustrative and the present invention is not limited thereto. It is therefore understood that numerous modifications not illustrated can be devised without departing from the scope of the invention.

What is claimed is:

1. A rotor comprising:
   a plurality of magnets, each having a pole face, disposed annularly with polarities being symmetric around a predetermined axis;
   a plurality of magnetic members;
   other magnetic members provided to cover said pole face of said magnets magnetically independently and individually on one side of said axis; and
   a magnetic plate covering said pole face and said magnetic members on said one side, said magnetic plate having opening slits extending from positions close to said axis to farther positions between said magnetic members and said magnets as viewed along said axis, divisions of said magnetic plate divided by said slits in a circumferential direction around said axis that cover said pole face serving as said other magnetic members, said other magnetic members being connected to divisions of said magnetic plate divided by said slits in the circumferential direction around said axis that cover said magnetic members with thin portions interposed therebetween at least on the side of one ends of said slits, an inductance along an axis passing through a first type of said magnets having said pole face exhibiting a first polarity with respect to said one side of said axis and a second type of said magnets having said pole face exhibiting a second polarity with respect to said one side being smaller than an inductance along an axis bypassing said first and second types of said magnets perpendicular to the axis passing through said magnets, and said magnetic members being provided at least between said first type of said magnets and said second type of said magnets.

2. The rotor according to claim 1, wherein
the width of said slits in said circumferential direction is chosen to be not less than twice the distance between a pole face of a stator opposed to the rotor to constitute a motor and surfaces of said other magnetic members on the side of the stator.

3. The rotor according to claim 1, wherein
said magnetic plate has recesses or through holes into which said magnetic members lit in the direction along said axis.

4. The rotor according to claim 3, further comprising
a yoke backing said magnets from the other side of said axis, wherein
said yoke and said magnetic members are formed integrally.

5. The rotor according to claim 4, wherein
a distance between the other side of said magnetic plate relative to said axis and said one side of said yoke is chosen to be not less than twice the distance between a pole face of a stator opposed to the rotor to constitute a motor and a surface of said magnetic plate on the side of the stator.

6. The rotor according to claim 1, wherein
said magnetic plate has recesses into which said magnets fit in the direction along said axis.

7. The rotor according to claim 6, further comprising
a yoke backing said magnets from the other side of said axis, wherein
said yoke and said magnetic members are formed integrally.

8. The rotor according to claim 1, further comprising
ridges provided on said magnetic plate and coming into contact with said magnets from their outer peripheral sides.

9. The rotor according to claim 8, wherein
a distance between the said one side of said yoke and the other side of said ridges relative to said axis is chosen to be not less than twice the distance between a pole lace of a stator opposed to the rotor to constitute a motor and a surface of said magnetic plate on the side of the stator.

10. The rotor according to l, further comprising
ridges provided on said magnetic plate and coming into contact with said magnets from the side of the circumferential direction around said axis.

11. The rotor according to claim 10, wherein
a distance between the said one side of said yoke and the other side of said ridges relative to said axis is chosen to be not less than twice the distance between a pole thee of a stator opposed to the rotor to constitute a motor and a surface of said magnetic plate on the side of the stator.

12. The rotor according to claim 1, wherein
said magnetic plate is composed of magnetic plate components divided in a position where said pole face is disposed as viewed along said axis.

13. The rotor according to claim 12, wherein
said magnetic plate components are adjacent to each other leaving gaps.

14. The rotor according to claim 12, wherein
edges of said magnetic plate components in the circumferential direction have steps in the direction along said axis, and
the steps of said magnetic plate components adjacent to each other engage with each other to constitute said magnetic plate.

15. The rotor according to claim 12, wherein
edges of said magnetic plate components in the circumferential direction have steps in the direction along said axis, and
the steps of said magnetic plate components adjacent to each other are adjacent to each other, and form recesses which open on said one side and are in contact with each other on the other side of said axis.

16. An axial gap type motor comprising the rotor defined in claim 1 and a stator, wherein
said stator includes:
a plurality of magnetic cores standing along said axis;
windings wound around said magnetic cores; and
a magnetic plate mounted on said magnetic cores and having opening slits extending from positions close to said axis to farther positions.

17. An axial gap type motor comprising the rotor defined in claim 1 and a stator, wherein
said stator includes:
a substrate having a surface perpendicular to said axis;
a pair of first-stage spacers separated from each other and each extending at an angle of about 180 degrees, on said surface in the circumferential direction of said axis;
a pair of second-stage spacers extending at ends of said first-stage spacers at an angle of about 120 degrees in said circumferential direction on said first-stage spacers, respectively;
a pair of magnetic cores provided on said first-stage spacers, respectively;
two pairs of magnetic cores provided on said second-stage spacers, respectively;
a pair of first windings provided on said substrate and winding three of said magnetic cores:
a pair of second windings provided on said first-stage spacers and said first windings and winding three of said magnetic cores; and
a pair of third windings provided on said second-stage spacers and said second windings and winding three of said magnetic cores, wherein
said first windings, said second windings and said third windings are arranged to be shifted 120 degrees from one another in said circumferential direction.

18. A method of driving an axial gap type motor comprising
the rotor defined in claim 1 and a stator opposed to said rotor, by flowing a sinusoidal current to said stator.

19. The compressor according to claim 18, further comprising
a compression element driven by said motor, wherein
said compression element is provided below said motor.

20. A method of driving an axial gap type motor comprising
the rotor defined in claim 1 and a stator opposed to said rotor, by flowing a leading current to said stator.

21. A compressor equipped with an axial gap type motor comprising
the rotor defined in claim 1 and a stator opposed to said rotor.

22. An axial gap type motor comprising:
a rotor including
a plurality of magnets, each having a pole face, disposed annularly with polarities being symmetric around a predetermined axis,
a plurality of magnetic members provided to cover said pole face at least on one side of said axis, and
a magnetic plate covering said pole face on said one side, said magnetic plate having opening slits extending from positions close to said axis to farther positions between said magnetic members as viewed along said predetermined axis, said magnetic plate divided by said slits in the circumferential direction around said axis serving as said magnetic members, said magnetic members being connected to each other with thin portions interposed therebetween at least on the side of one end of said slits,
an inductance along an axis passing through a first type of said magnets having said pole face exhibiting a first polarity with respect to said one side of said axis and a second type of said magnets having said pole face exhibiting a second polarity with respect to said one side being smaller than an inductance along an axis bypassing said first and second types of said magnets perpendicular to the axis passing through said magnets; and
a stator opposing the pole faces with the magnetic plate interposed therebetween.

23. The motor according to claim 22, wherein the width of said slits in said circumferential direction is chosen to be not less than twice the distance between a pole face of the stator opposed to the rotor and a pole face of the rotor.

24. The motor according to claim 22, wherein
said first type of said magnets and said second type of said magnets are formed integrally by a ring-like magnet, and
said ring-like magnet is unmagnetized in positions where said slits are provided in plan view as viewed along said axis.

25. The motor according to claim 22, wherein
the area of one of said magnetic members covering one of said pole face is larger than the area of said pole face.

26. The motor according to claim 22, wherein
said slits are provided in the vicinity of the border between said first type of said magnets and said second type of said magnets.

27. The motor according to claim 22, further comprising
a magnetic plate covering a pole face further provided for said first type of said magnets exhibiting said second polarity and a pole face further provided for said second type of said magnets exhibiting said first polarity, on the other side of said axis, and being of almost the same type as said magnetic plate covering said pole face on said one side.

28. The motor according to claim 22, further comprising
other magnetic members provided between said first type of said magnets and said second type of said magnets, wherein
said slits are provided in the vicinity of the border between the other magnetic members and said magnets.

29. The motor according to claim 22, wherein
said slits are provided to be inclined relative to the axial direction around said axis.

30. The motor according to claim 22, further comprising
a yoke backing said magnets from the other side of said axis.

31. The motor according to claim 22, wherein
said magnetic plate has recesses into which said magnets fit in the direction along said axis.

32. The motor according to claim 22, further comprising
ridges provided on said magnetic plate and coming into contact with said magnets from their outer peripheral sides.

33. The motor according to 22, further comprising
ridges provided on said magnetic plate and coming into contact with said magnets from the side of the circumferential direction around said axis.

34. The motor according to claim 22, wherein
said magnetic plate is composed of magnetic plate components divided in a position where said pole face is disposed as viewed along said axis.

35. The motor according to claim 22, wherein
said stator includes:
a plurality of magnetic cores standing along said axis;
windings wound around said magnetic cores; and
a magnetic plate mounted on said magnetic cores and having opening slits extending from positions close to said axis to farther positions.

36. The motor according to claim 22, wherein
said stator includes:
a substrate having a surface perpendicular to said axis;
a pair of first-stage spacers separated from each other and each extending at an angle of about 180 degrees, on said surface in the circumferential direction of said axis;
a pair of second-stage spacers extending at ends of said first-stage spacers at an angle of about 120 degrees in said circumferential direction on said first-stage spacers, respectively;
a pair of magnetic cores provided on said first-stage spacers, respectively;
two pairs of magnetic cores provided on said second-stage spacers, respectively;
a pair of first windings provided on said substrate and winding three of said magnetic cores;
a pair of second windings provided on said first-stage spacers and said first windings and winding three of said magnetic cores; and
a pair of third windings provided on said second-stage spacers and said second windings and winding three of said magnetic cores, wherein
said first windings, said second windings and said third windings are arranged to be shifted 120 degrees from one another in said circumferential direction.

37. A method of driving the motor defined in claim 22, the method comprising
flowing a sinusoidal current to said stator.

38. A method of driving the motor defined in claim 22, the method comprising
flowing a leading current to said stator.

39. A compressor equipped with the motor defined in claim 22.

* * * * *